US010375213B2

(12) United States Patent
Reynolds et al.

(10) Patent No.: US 10,375,213 B2
(45) Date of Patent: *Aug. 6, 2019

(54) CENTRALIZED HYBRID WIRELESS SELF-ORGANIZING NETWORKS

(71) Applicant: Trinity Mobile Networks, Inc., Philadelphia, PA (US)

(72) Inventors: Tyler Beauchamp Reynolds, Washington, DC (US); Stephen Donald Hall, Providence, RI (US)

(73) Assignee: Trinity Mobile Networks, Inc., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/199,425

(22) Filed: Nov. 26, 2018

(65) Prior Publication Data

US 2019/0104202 A1    Apr. 4, 2019

Related U.S. Application Data

(63) Continuation of application No. 14/754,688, filed on Jun. 30, 2015, now Pat. No. 10,142,444, which is a
(Continued)

(51) Int. Cl.
*H04L 12/24*    (2006.01)
*H04L 12/26*    (2006.01)
(Continued)

(52) U.S. Cl.
CPC .......... *H04L 67/42* (2013.01); *H04L 41/0816* (2013.01); *H04L 41/0853* (2013.01);
(Continued)

(58) Field of Classification Search
CPC .. H04L 67/42; H04L 41/0816; H04L 41/0853
See application file for complete search history.

(56) References Cited

U.S. PATENT DOCUMENTS 6,421,321 B1   7/2002   Sakagawa et al.
7,433,332 B2   10/2008  Golden et al.
(Continued)

FOREIGN PATENT DOCUMENTS

EP    2016724    1/2009
EP    3164968    5/2017
(Continued)

OTHER PUBLICATIONS

WIPO, International Search Report for PCT/US2015/038251, dated Oct. 27, 2015.
(Continued)

*Primary Examiner* — El Hadji M Sall
(74) *Attorney, Agent, or Firm* — Siritzky Law, PLLC

(57) ABSTRACT

A system includes one or more servers, and a plurality of wireless telecommunications devices registered with the system. The servers obtain corresponding client configuration states for at least some of the registered client devices, wherein a client configuration state for a given registered client device includes and/or is based on information about other devices with which the given registered client device can communicate in at least one direction. The servers determine and maintain a virtual representation of at least one hybrid network of gateways and the registered client devices. The servers determine a particular sub-network configuration of a particular sub-network for a particular client device, based on the virtual representation of the at least one hybrid network and on a client configuration state for the particular client device. The particular sub-network comprises at least one path between the one or more servers and the particular client device. The servers route data to and/or from the particular client device via the particular sub-network.

66 Claims, 25 Drawing Sheets

Related U.S. Application Data continuation of application No. PCT/US2015/038251, filed on Jun. 29, 2015.

(60) Provisional application No. 62/019,545, filed on Jul. 1, 2014, provisional application No. 62/185,717, filed on Jun. 28, 2015, provisional application No. 62/019,545, filed on Jul. 1, 2014, provisional application No. 62/185,717, filed on Jun. 28, 2015.

(51) Int. Cl.
  *H04L 29/06* (2006.01)
  *H04L 29/08* (2006.01)
  *H04W 84/18* (2009.01)

(52) U.S. Cl.
  CPC .............. *H04L 67/34* (2013.01); *H04L 69/14* (2013.01); *H04W 84/18* (2013.01); *H04L 41/12* (2013.01); *H04L 43/08* (2013.01); *Y02D 70/10* (2018.01); *Y02D 70/14* (2018.01)

(56) References Cited

U.S. PATENT DOCUMENTS

| | | | |
|---|---|---|---|
| 7,551,562 B2 | 6/2009 | Srikrishna et al. | |
| 7,568,018 B1 | 7/2009 | Hove et al. | |
| 7,844,687 B1 | 11/2010 | Gelvin et al. | |
| 8,116,201 B2 | 2/2012 | Nandagopalan et al. | |
| 8,442,029 B2 | 5/2013 | Picard | |
| 8,644,188 B1 * | 2/2014 | Brandwine | H04L 12/4666 |
| | | | 370/254 |
| 8,743,758 B1 | 6/2014 | Bhargava et al. | |
| 8,745,267 B2 | 6/2014 | Luecke et al. | |
| 9,369,520 B2 | 6/2016 | Luecke et al. | |
| 9,414,434 B2 | 8/2016 | Bhargava et al. | |
| 9,729,675 B2 | 8/2017 | Luecke et al. | |
| 2005/0234931 A1 | 10/2005 | Yip et al. | |
| 2007/0111735 A1 | 5/2007 | Srinivasan et al. | |
| 2009/0245243 A1 | 10/2009 | Rangarajan et al. | |
| 2011/0231534 A1 | 9/2011 | Manring et al. | |
| 2012/0294173 A1 | 11/2012 | Su et al. | |
| 2013/0295921 A1 | 11/2013 | Bhargava et al. | |
| 2014/0092765 A1 | 4/2014 | Agarwal et al. | |
| 2015/0304411 A1 | 10/2015 | Cheng et al. | |
| 2016/0315688 A1 | 10/2016 | Bhargava et al. | |
| 2016/0316361 A1 | 10/2016 | Bhargava et al. | |

FOREIGN PATENT DOCUMENTS

| | | |
|---|---|---|
| GB | 2507161 | 4/2014 |
| KR | 20170029540 | 3/2017 |
| WO | WO 2014088675 | 6/2014 |
| WO | PCT/US2015/038251 | 6/2015 |

OTHER PUBLICATIONS

WIPO, International Preliminary Report on Patentability, Chapter II, for PCT/US2015/038251, dated Oct. 11, 2016 [53 pgs.].

European Patent Office (EPO) Extended Search Report for EP 15814672.0, dated Nov. 29, 2017 [8 pgs.].

WIPO, Written Opinion of the International Searching Authority for PCT/US2015/038251, dated Oct. 27, 2015 [10 pgs.].

* cited by examiner

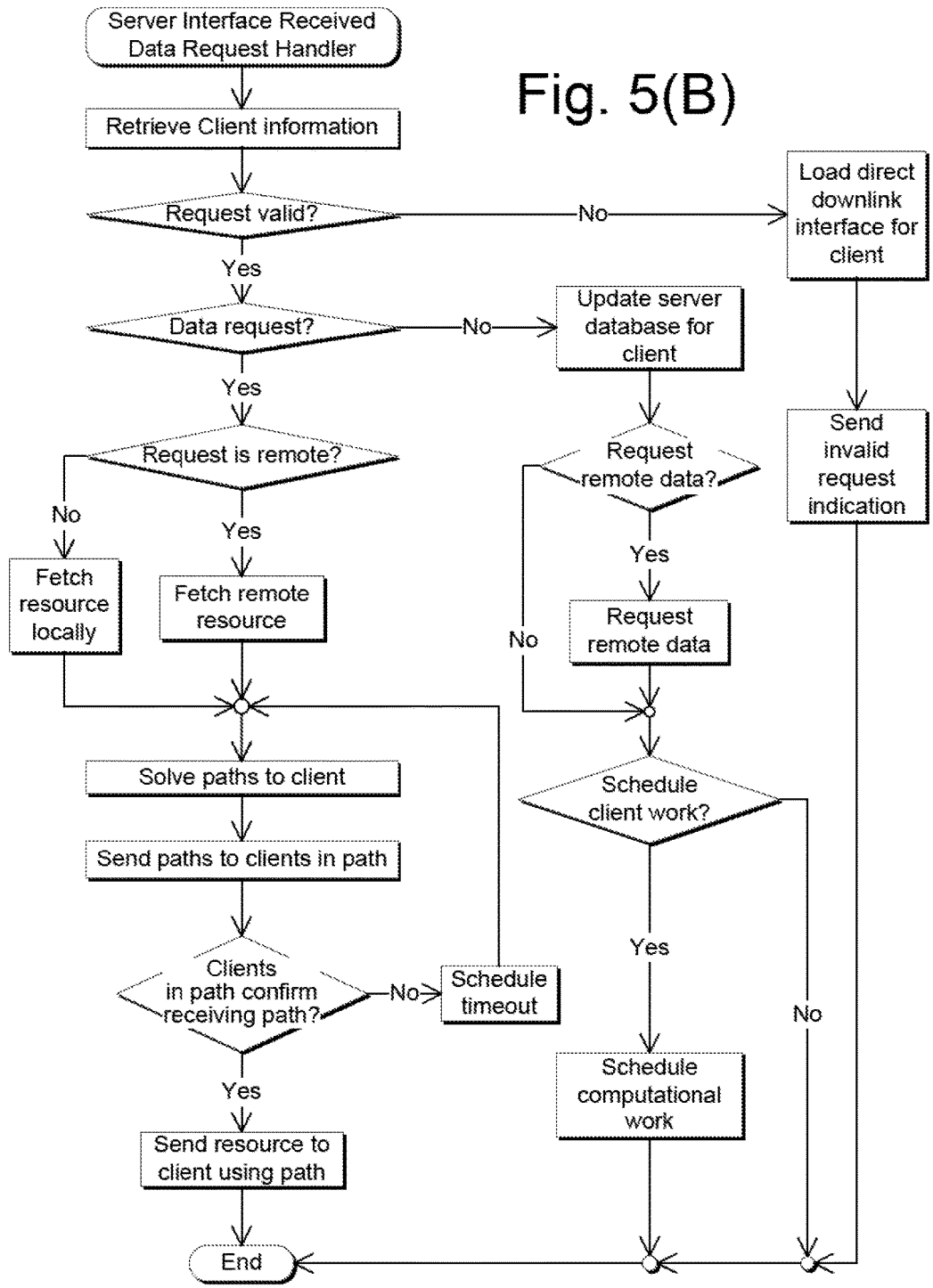

TABLE 1

| ROUTE ID | PATH | CHANNEL USED | ESTIMATED TOTAL ROUTE RELIABILITY | ESTIMATED TOTAL COMPLETION TIME | SCORE | ROUTE RANKING | COST | BATTERY CONSUMPTION |
|---|---|---|---|---|---|---|---|---|
| A | DIRECT DOWNLINK | {6} | 99.999% | 40ms | 242 | 3 | $0.04 | 83 J |
| B | {G1, 1, 3, 6, 7} | {6, 1, 6, 11} | 95% | 28ms | 319 | 1 | $0.034 | 60 J |
| C | {G1, 2, 4, 5, 3, 6, 7} | {6, 6, 6, 1, 6, 1} | 97.5% | 36ms | 271 | 2 | $0.023 | 90 J |

FIG. 6(C)

© Trinity Mobile Networks, Inc. All Rights Reserved.

CENTRALIZED HYBRID WIRELESS SELF-ORGANIZING NETWORKS

CROSS REFERENCE TO RELATED APPLICATIONS

This application is a continuation of U.S. patent application Ser. No. 14/754,688, filed Jun. 30, 2015, the entire contents of which are hereby fully incorporated herein by reference for all purposes. U.S. patent application Ser. No. 14/754,688 claims priority to (i) U.S. Provisional Patent Application No. 62/019,545, filed Jul. 1, 2014, titled "Method And System For Implementing A Dynamic Wireless Mesh Network," and (ii) U.S. Provisional Patent Application No. 62/185,717, filed Jun. 28, 2015, titled "Methods, Devices, And Systems For Implementing Centralized Hybrid Wireless Self-Organizing Networks," the entire contents of each of which are fully incorporated by reference herein for all purposes. U.S. application Ser. No. 14/754,688 is a continuation of International Patent Application number PCT/US15/38251, filed Jun. 29, 2015, the entire contents of which are hereby fully incorporated herein by reference for all purposes.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to hybrid wireless self-organizing networks, and, more particularly for hybrid wireless self-organizing networks including mobile wireless communications devices.

BACKGROUND

Wireless telecommunications devices such as smartphones, mobile phones, and the like have become ubiquitous. Such devices are no longer only or primarily used for voice communications (e.g., voice telephone calls), instead they are essentially portable computer devices and are used for all sorts of data communication including web browsing, and the like.

The rise in the use of wireless telecommunications devices, along with the nature of their use has caused an exponential increase in the demand for mobile data and services. However, the corresponding required infrastructure has not kept up with this demand. Wireless telecommunications devices connect to data sources primarily through cellular networks, and the cellular carriers (i.e., the operators of the cellular networks) have not been able to support the demand for mobile data and services through the cellular network alone.

Users of wireless telecommunications devices, such as smartphones, often run into problems when too many users are attempting to use too few network resources. For example, Internet traffic can become slow and congested if there are too many users requesting channels from a cellular base station. In order to avoid the limitations and costs associated with cellular telephony, many wireless telecommunications device users switch to WiFi or other non-cellular connection protocols when possible. This type of switching is typically done by a user having to take active steps in order to use non-cellular connection protocols (e.g., choosing a WiFi network by name). Although WiFi service is presently cheaper than cellular service, in any particular location a WiFi network may itself become overwhelmed by user demand. WiFi access is typically not free, and the costs associated with such access may make the use of a WiFi network may be sub-optimal, both with respect to speed and cost. It should be appreciated that as used herein the term "cost" may refer to any cost and may or may not include a financial cost.

One solution to the congestion problem is the use of a mesh network in which users' devices communicate directly with one another instead of via a cellular network. In such a system traffic can be passed from one user device to another until the data are eventually transmitted to a fast, available connection to the Internet, and vice versa (from gateways to requesting devices).

Mesh networks suffer from severe problems, one of the biggest being that user devices have trouble determining a route they should use in the mesh. A mesh network approach essentially requires devices to flood the network with requests to build routes or forces each device to update the entire networks' connections. Both of these solutions cause enormous inefficiency, both in terms of transmission performance (unstable or low throughput connections) and quickly draining the battery of network devices.

There is a need to overcome the problems caused by multiple wireless telecommunications devices trying to use limited network resources. There is also a need to overcome these problems in an automatic and transparent manner, making good use of resources available. There is also a need to serve the entire network as optimally as possible given these constraints.

BRIEF DESCRIPTION OF THE DRAWINGS

Other objects, features, and characteristics hereof as well as the methods of operation and functions of the related elements of structure, and the combination of parts and economies of manufacture, will become more apparent upon consideration of the following description and the appended claims with reference to the accompanying drawings, all of which form a part of this specification. None of the drawings are to scale unless specifically stated otherwise.

FIGS. 5(A)-5(E) are flowcharts showing aspects of exemplary operation of embodiments hereof;

DETAILED DESCRIPTION OF THE PRESENTLY PREFERRED EXEMPLARY EMBODIMENTS

Glossary and Abbreviations

Figure 1:
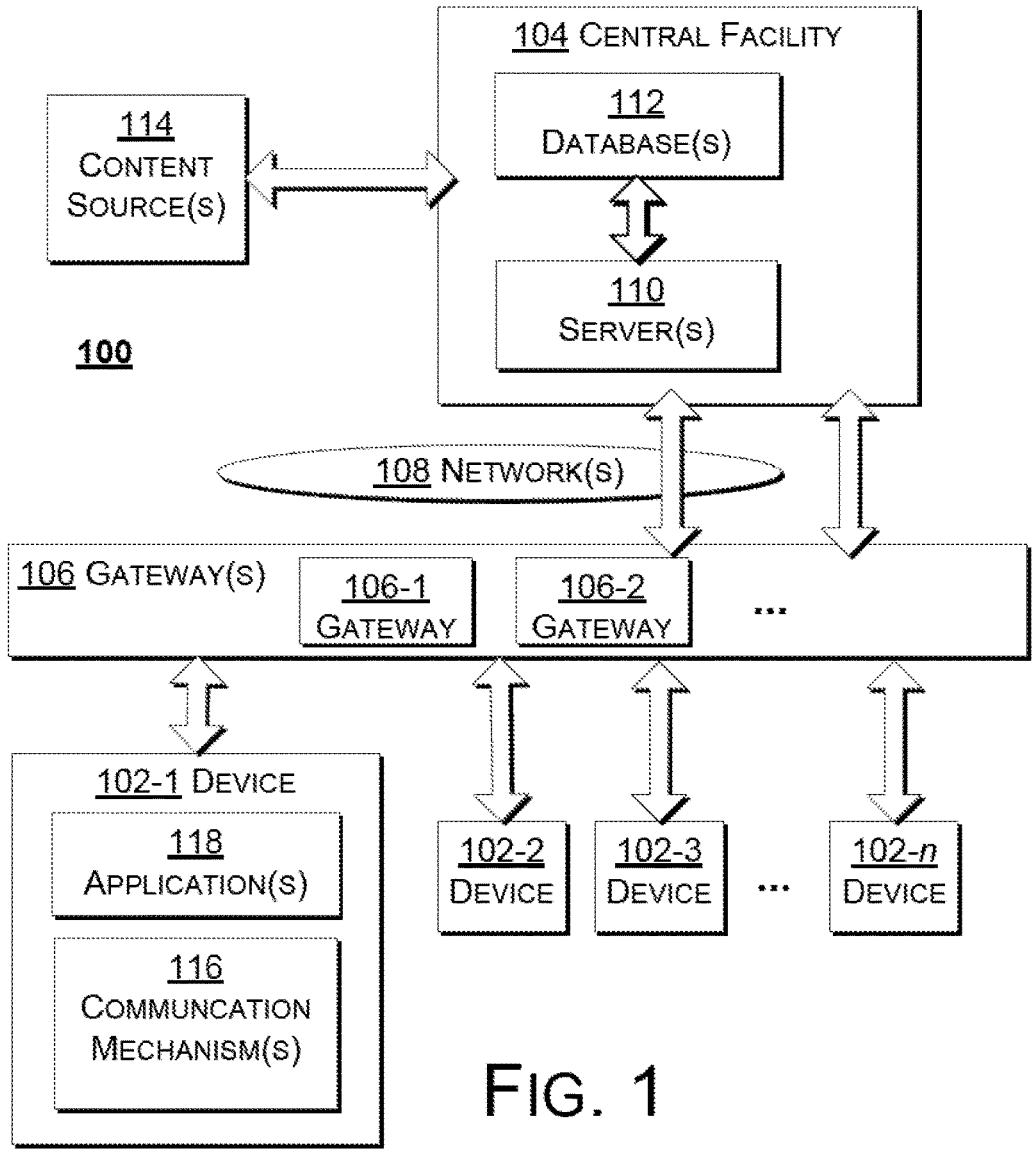
FIG. 1 depicts a system/framework according to exemplary embodiments hereof.

As used herein, unless used otherwise, the following terms or abbreviations have the following meanings:

AP means access point (generally referring to a device that allows or supports devices connecting to a network, e.g., using Wi-Fi, or related standards);

API means application programming interface;

BATMAN means "Better Approach To Mobile Ad-hoc Networking," a routing protocol for decentralized mesh networks;

Bonjour refers to Apple's implementation of Zero-configuration networking, a group of technologies that includes service discovery, address assignment, and hostname resolution;

GPS means Global Positioning System;

GSM, Global System for Mobile Communications;

Ham radio refers to Amateur radio;

HTTP means Hypertext Transfer Protocol;

HTTPS means Hypertext Transfer Protocol Secure;

IMEI means International Mobile Equipment Identity;

IoT means Internet of Things;

IP means Internet Protocol;

LAN means local area network;

LTE means Long-Term Evolution, a fourth-generation cellular network standard;

MAC means Media Access Control;

MNO means mobile network operator;

MSO means multiple-system operator or multi-system operator;

MVNO means mobile virtual network operator;

NIC means network interface card;

OEM means original equipment manufacturer;

OLSR means Optimized Link State Routing;

OSI means Open Systems Interconnection;

RAM means random access memory;

RF means radio frequency;

SIM means subscriber identity module or subscriber identification module;

SON means self-organizing network;

SSID means Service Set Identifier;

TCP/IP means the Transmission Control Protocol/Internet Protocol;

VPN means virtual private network; and

WLAN means wireless local area network.

A "mechanism" refers to any device(s), process(es), routine(s), service(s), module(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered to be shorthand for the term device(s) and/or process(es) and/or service(s).

Overview

A system or framework 100 according to exemplary embodiments hereof is described with reference to the drawing in FIG. 1. Multiple devices 102-1, 102-2, 102-3 . . . 102-$n$ (generally denoted 102) may connect to a central facility 104 (described in greater detail below), via one or more gateways 106-1, 106-2 . . . (generally denoted 106) and one more networks 108. Devices that are registered with the central facility are referred to as clients.

Devices 102 are wireless telecommunications devices. As used herein, a wireless telecommunications device (or WTD) refers to any device or entity or apparatus capable of data transmission and reception. Non-limiting examples of wireless telecommunications devices include mobile phones (such as cell phones, smartphones, and the like). The term wireless telecommunications device is not limited by the communication protocols or systems used or by the type of data. The data may include or represent voice data, image data, text data, data, video data, etc.

The central facility 104 comprises one or more central servers 110 (generally referred to as central server(s) 110 or server(s) 110) and one or more databases 112 (generally referred to herein as database(s) 112). The central server(s) 110 may comprise a single computer, a network of computers, or a distributed system. It should be appreciated that the terms "central" with respect to "facility 104" and/or "server(s) 110" is used for the purposes of description and meant to imply a logical relationship among elements of the system 100, and is not intended to imply or impose any physical relationship between or among the components. There is thus no requirement that various components of the central facility 104 be co-located or that the central server(s) 110 be co-located. There is also no requirement that database(s) 112 be co-located with the server(s) 110 or with each other.

As described herein, the central facility is a component or collection of components capable of one or more of: virtualizing a network, determining a network topology, determining transmission paths, path optimization, transmission timing, transmission channel, remote resource communication, communication with client devices, resolving communication errors, modifying a client state configuration, or combinations thereof.

The server(s) 110 may communicate with one or more content sources 114 (e.g., remote webservers or the like).

Each device 102 includes at least two communication mechanisms 116, including, e.g., mechanisms for wireless/RF communications such as cellular, WiFi, Bluetooth, satellite, etc.

Each device 102 in the system 100 includes an application 118 (described in greater detail below).

The various client devices 102 and gateways 106 may form or comprise one or more hybrid networks or sub-networks. As used herein, a sub-network of devices 102 refers to a set of devices in which each device is in transmission or receiving range of at least one other device in the set.

These networks or sub-networks are considered hybrid in that that they may operate across multiple wireless transmission types, including, e.g., cellular, WiFi, Bluetooth, Satellite, etc. Membership and network topology/connectivity of these one or more networks will vary over time. The one or more hybrid networks/sub-networks may be considered as one hybrid network which may have unconnected components.

There may be a path between any two nodes in a network or sub-network. A path is considered to have a direction, so that, for any two nodes $N_1$ and $N_2$ in a network or sub-network, the path from $N_1$ to $N_2$ (sometimes denoted «$N_1$, $N_2$») is not necessarily the same as the path from $N_2$ to $N_1$ («$N_2$, $N_1$»). The direction of a path typically corresponds to a transmission direction. There may, for example, be a path from $N_1$ to $N_2$ but not from $N_2$ to $N_1$. Thus, e.g., node $N_1$ may be able to communicate with node $N_2$, but not vice versa. As used herein, a path is considered to be hybrid (i.e., a hybrid path) if it contains path segments using different communication interfaces. For example, consider a path «$N_1$, $N_2$, $N_3$» from node $N_1$ to node $N_3$. If the path segment «$N_1$, $N_2$» uses a different protocol or interface from the path segment «$N_2$, $N_3$» then the path «$N_1$, $N_2$, $N_3$» is considered hybrid. When two devices can communicate using multiple interfaces (e.g., WiFi and Zigbee), then each interface corresponds to its own path. For example, if node $N_1$ can communicate with node $N_2$ via WiFi and Zigbee, then there are considered two paths from $N_1$ to $N_2$, namely the WiFi path and the Zigbee path.

In general, if there is a path segment in a path that uses a different protocol or interface from another path segment in that path then the path is considered hybrid.

In a network or sub-network, two nodes are said to be directly connected if there is a path between them that contains no intermediate nodes. As before, the presence of a direct connection from node $N_1$ to node $N_2$ does necessarily mean that there is a direct connection from node $N_2$ to node $N_1$.

As explained in greater detail below, preferably the central facility 104 determines and maintains a virtual representation of the hybrid network(s) of client devices 102 and gateways 106. This virtual representation preferably includes one or more of: the physical wireless interfaces of each registered client, client locations, gateway locations and capabilities, devices' remaining battery life, potential connections between clients, potential connections between clients and gateways, and potential connections between gateways.

Figure 2A:
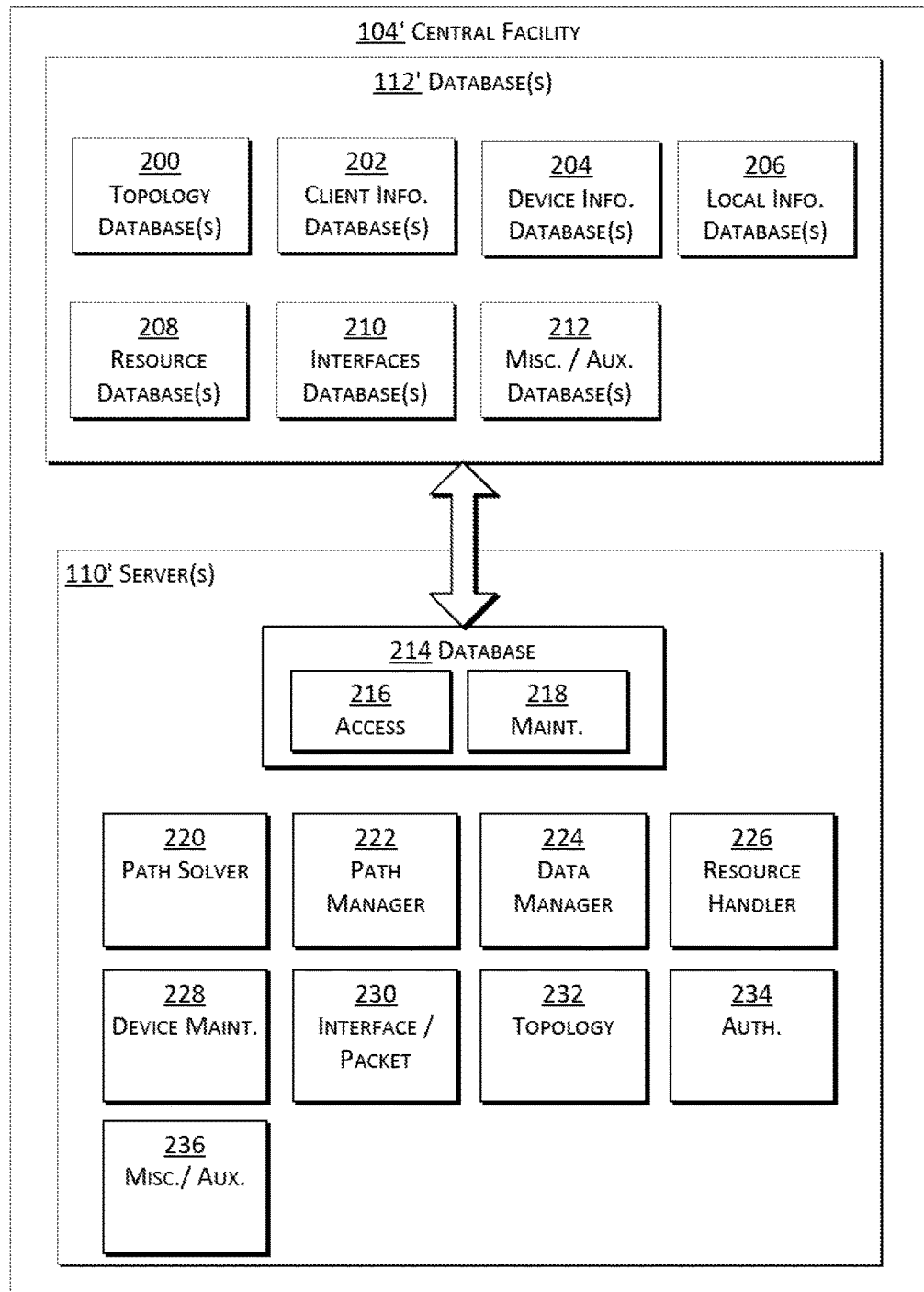
FIGS. 2(A)-2(B) depict logical organizations of a central facility according to exemplary embodiments hereof.

An exemplary central facility 104' is shown in greater detail in FIG. 2(A), in which database(s) 112' may include topology database(s) 200, client information database(s) 202, device information database(s) 204, local information database(s) 206, resource database(s) 208, interfaces database(s) 210, and miscellaneous/auxiliary databases 212. The central server(s) 110 preferably include database mechanism(s) 214 including database access mechanism(s) 216 and database maintenance mechanism(s) 218, respectively to access and maintain the various database(s) 112'. It should be appreciated that the system 100 is not limited by the kinds or organization or implementation of database(s) 112' or by the manner in which they are maintained and/or accessed. Some databases may need to be accessed more quickly than others, and parts of such databases may be stored locally on servers(s) 110, e.g., in fast memory such as RAM or the like. For example, the topology database(s) 200 may be used to store and maintain information about the virtual representation of the network, and such information may need to be accessed and updated quickly (in substantially real time).

The mechanisms on central server(s) 110 of the central facility 104 may perform or comprise one or more of the following: (i) aggregation and maintenance of virtual representations of interfaces in the particular network, (ii) aggregation and maintenance of potential virtual connections in the network, (iii) optimal path generation for data transmissions and active routes, (iv) data routing services, (v) a data reliability services, (vi) remote data requesting services, and (vii) security services.

The exemplary central facility 104' preferably also includes path analysis/determination (solver) mechanism(s) 220, path manager mechanism(s) 222, data manager mechanism(s) 224, resource handler mechanism(s) 226, device maintenance mechanism(s) 228, interface/packet mechanism(s) 230, topology mechanism(s) 232, authentication mechanism(s) 234, and other miscellaneous/auxiliary mechanisms 236.

The exemplary central facility 104' is shown only by way of example, and those of ordinary skill in the art will appreciate and understand, upon reading this description, that different and/or other organizations and elements may be used.

Figure 2B:
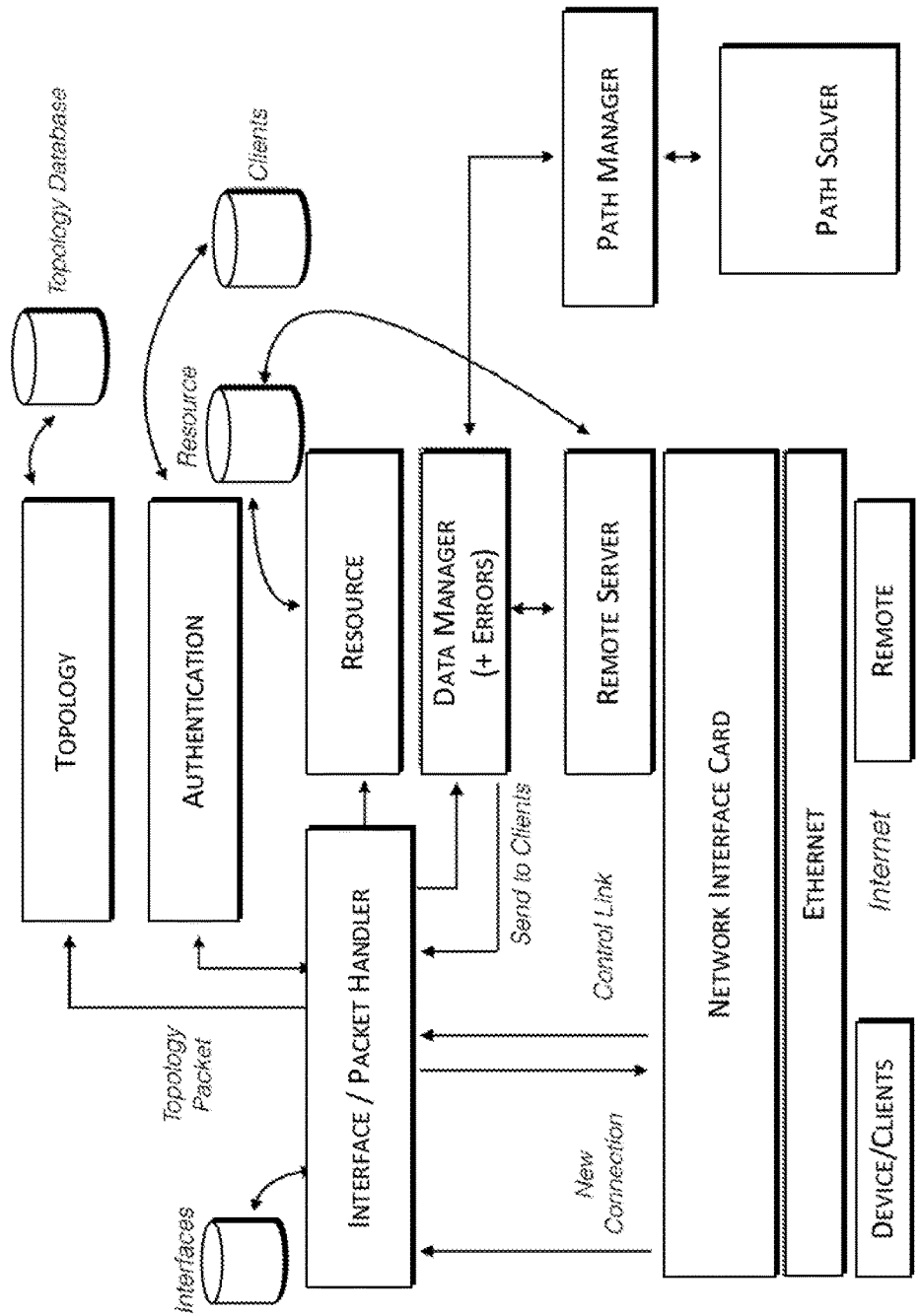

FIG. 2(B) shows an example of the central facility of FIG. 2(A), showing some examples of connection between components.

The server(s) 110 are preferably capable of communicating with devices 102 in the system 100, either through direct connections (e.g., via cellular, WiFi, etc.) from a gateway 106 or by establishing connections through a pseudo-gateway. As used herein, a pseudo-gateway refers to a client device in the network that has a direct uplink connection to a gateway. A pseudo-gateway may use its connection to the central server (via a gateway) to relay request data for another device(s) that does not have a direct connection to a gateway. It should be appreciated that, in practice, not every client device with a direct uplink connection to a gateway will be chosen to act as a pseudo-gateway. Likewise, each client 102 is preferably capable of communication with the central server(s) 110, either via direct connections or via a gateway or pseudo-gateway. A pseudo-gateway should have a connection to the client it is relaying request data for either directly or indirectly through another client to which the pseudo-gateway has a direct connection.

A preferable exemplary embodiment of the central server(s) 110 comprises one or more Internet connected (e.g., a webserver or series of webservers) that provide the functions described above in a combination of software and hardware. In such implementations, the webserver(s) may receive data over the Internet from a backhaul source (e.g., an optical fiber cable connection to an ISP). The server(s) 110 may communicate directly with gateways 106, client devices 102, and remote webservers, e.g., over TCP/IP networking. Other exemplary embodiments of the system may involve a distributed network of devices that cooperate to perform these functions. One example may involve a series of intelligent WiFi routers that communicate using the Internet and coordinate their wireless transmissions.

It should be appreciated that each server may be or comprise or be implemented on a computing device. Computing devices are discussed in greater detail below.

Regardless of its implementation, a primary responsibility of the central facility 104 is coordinating the flow of data in the network by combining at least some of: topology data provided by the clients, previous packet transmissions and transmission errors, and other data that may be obtained/used by the central facility 104 to make informed routing decisions.

Figure 3:
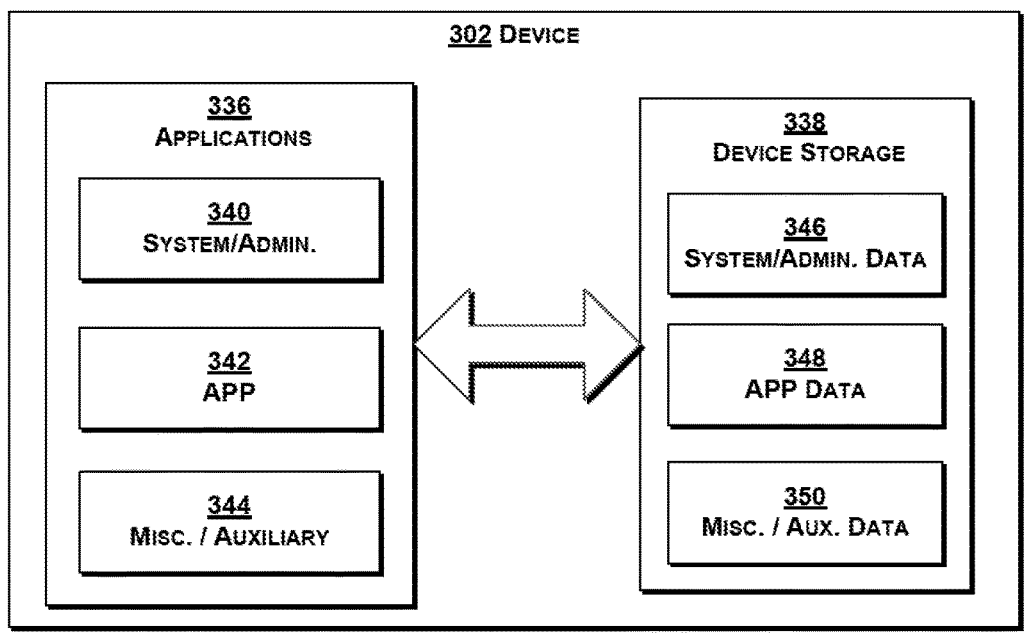
FIG. 3 depicts a logical organization of a device according to exemplary embodiments hereof.

A logical structure of an exemplary client device 102 is shown in FIG. 3 and includes client applications (or client software) 336 (corresponding, at least in part, to applications 118 in FIG. 1) and client storage 338. The client applications 336 are mechanisms, preferably implemented, at least primarily, in software, that run on the device 102. The client applications 336 may include system/administrative applications 340, an application 342 (also referred to as "APP" 342) implementing aspects hereof, and other miscellaneous/auxiliary applications 344. The client storage 338 may be part of the storage on the client device 102 or may be special purposes storage for the client applications 336. The client storage 338 may include system/administrative data storage 346 for use by the system/administrative applications 336, APP data storage 348 for use by APP 338, and miscellaneous/auxiliary data storage 350 for use by miscellaneous/auxiliary applications 344. It should be appreciated that the naming and logical organizations of the applications and storage described herein are given only by way of example, and that different and/or other names and organizational structures are possible and are contemplated herein.

With reference again to FIG. 1, preferably each device 102 comprises a wireless telecommunications device such as a smartphone, tablet, laptop, Personal Digital Assistant (PDA), or another device that has the ability to send and/or receive data. The client-side self-organizing network (SON) software preferably integrates with the operating system of the device and the device's hardware to detect and utilize the wired and wireless network interfaces of the device through one or more device drivers using one or more protocols, such as WiFi Direct, Bluetooth, Zigbee, or LTE-Direct. It should be appreciated that different and/or other protocols may be used and are contemplated herein.

The preferred client-side software (e.g., APP 342) may manage these wireless interfaces, detect and manage a collection of neighboring gateways and neighboring devices, and maintain an internal routing table of instructions for communicating with these gateways and peers.

As noted above, each device 102 preferably includes at least two communication mechanism(s) 116. These may include mechanisms spanning multiple wireless frequency bands and wireless protocols/standards. These frequencies or standards may include, without limitation, the IEEE 802.11a, b, g, n, ac, ad, h, p, j, ah, y and standards operating in 2.4 GHz and 5 Ghz bands, cellular GSM, LTE, 3GPP, HAM radio and APRS bands, Zigbee 400 MHz WiFi, 5.9 Ghz vehicular communication bands, and any other frequencies to those skilled in the art.

It should be appreciated that each device 102 may be or comprise or be implemented on a computing device. Computing devices are discussed in greater detail below.

Figure 4A:
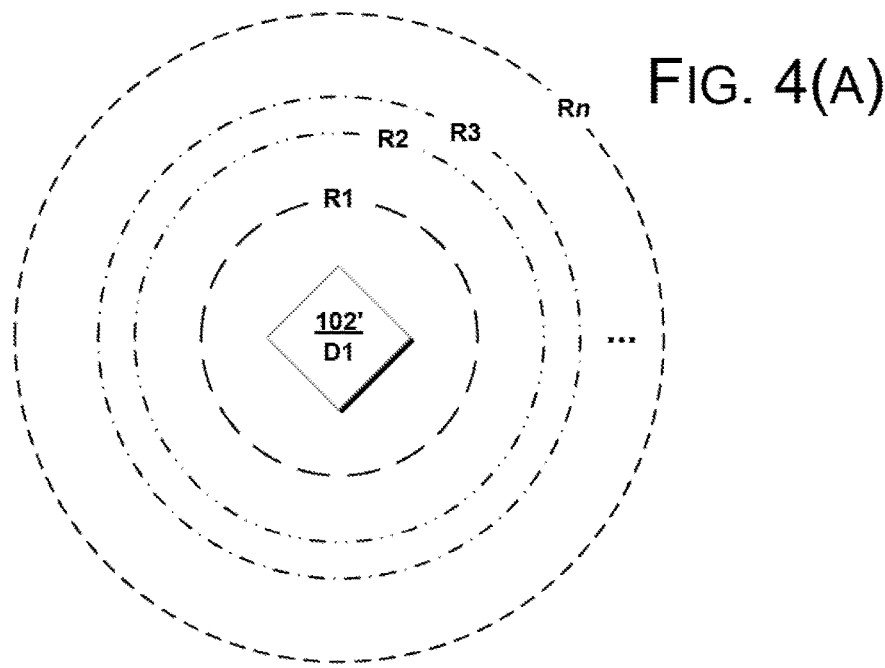
FIGS. 4(A)-4(E) depict aspects of communication between components of the system of FIG. 1.

With reference to FIG. 4(A), a device 102' (or D1) may include n communication mechanisms spanning n wireless frequency bands and/or wireless protocols. Each frequency band/wireless protocol provides wireless communication over a particular corresponding range (denoted R1, R2, R3 . . . Rn in the drawing in FIG. 4(A)). In this and subsequent drawings, in order to simplify the drawings, devices may be shown as diamond shaped, with or without references. Although the various ranges are shown as circles, it should be appreciated that the range of any particular frequency band/wireless protocol may be non-uniform and may be affected by various factors, including physical objects (including a person holding the device). It should also be appreciated that a particular device may have different send and receive ranges for the same frequency band/wireless protocol. For the sake of the explanations herein these differences are not shown.

Figure 4B:
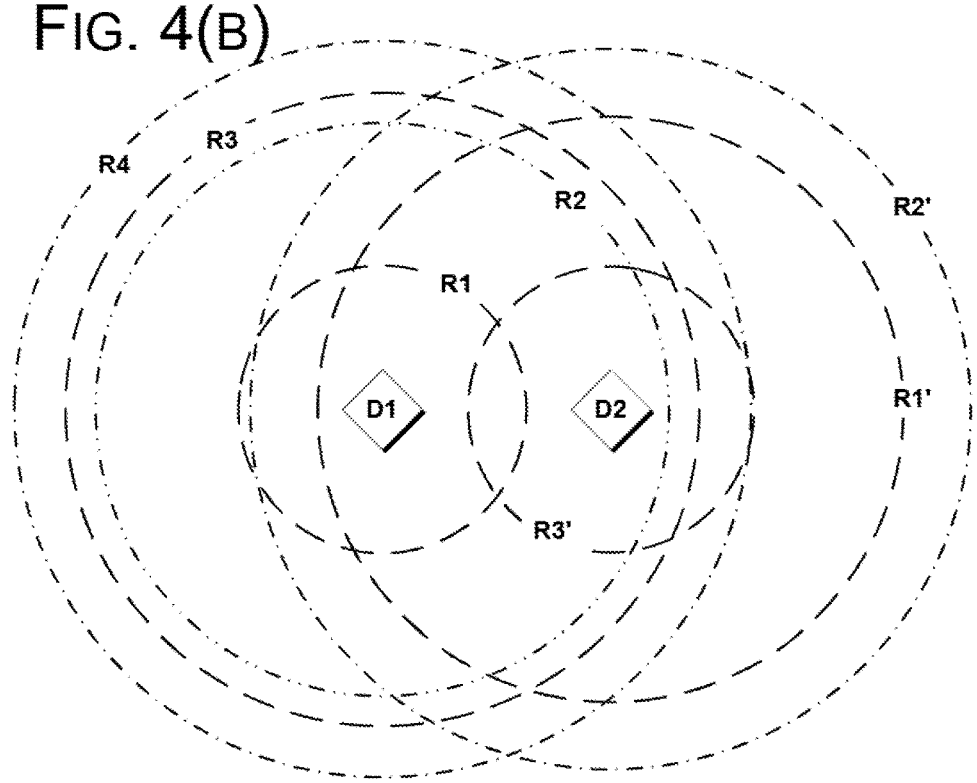

Various devices 102 may be able to communicate directly with each other using multiple frequency band/wireless protocols. For the remainder of this description a combination of a frequency band and wireless protocol will be referred to as a protocol. In the example in FIG. 4(B), device D1 can communicate over a first protocol with a range R1, over a second protocol with a range R2, over a third protocol with a range R3, and over a fourth protocol with a range R4. The device D2 can communicate over the first protocol with a range R1', over the second protocol with a range R2', and over the third protocol with a range R3'. Device D2 is within ranges R2, R3, and R4 of device D1. Device D1 is within ranges R1' and R2' of device D2. Since device D2 does not support communication of the fourth protocol, devices D1 and D2 may be able to communicate over the first, second, and third protocols. However, notably, in this example, device D1 is not within the range R3' of device D2, so even though devices D1 and D2 share the interface for the third protocol, device D2 can receive communications from device D1 in the third protocol, but device D1 cannot receive communications from the device D2 using the third protocol. In other words, the communication path between devices D1 and D2 using the third protocol is a uni-directional path. Similarly, communication between D2 and D1 is uni-directional from D2 to D1 using the first protocol as D2 is not within range of R1. A communications path may be possible from D1 to D2 using the second and third protocols. A communications path may be possible from D2 to D1 using the first and second protocols.

The communication paths in a network include a direction. Thus, just because there may be a path from device D1 to device D2 (with any particular protocol), this does not mean that there is a path in the other direction (from D2 to D1), and vice versa. Two devices may communicate using a first protocol in one direction and a different second protocol in the other direction. E.g., two devices $D_A$ and $D_B$ may communicate using protocol P1 from $D_A$ to $D_B$ and using a different protocol P2 from $D_B$ to $D_A$.

Figure 4C:
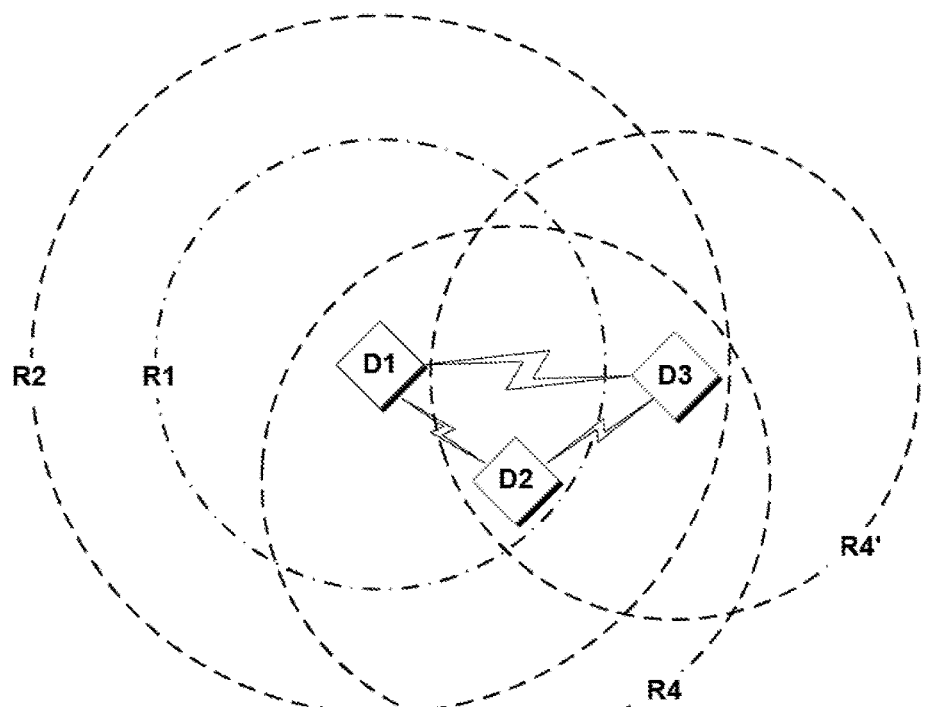
Figure 4D:
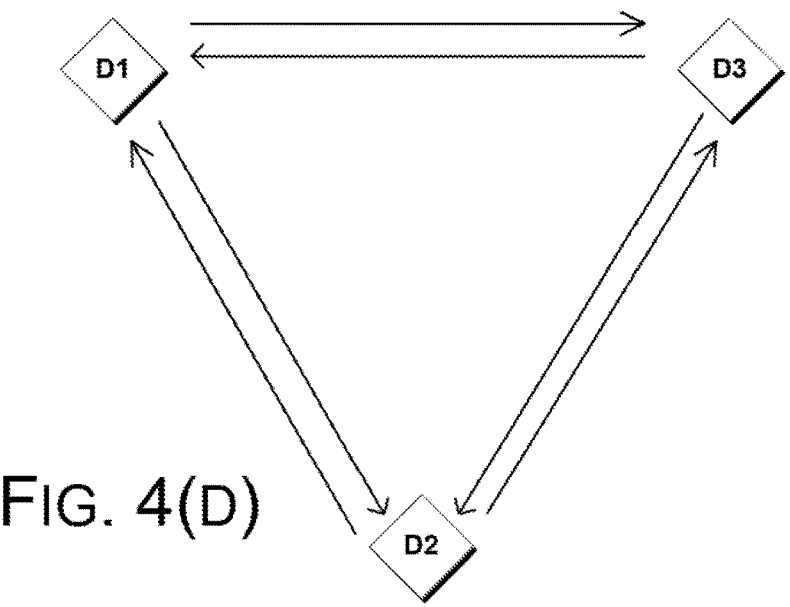

FIGS. 4(C) and 4(D) show an example in which three devices (D1, D2, and D3) may communicate via various protocols. An arrow from one device to another (e.g., from D1 to D2) means that device D2 can receive transmissions from device D1 on one or more protocols. For example, devices D1 and D2 may be in range of each other so that D2 can receive communication from D1 using Bluetooth, WiFi, LTE, and Zigbee. Devices D1 and D3 may be in range of each other so that D1 can receive transmissions from D3 on WiFi only.

Figure 4E:
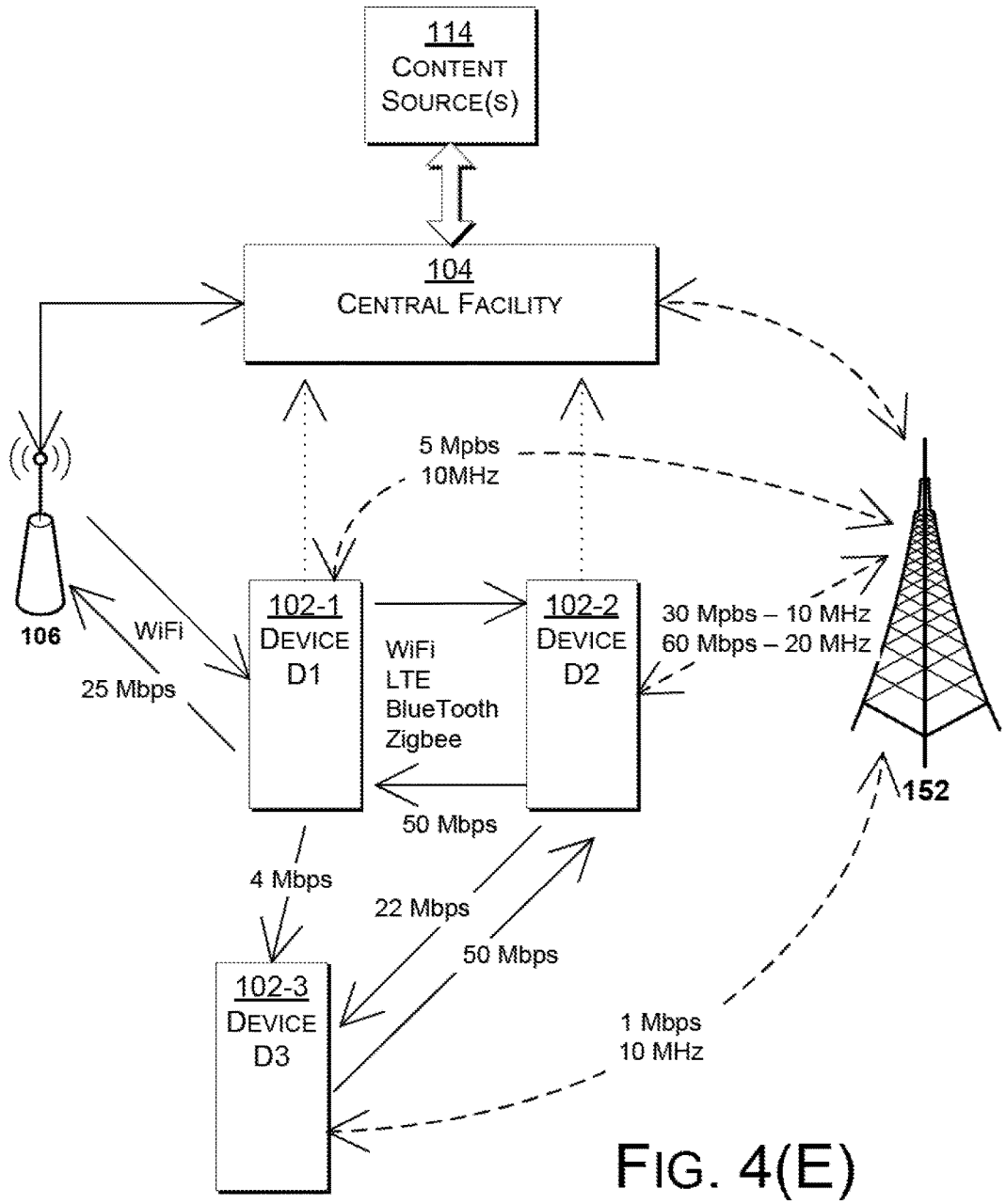

FIG. 4(E) shows an example of three devices (D1, D2, D3) communicating with each other. Device D1 communicates with the server(s) 110 of the central facility 104 via gateway 106. Note that each device potentially has the ability to connect to the central facility 104 via the cellular system (e.g., via tower 152). In FIG. 4(E) various example protocols and transmission rates are shown by way only of example.

Preferred embodiments hereof are connection agnostic. The central facility 104, having real-time and complete or near-complete information about the topology of the network, spectrum demand and availability, backhaul availability, and potential connections for areas in the network, makes the routing and connection decisions spanning multiple wireless frequency bands and wireless protocols. These frequencies or standards may include, without limitation, the IEEE 802.11a, b, g, n, ac, ad, h, p, j, ah, y and standards operating in 2.4 GHz and 5 Ghz bands, cellular GSM, LTE, 3GPP, HAM radio and APRS bands, Zigbee 400 MHz WiFi, 5.9 Ghz vehicular communication bands, and any other frequencies to those skilled in the art. The central servers transmission decisions include, but are not limited to, the choice of channel or channels data is transmitted, the timing of the data transmissions, the set and order of devices over which data is sent, the channel bandwidth, the power at which data should be broadcasted, and/or other factors.

A preferable embodiment hereof solves a number of problems in current wireless networks. These problems include locations of poor coverage in the service area, inefficient battery drain, multi-hop mesh coordination, network optimization, efficient billing in a multi-hop network, and decisions concerning how and when devices connect with other devices and gateways. For example, embodiments hereof may attempt minimize the total battery drain across some or all of the system for any given transmission.

Although one central facility 104 is described here, those of ordinary skill in the art will realize and appreciate, upon reading this description, that multiple central facilities may be present in a system or framework. For example, an MNO may support multiple central facilities and co-locate one or more central facilities at various cell towers. In such cases the range or coverage of each individual central facility would correspond, at least in part, to the range of the cell tower at which it is located. In another example, a central facility 104 may be located in a router or such device.

Operation of the System

Operation of the system 100 is described here. In some cases operation of clients and central server(s) are described separately. Although the central server(s) 110 may comprise more than one server, the following description uses the singular "server 110" to refer to them and their operation, individually or collectively.

Devices and Clients

As used herein, a device refers to an entity such as a wireless telecommunications device—WTD (e.g., a smartphone, tablet, wireless telecommunications device, IoT device, WiFi repeater, or computer device or the like) capable of data transmission, reception, whereas a client refers to a device registered with the central facility 104.

Boot Phase

Client Boot

Preferably the client (i.e., the client software, e.g., the APP 142) starts automatically on devices. The device's operating system (OS), boot loader, kernel, or a userspace application starts the client software where it preferably runs in the background while the device is powered on.

Devices preferably provide one or more physical wireless interfaces in hardware (e.g., as communication mechanism(s) 116). Such interfaces may include a HAM radio interface, an LTE compatible cellular interface, a WiFi interface, and/or a satellite interface. The operating system of each device discovers and registers the hardware of each device with the operating system and makes it available to software running on the device.

Upon loading the client software, the client software (e.g., APP 142) queries the device's operating system for physical wireless radio interfaces and their capabilities. These interfaces and capabilities are typically managed by the device's operating system as wireless interfaces and expose drivers, protocols, and capabilities to software programs running on the device. This information is made accessible to the client software. Examples of such interfaces include a WiFi interface, a cellular interface, a ham radio interface, and a satellite interface.

The client software interface may also maintain, e.g., in the memory of the device, a list of synthetic interfaces that expose additional capabilities of the device or its hardware. One example is a control interface that utilizes the default Internet connection of a device for routing packets. Another example is a GPS interface that networks with a GPS receiver connected to the device. Synthetic interfaces might be limited or restricted by the capabilities of the device's hardware. In these situations, the client software may also keep a record (e.g., a software record) of physical and synthetic interfaces and the physical hardware they virtualize. For example, the WiFi interface and the default Internet interface may both use the device's WiFi hardware. The device's operating system or the client software may track these dependencies and optionally report them to the central server.

Using the list of potential wireless interfaces, the client software identifies interfaces that are capable of reliable communication and/or reachability to the central server(s) 110. These interfaces may be marked internally as capable of acting as direct connections to the central server(s) 110.

The client software may also maintain a number of device-specific metrics that can be reported to the server(s) 110 if/when necessary. These metrics might include the client's remaining battery power, whether the client is powered externally, whether the client has a stable Internet connection, the client's IP address, location, orientation, and/or motion, or other metrics. The client software may also maintain identification information such as a serial number, device make and model, software version, or manufacturer specific unique identifier, or other identifiers. This information may be provided to the server(s) 110 in order for them to ascertain information about the device and its capabilities.

Server Boot

In presently preferred embodiments, a central server 110 is started and builds or connects to a series of initial data structures or databases (e.g., databases 112) and makes them accessible. These databases may include, information from prior sessions (e.g., from the last run session), the locations and other metrics of WiFi hotspots, cellular base stations, and other gateways in the server's service area, a database of eligible clients, and clients' account and billing information.

Depending on its configuration a server may next initiate a series of remote connections to external databases (e.g., some of database(s) 112) or servers and may obtain additional information not stored or retrievable locally. A typical embodiment involves the server querying and caching data from remote databases (e.g., device information databases 124 and local information databases 126) containing the serial numbers, MAC addresses of hotspots or devices, MMC (Multi Media Card), IMEI, or SIM related information of clients stored locally, or a number of other metrics necessary to restore the server's state or initialize the server's functionality inside the service area.

The server 110 may also set up one or more logging structures in hardware or software to track its own performance, the network's performance, or the performance of connected clients.

Finally, the central server 110 begins hosting one or more listening interfaces for receiving data from clients. A typical example comprises a TCP/IP webserver that begins listening for TCP/IP connections on a particular control port of the webserver.

Phase 1—Startup, Registration, Authentication

Devices running the client software periodically check their reachability to the central facility 104 or to the Internet for interfaces capable of connecting to the central server(s) 110. The client software (e.g., APP 342) may use system services provided by a device's operating system to aid in determining network connectivity. For example, on an Android-based device the Android Connectivity Manager service may be used. On iOS handsets the CFNetworking reachability services may be used for this purpose.

These services may use pre-existing network discovery services such as Apple's Bonjour networking, beacon frames, or other techniques to reach the server(s) 110 and/or gateway(s) 106 connecting to the server(s). Interfaces or devices that do not provide reachability updates may be periodically polled to determine their reachability or connections may be attempted on these interfaces with a certain timeout. The polling schedule may be stored in the client software and typically includes a polling frequency and/or timeout in seconds. When connections are attempted on non-connection oriented interfaces, a device may transmit one or more packets periodically from the interface according to a pre-determined schedule and wait for a response from the server to begin the registration process.

Regardless of interface type, the client software preferably simultaneously attempts connections on all eligible interfaces to the central server(s) 110 according to each interface's connection schedule. This information may be transmitted using a wired Internet connection interface, a pre-established radio link interface (such as a cellular connection to a carrier), through a satellite interface, through a long-range frequency (such as AM/FM radio) interface, through a network interface capable of establishing a direct connection with another device or meshing, or through an internet-connected interface such as cellular or WiFi. During such connections, in the case of an intermediary such as a satellite provider or a cellular carrier, it is assumed that a reliable connection can be established between that intermediary and the server(s) 110, and the proxy appears as a single connection to both the device and the server(s) 110. In typical applications, these assumptions are satisfied by cellular or WiFi connections implementing an IP-based protocol.

When a central server 110 receives a connection request (e.g., as a packet) it compares identification information contained in the request to the list of active connections managed by registered clients. If the request packet is malformed, invalid, or unreadable, the packet is dropped.

If the request packet is from an unknown device, it is assumed that an unregistered device has connected to the server 110. The server 110 may then issue and store a temporary authentication token for this unregistered device and respond with an authentication response packet that includes the authentication token. If the connection is from a known device, the packet may be routed internally to the matching interface in the virtual representation of the network.

The authentication token may be, e.g., a string of characters, numbers, or bits of variable length. The token may also be set to expire after a certain timeout for security purposes.

A prospective client receives the authentication response packet from the server and extracts the authentication token from the packet. The client updates the connection status of the interface in the device's interface list to "pending." The client then creates an authentication confirmation packet and registers the connection interface using the registration token and waits for a second response confirmation from the central server. Upon confirmation, the requesting device identifies this wireless device as a server-connected control interface that can now send and receive control information reliably. If this is the first interface of that device to register with the central server 110 then the interface is designated as a primary control interface.

When a routing device successfully registers with the server(s) 110 over a direct uplink to a server, it becomes a client of the server(s) 110. Although it is preferable that a device has a direct uplink to a server/central facility, devices can register with the server using a pseudo-gateway. Software running on the client (e.g., APP 342) then retrieves and compiles the capabilities of each wireless radio and network interface inside the device and transmits this information, or other metrics such as identifiers that provide the same information, to the server over the primary control interface. The process for a certain interface can be facilitated by instead passing the serial number of a device's Network interface card (NIC), from which all physical capabilities could be determined from a manufacturer's specifications, or the client can report similar information using any number of encodings.

Clients may report to the server available wireless radios and addresses, local IP addresses, and any nearby or connected gateways (if known) along with this registration information to provide an initial configuration state of each interface in the central server's virtual representation of each interface.

A client's configuration state, initial or otherwise, refers to that client's actual configuration as opposed to its potential configuration.

At this point, clients may be required to provide a unique ID and/or a public encryption key with the server(s) 110 before the server registers them completely. This ID or key may be stored, e.g., on the device's SIM card, the handset, in read-only memory (ROM) or be entered as an account username and password by the user. When a client fails to report its identifier, an identifier may be assigned to the client for future communications or the server might reject the device's authentication. An additional exchange of control information may be exchanged between the client and the server as would be necessary to someone skilled in the art.

Phase 2—Standard Run

It is assumed that one or more clients connect asynchronously to the server 110 using the registration process described above and as clients connect, the server 110 performs the registration for each potential client separately from each previously registered client. The server 110 may limit or prioritize which clients may connect by selectively throttling the registration process based on device, security level, location, or any of the device metrics reported. Once clients have registered their interfaces are stored and maintained by the universal virtual representation of the network.

Server Run Loop

Figure 5A:
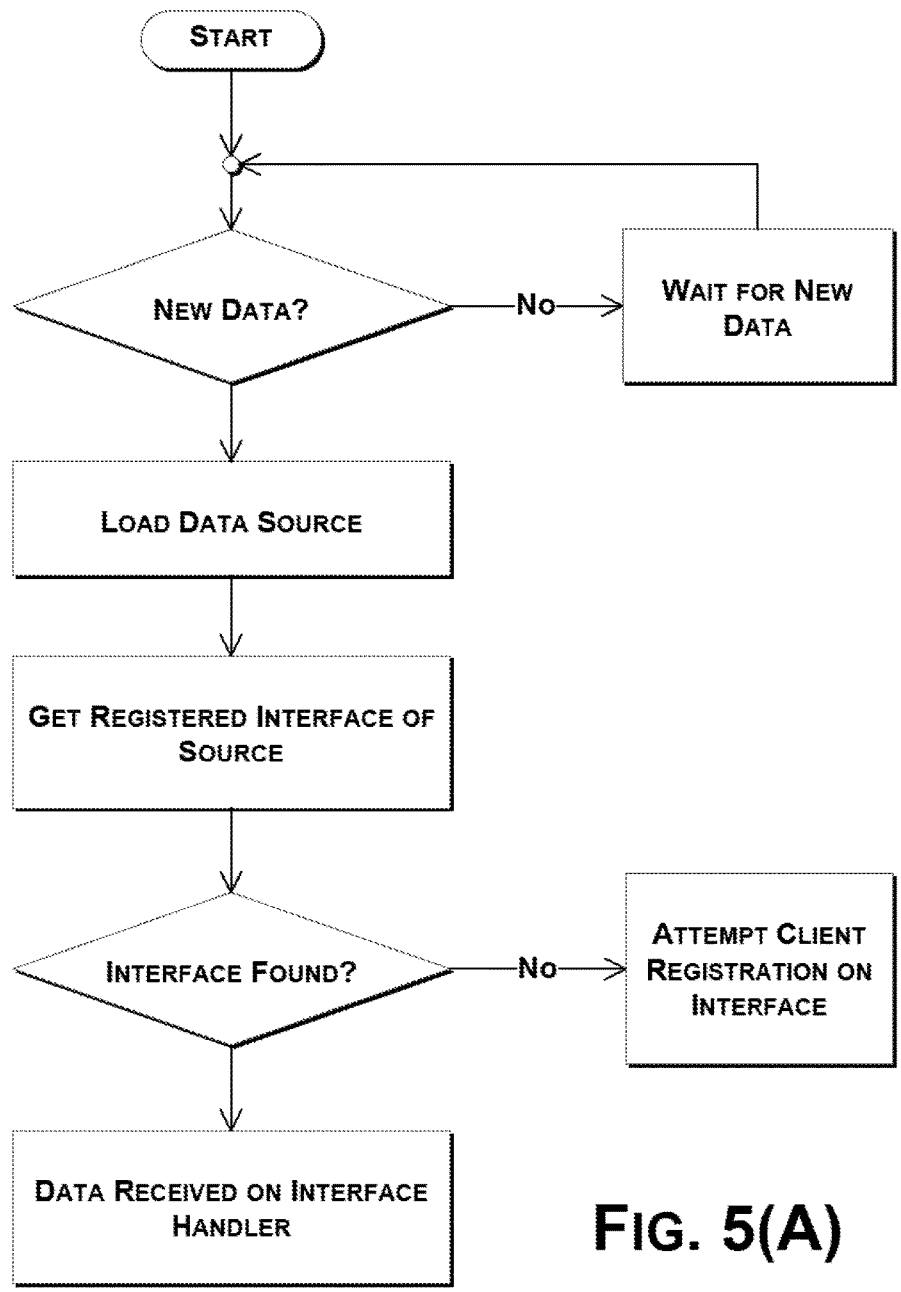

An exemplary run loop of a server 110 is outlined in the flowchart in FIG. 5(A). As noted above, as part of their startup, the central server(s) 110 begin hosting one or more listening interfaces for receiving data from clients. The central server constantly waits for new data requests from devices. Data requests from registered clients should include some information allowing the server(s) 110 to ascertain that the client interface is registered. An example of such information may be the source IP address or source MAC address of the data. When data is received, the source device reported in the data's packet's header is compared against the list of registered client interfaces in the virtual representation of the network.

Figure 5C:
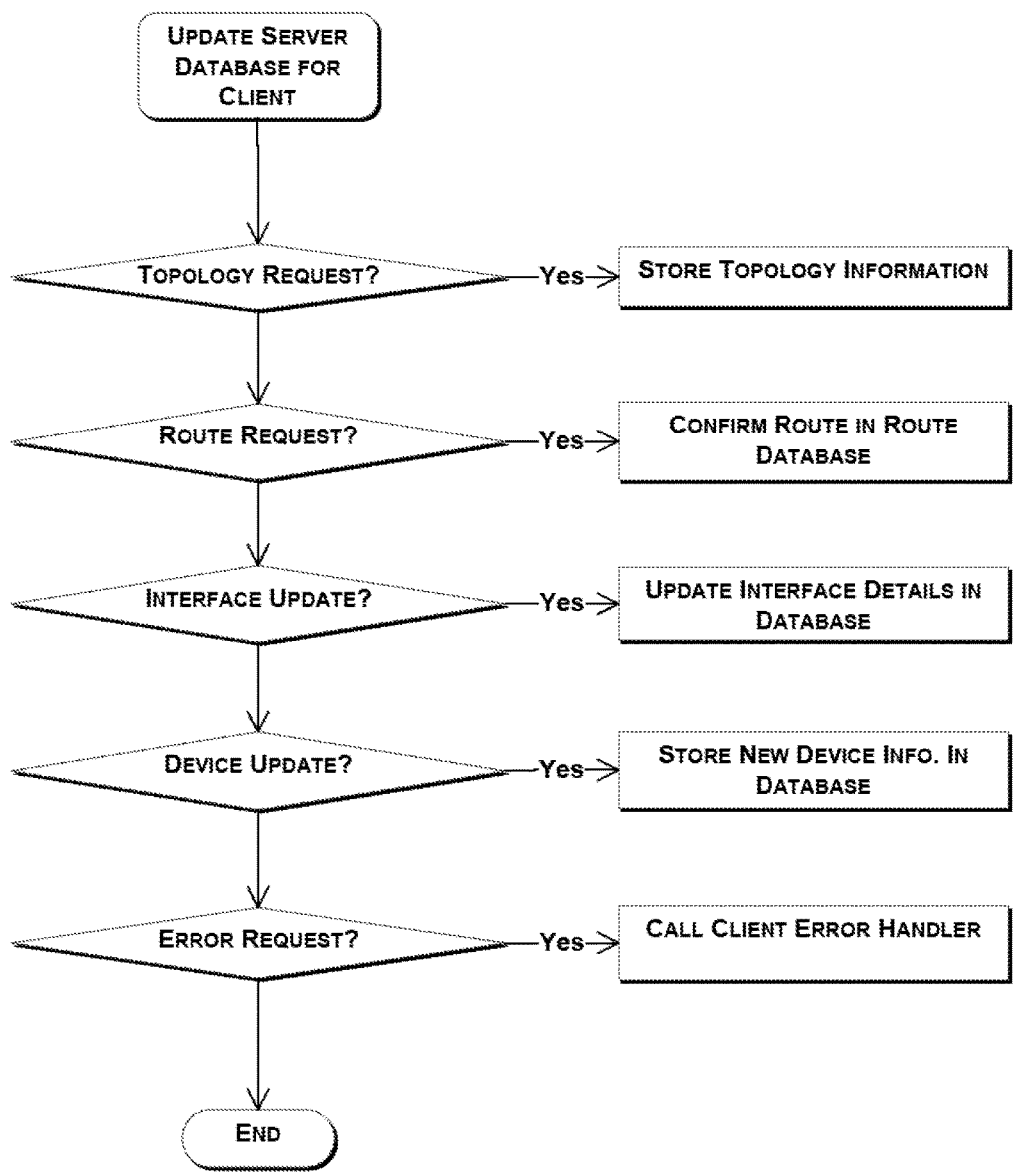

With reference now to the exemplary flowcharts in FIGS. 5(B)-5(C), if the interface is not registered in the server's virtual representation of the network, the server attempts to register the client. The process of registration may take any form and may require identification of the user, identification of the device, and other information. If the interface is registered to a particular client, the data is passed to the interface data handling process outlined in FIG. 5(C). In this handler, the registered client information is retrieved using the interface. The server first loads the registered client's information using the interface and validates the data request. If the data request is invalid, the server loads the client's direct downlink interface from the virtual representation of the network and sends an indication (e.g., a packet) that an invalid packet was received to that interface over the direct connection.

If the data packet is valid, the server determines from the data packet's type how to handle the incoming data. In a typical exemplary embodiment topology updates, path confirmations, interface updates, and devices updates use the information contained in the packet to update the server's databases, optionally request information from remote locations, and schedule computational work to be performed by the server such as path optimization and additional route solving.

Data Requests from Clients

The server 110 identifies the device 102 for which the requested data is destined. The server then queues the request and identifies the location of the requested data. The requested data may, e.g., be hosted on a remote server, hosted locally within the server, and/or hosted on a separate client device in the network. If the requested data is on a remote server, the server 110 retrieves the requested data. Once the server 110 receives the requested data, whether from a remote or local source, the server determines a route over which to send the requested data to the destination device. If the requested data is hosted on a client in the network, the server determines a route from the client hosting the requested data to the destination device. Those of ordinary skill in the art will realize and appreciate, upon reading this description, that this allows for the creation of secure subnets and enables a cloud-based content delivery network (CDN) using the cached information stored on devices in the network. It should be appreciated that the system may proactively store/cache data on devices in the network, thereby forming an active CDN.

The central facility also determines a schedule for each client to be processed in the virtual network and performs computational work for each client when needed. Typical exemplary embodiments hereof constantly check whether new routes generated as a result of neighboring device data requests need to be sent to a client and whether clients have responses to their requests queued from remote servers.

Creating Unified View of Network

A unified view of the entire network topology is created as follows:

1) Each device determines the other device(s) from which it can receive packets. Broadcasted packets have information of both where (i.e., which device) a packet is coming from and for whom it is intended, either for relay or consumption. Therefore, regardless of whom the packet is intended for, devices that receive a packet can record which other devices they can hear at a given time. As should be appreciated, a particular device may be able to hear and to receive packets from other devices that are not clients of the system.

2) Each device sends to the central server(s) a list of devices it can hear and the time a packet was received from those devices. For devices without a direct connection to a gateway, it will have to use decentralized or other protocols so they can be connected to a pseudo-gateway through a direct connection to a pseudo-gateway or though a chain of other devices which are connected to a pseudo-gateway 3) The central server compiles all the individual topology maps to create a unified view. The central server matches the timestamp when the packet was received to the location of the broadcasting device to inform the historical topology map.

Optimize Active Paths

The server 110 may optimize the performance of each client's active transmission paths. By maintaining a unified view of the entire network topology, compiled through the aggregation of the individual topology of clients, the server may use algorithms that optimize the performance of the entire network. This may include optimizations that maximize flow and throughput, minimize transmission costs, minimize the amount of battery needed to complete transmissions, reduce congestion and collisions, reduce interference, and efficiently use available channels that can be used by clients, as indicated by their network interface cards and the number of available antennas, in an area. These optimizations may occur asynchronously in real time by monitoring active paths and reconfiguring these paths as new information, such as updates to the local topology, transmission costs, number of devices, and data demand change. Paths may also be replaced asynchronously when new or more optimal solutions become available.

The server may leverage local or remote databases to generate these optimizations. The server may include information such as current network data demand, client locations, and remote information such as cell tower locations, WiFi hotspot locations, and locations of other gateways when calculating the best route or routes over which to send data. For example, the server may query a cellular carrier's servers to obtain the local pricing information for transmissions in a given area at a given time.

Pre-Compute

Routes may be calculated by the central facility 104 in real-time as clients in the network make requests for data. Alternatively, in an effort to reduce latency, the central facility 104 may pre-compute routes based on the real-time topology of the network. Should a client or clients in the network request data, a pre-computed route determined suitable for transmission may then be chosen from the set of pre-computed routes. The pre-computation of routes may be scheduled/used to spread out demand for processing routes so as to so as to spread out demand for processing routes such that if there is a sudden deluge of requests for routes with limited processing capacity, requests serviceable with a suitable pre-computed route(s) can reduce the demand placed on the server. As will be appreciated, while the system may not actually prevent a sudden deluge of route requests from coming into the server, the system can prepare for such cases by having one or more pre-computed routes readily available for incoming requests. In this manner the system may avoid request experiencing excess latency while a routing request queue forms. Pre-computation may also be good for reducing latency. In cases where there is excess computing power, a sufficient route can be given faster without incurring any latency associated with processing. In cases where there is a queue of routing requests, having pre-computed routes and a historical transmission map can reduce the size of the queue. Pre-computed routes may also expire in a dynamic environment or, in an effort to reduce operating costs, may only need to be done when the server detects an unacceptable latency for one or more clients.

Data may be queued on the server(s) to be sent to clients. Queued data are preferably sent in real time, but may be delayed as a result of server limits. Queued data are preferably sent to each client over a solved route. Solved routes may utilize a direct downlink (e.g. sending the packet over a direct cellular or WiFi connection), an indirect downlink (e.g., sending the packet over the peer to peer part of the network), or both simultaneously.

Client Run Loop

Figure 5D:
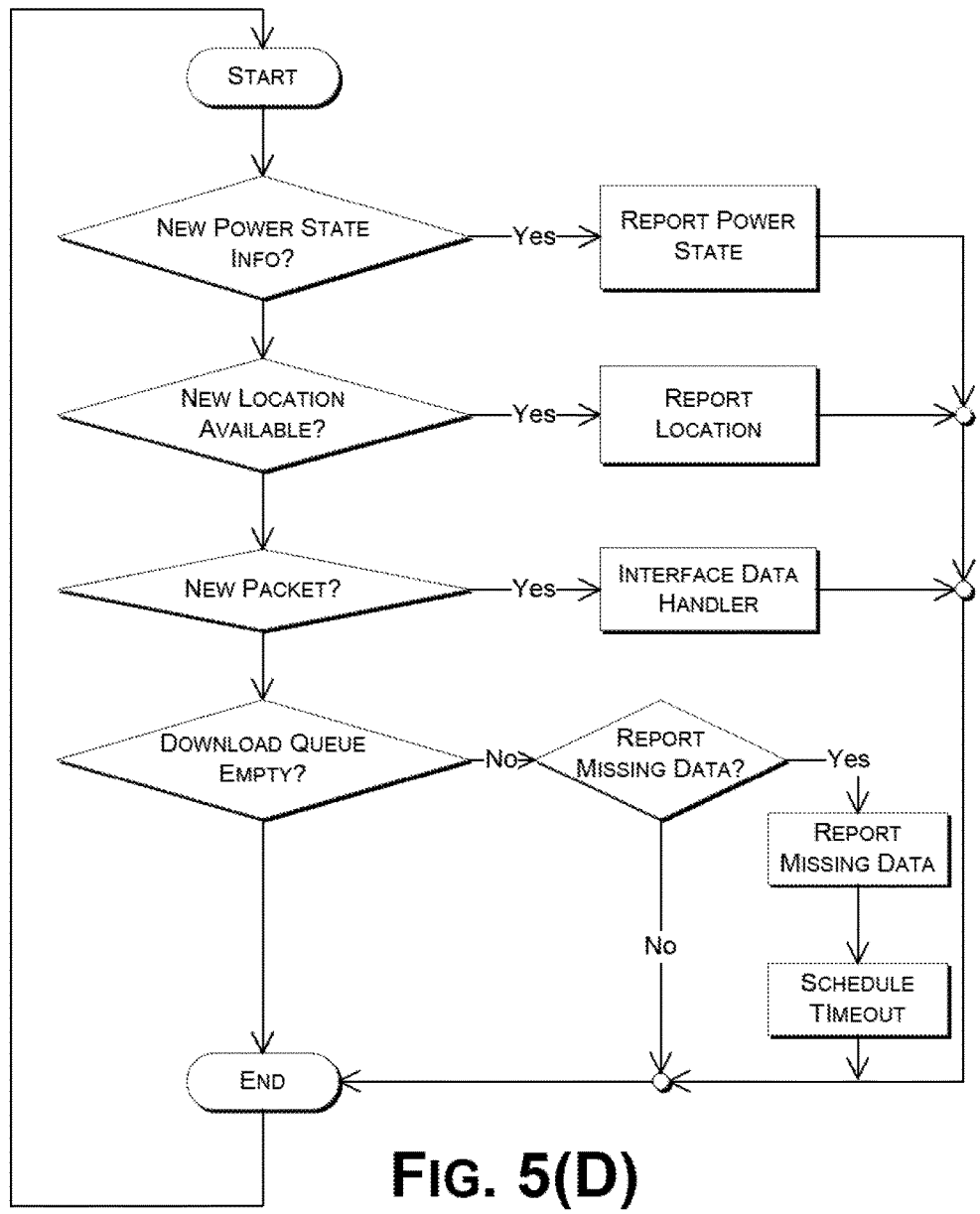

Devices that have completed registration with the central server(s) 110 become clients of the central server(s). The client software executes operations according to the procedure shown in FIG. 5(D).

Requesting Data

A registered client requests data over a direct uplink interface that was registered with the central server 110. Data requests may originate in the client software, the device's operating system or the device's user interface. A typical example would be a mobile phone opening a web browser and attempting to load a webpage.

A device (or client) without a direct uplink to the server(s) 110 may be referred to herein as a decentralized device or client. These devices without a direct uplink are considered decentralized because their transmissions cannot be directly coordinated by the central facility 104. A set of decentralized devices or clients may form a decentralized subnetwork.

Requests from decentralized devices/clients in decentralized sub-network may be routed using the decentralized sub-network to a pseudo-gateway having a direct uplink connection to the server(s) 110, e.g., using decentralized transmission protocols such as BATMAN, OLSR, and the like. The pseudo-gateway may then forward these requests to the server(s) 110.

When such a request occurs, the client software intercepts the outgoing data request from device's kernel or the user-space application and routes the data request through the client software. The client software identifies the primary or optimal direct interface and routes the data request to the central server over the direct interface using any routing instructions provided by the server for requesting data on that interface.

Fetch Request (on the Server from a Remote Entity)

In presently preferred embodiments data requests are routed over a direct uplink to the Internet. Requests are relayed to the central facility 104, preferably via the Internet. The server 110 may provide a default uplink route to each client in the network to coordinate this uplink, or clients may use the primary registered direct interface as a direct uplink to route their data requests.

In some cases the central facility may determine that, rather than having the requesting client upload the data via a direct uplink connection, that it would be more optimal to upload the data or data request over an indirect path. Examples of such cases include where a client is attempting to upload a large file, or where there is significant congestion on the uplink channel, or for other reasons. In such cases, the central facility may determine an indirect uplink path that the uploading client could use to route the data. In preferred embodiments hereof, these routing instructions may be sent to the uploading client via a direct downlink, though, alternatively, these routing instructions could be communicated over an indirect path.

Regardless of whether it is more or less efficient than uploading data over a direct uplink, an uploading client may request that the server send a route (e.g., path, channel, timing, range, etc.) such that it can upload the data over an indirect connection. Such a request may be made if the client desires to create a secure sub-network transmission such that the uploaded data need not be received by and processed through the central server(s) 110.

Figure 5E:
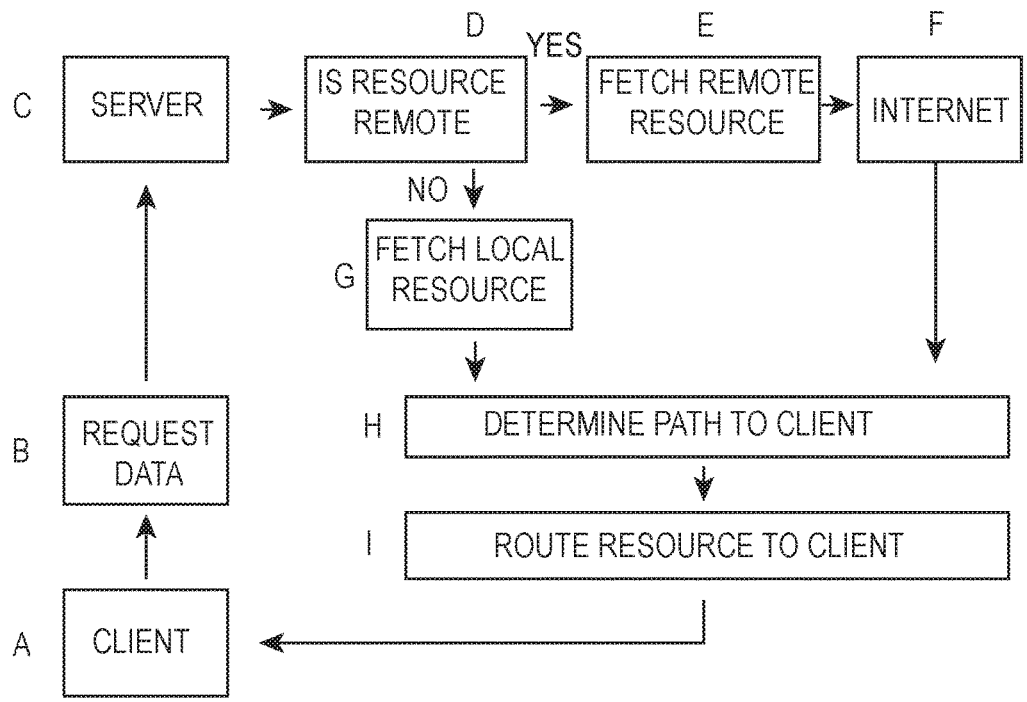

FIG. 5(E) shows a typical workflow in the server 110 when clients in the network request data (e.g., a resource). The resource may be or comprise or represent any kind of data, and the system is not limited by the kind of resource or data or what the resource or data may represent. Examples of resources include, without limitation, web pages, images, videos, text, audio, and the like. Resources may be static or dynamic (e.g., generated on the fly for each particular request). Resources may include streaming resources (e.g., streaming audio and/or video content). The server determines whether the targeted destination or resource is local, remote, or another registered client. If the request is remote, the resource is fetched using the Internet or another available connection to the remote resource. If the resource is local, the server fetches the resource locally. If the intended recipient is also a client, the server may establish upload routes and perform a request to retrieve the requested data from the target client.

In some cases, for example when multiple clients request the same resource, the server may cache that information locally to try to avoid a series of remote downloads of the information. For example, if a resource becomes very popular, the system may push out many copies to devices that have a direct connection to a gateway, such as a WiFi hotspot. Then, if another device not near the device that has cached that information requests that resource, the central server can inform that caching device to send it to the requesting device. The server may also establish a connection with a content provider (e.g., content source 114) in order to efficiently service a number of clients. Such a system might be that of a provider of video content from which multiple clients stream data simultaneously.

Providing a Remote Server with Route/Path/Device Information to Adjust the Data

In some cases multiple requesting devices 102 may each request a streaming resource such as a video from a remote content provider/server (e.g., a content source 114 such as Netflix or the like). The central server 110 may provide the remote content provider with information about the network. This information might include the clients' locations, their capabilities, or synchronization information. The server 110 may also provide the results of routing calculations such as the probability of a successful route, and how information is being transmitted. The remote server may use this information to determine what content is provided to the routing server. When streaming video for example, the routing server may communicate the congestion on the network, and the remote content provider can provide a lower bit rate video stream midway through the transfer. Changing the bitrate (or providing a lower bit rate video) during transfer proves useful when the server detects a high error rate environment, the client is about to do a handoff, or the latency of a connection is poor, switching to a lower bitrate stream allows the system to maintain the streaming video without forcing a disconnection or frame loss of the video.

Virtual Subnets

There may be situations where clients wish to exchange data directly with one another. A first client may request a resource stored on the second client, a first client may want to open a communications tunnel with another client, or the clients may wish to exchange data securely and/or anonymously with one another. A client may also request a resource from the server without having knowledge of where the resource is located. In any of these scenarios, the server may be used to facilitate the process of creating a virtual sub-network between one or more clients, locating the requested resource, and providing a requested resource from another device in the network to the requesting client. One benefit for utilizing the server to create the virtual sub-networks allows devices excluded from the virtual sub-network to securely route data for other devices in the secure network. Scheduling the peer-to-peer transmissions with the server also mitigates interference issues that could arise when peer-to-peer transmissions co-exist with gateway-to-device or gateway-to-multi-hop network transmissions. Finally, the server's topology map provides a secure and anonymous way for devices to discover other devices and their resources. Here the server performs as a connection facilitator for devices, optionally handling the security, path routing, and error resolution.

One application for this procedure occurs when a first client requests a resource (such as an image, video, file, etc.)

and the central facility 104 may query a second client for access to the requested resource. The central server may then generate a path from the resource to the requesting client using the current topology map. In some situations, the path may route data through one or more gateways, through one or more clients, and optionally through the server. If preferred by the devices, their users, or the topology map, the server generates a path that prevents data from traveling over the Internet or through the server. Doing so may increase the privacy of the transmission and reduce latency of the round trip. Additionally, if the requested resource is large, avoiding a congested direct uplink by routing the information through a peer-to-peer network may improve performance of the local network.

A second application for this procedure involves real-time user generated content in a mobile environment. Clients may generate live video streams, take pictures, take part in a voice call, or take part in a common activity such as a video game. In such situations, the server may join these devices into a virtual sub-network such that data can be streamed between clients in the virtual sub-network, bypassing the server(s). There is no requirement for the first client and the second client to be physically near each other. The only requirement for establishing communication between two or more clients in the network is that a route can be created such that the requested resource can be transmitted.

To generate and maintain these virtual sub-networks, the server utilizes the topology map and its active communication paths to clients. When clients request to join, create, or leave virtual sub-networks, the server maintains the state of each virtual sub-network and the clients belonging to each network in one or more databases. Routes between client devices are maintained as transmission paths and scheduled alongside other active paths in the network. Clients utilize transmission paths provided by the server when transmitting data to other clients in the virtual sub-network. Clients excluded from the virtual sub-network may be included in the transmission route that connects the virtual sub-network. When the transmission route includes devices that are not members of the virtual sub-network, data sent in the virtual sub-network may be encrypted such that only members of the virtual sub-network may decrypt the data.

When security of transmissions is requested or required, the server may facilitate the exchange of encryption keys between clients to secure the communication. Alternatively, the server may function like a VPN for both clients, and route data between clients as if they were part of a shared VPN.

When anonymity of transmissions is requested or required, the server may only provide local paths such that data never travels through the Internet. As used here, "anonymity" refers to some degree of anonymity of the clients and/or the data they send or receive. Alternatively, for example when devices are not physically located near one another, the server may provide paths anonymously through the Internet such that the data never passes through the server.

Any time a client requests to join, leave, create, or modify the parameters of a virtual sub-network, the server may choose to allow or disallow the modification to the network. The server may mediate an exchange of information between the client device and the virtual sub-network as well. A typical example of this would be requiring the user of a device to type in a password before joining the virtual sub-network. As another example, not requiring user intervention, the server can ask a client to cryptographically sign a message. This password and additional metadata from the request may be provided to the server where it can authenticate the user. The server may optionally report errors or confirmation messages to devices to indicate the success or failure of certain operations.

In forming and joining virtual sub-networks, the server may provide devices with information from the universal topology map to aid in the process. This may help with the discovery of nearby devices. Here when devices are out of transmission range of the searching device, and a path exists through other clients back to that device, the server may notify the searching device of the existence of another device that is reachable through other device.

Outgoing Data Queue

Data received from a remote resource may be incomplete, may be part of a larger data stream, or may need to be fetched in its entirety. For at least these reasons, the server 110 maintains an output queue to such clients. When new data is destined for a client the data is inserted into the data queue. When a new path is solved, a certain amount of data as determined by the packet size in the path is removed from the buffer, the data packet is scheduled to be sent to the client, and the next item in the queue is moved to the front of the queue position.

By extension of the capabilities of the client buffer discussed above, when new data is received from a remote resource, a new path is solved, or when resending data after an incomplete transfer, it is possible to modify the data with updated routing information or transmission parameters and insert the information back into the buffer. This allows the central server to re-prioritize the buffered data. For example, when a new gateway becomes available and a new path is solved using that gateway, the packet size of each transmission may be increased. The server may reorganize the client's buffer to accommodate this new packet size. Similarly, the server may determine that, while transmitting, the quality of the connection between two devices has increased or that two devices that formerly could not communicate are now capable of communicating. This change in network topology may cause the server to modify the transmission route as to optimize network flow.

Path Solving

The central facility 104 preferably uses its virtual interface map to determine the unidirectional signal strength and/or link quality between any two interfaces (e.g. WiFi, cell, etc.) in the network. The central server 100 routinely determines the quality of communication between any two interfaces by measuring or otherwise determining signal strength, link quality, number of connections to other devices, available channels, broadcast range, spectrum usage, monetary cost of transmissions, estimated battery expended to complete the transmission, and other metrics. By aggregating the quality of connections and creating a connected graph that only includes connections that are determined to be above a threshold, the central server can run routing algorithms, to optimize transmissions across the virtual network that can be used to inform routing decisions. Because the central server has a record of all previous communication across the network as well as communication that is queued or presently happening, the server can determine the optimal downlink and uplink paths available for any transmission. The central server computes and maintains a record of occupied links at specific times and over which channels.

Multi-hop paths are calculated and distributed using the central server's virtual representation of the network. In some cases the full path is never transmitted inside the mesh network and exists only in the server's virtual representation of the network. This would be the case where routing instructions are relayed to each device in the transmission path over a direct connection (likely cellular). In cases where devices receive routing instructions through an indirect path, devices will generally know the entire routing path.

Algorithms are used selectively for managing and searching the virtual representation of the network. Exemplary search algorithms that may be used to make routing decisions include, but are not limited to: time-varying greedy algorithm, time-varying minimum battery consumption, time-varying minimum hops, time-varying minimum spectrum use, time-varying maximum flow, time-varying fast path, time-varying minimum transmission cost, and time-varying maximum reliability. In some embodiments the routing algorithms may be configured to favor devices that are plugged into an electrical socket, have high levels of remaining battery power, etc.

In some embodiments the central facility may track how much data has been passed through each client relative to how much data each client has requested and received. The central facility may route data so as to favor routing data through devices that have requested more data than they have passed for other devices. Devices that have passed more data on behalf of other devices than they have received may be given priority transmission status, free transmissions, or a credit in the system that can be redeemed.

In some embodiments the system may reward users for passing data for others. These rewards may be in terms of money or credits to receive additional data. This would encourage entrepreneurs to build out a wireless transmission network over which the system can route data.

Multiple routing algorithms may be used as algorithms that can be optimized for certain situations. For instance, algorithms used for routing data among clients in densely occupied areas, such as sport stadiums and the like, may be substantially different than algorithms used to route information in sparsely occupied areas. In the former case, specialized algorithms may emphasize total network throughput while, in the latter case, specialized algorithms may emphasize universal connectivity.

The central server 110 may determine whether it is faster to send data over direct uplink and/or downlink connections or indirectly through the peer-to-peer network of clients. Both systems may work in conjunction when creating a route to deliver a single resource. Preferred embodiments hereof is meant to be additive to existing wireless networks. The operator of the central facility may choose to only send information over an indirect method (i.e. over the peer-to-peer part of the network) when it is faster, more secure, more efficient, or otherwise better than other methods.

Multi-Gateway

Figure 6A:
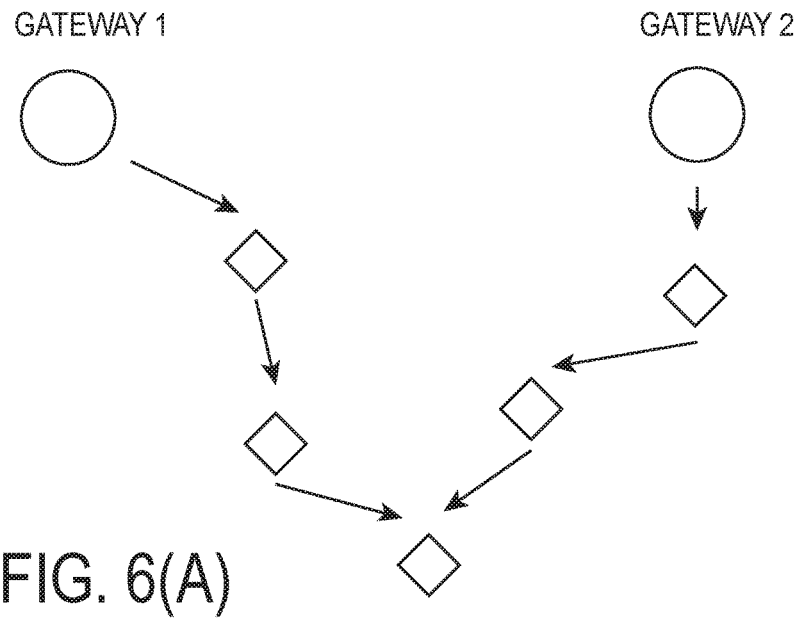
FIGS. 6(A)-6(X) and 7 depict aspects of operation of according to exemplary embodiments hereof.

As shown in FIG. 6(A), the central server may decide to use multiple gateways, which may be of different or the same type (e.g. one cellular gateway and one WiFi gateway or two WiFi gateways) to send out the requested resource or when calculating a route that a client should use to upload a resource. If the server chooses to use multiple gateways, then the server will appropriately divide the resource and send the designated part(s) to each of the gateways and separate routing instructions to each device involved in each path.

Single-Gateway Multi-Node Transmissions

Figure 6B:
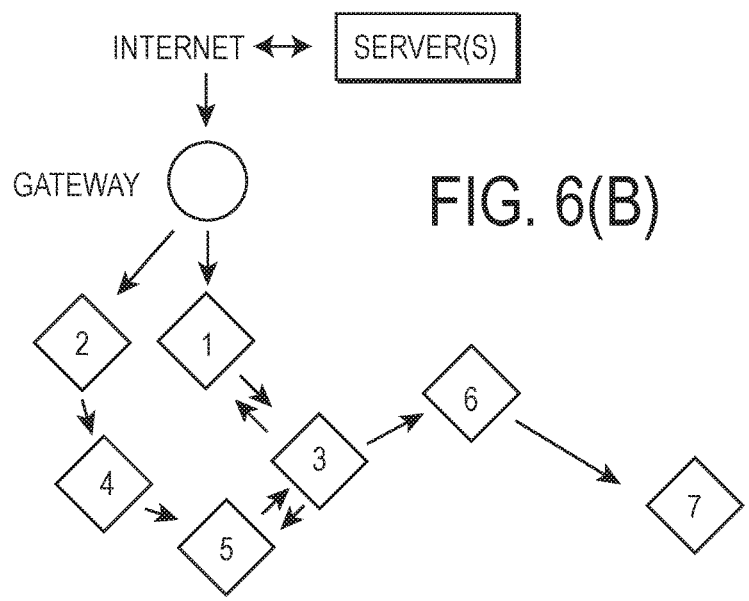

In some cases a gateway may have two or more devices directly connected to it. The gateway may send out a divided resource to connected devices as determined by the server where the parts of the resource are relayed to the destination client. For example, as shown in FIG. 6(B), the gateway is connected to clients 1 and 2. Suppose a resource is destined for one of clients 3, 6, or 7. The gateway (based on server instructions) may send parts of the resource via client 1 (via path «1, 3, etc.»), and parts of the resource via client 2 (via path «2, 4, 5, 3, etc.»). This approach is useful when the gateway has higher throughput capabilities than any single connected node, which may be due to many different issues including but not limited to connection strength, number of antennas, etc. As should be appreciated, the gateway may use different protocols for its connections and interactions with clients 1 and 2.

Multi-Gateway, Multi-Node

In the general case, a transmission from the server(s) to a client may use multiple gateways and multiple nodes. That is, a transmission may use any combination of the multi-gateway/multi-node transmissions. An example of this is shown in FIG. 6(E), in which a path to client 7 may simultaneously use gateways G1 and G2 (multi-gateway), where gateway G1 may simultaneously use paths «1, 3, 6, 7» and «2, 4, 5, 3, 6, 7».

Transmission History—Optimizing Data Flows for Given Metrics

The server may continuously monitor metrics related to each individual client in real-time and record the transmission history associated with each client in the network. Such metrics may include, but are not limited to, a client's location, the other clients from which a client can receive data, the available network interfaces on the client, the number of available antennas, the channels that a client can send or receive data on, and the remaining battery in both kilojoules remaining and the estimated operational time remaining. The recorded transmission history may include but is not limited to, the amount of battery consumed passing data for other clients, and the amount of battery other clients have consumed passing data for an individual client, past successfully received transmissions, and past successfully sent transmissions. The server may use these metrics and transmission history to determine efficient and reliable transmission routes between clients in the network.

Additionally, the server 110 may compile a history of successful and unsuccessful transfers between devices. Such a history can provide useful additional information when computing and pre-computing routes.

To determine how the data should be sent to the client, the server computes routes from the source of the data, typically the central server, to the destination and estimates the speed, reliability, resource demands and other factors that different routes would consume. The server weighs all these factors and determines the best route or routes over which the resource should be sent.

While transmission history is important for each device in the network, another view of transmission history is not by each device, but by each point traversed in the network.

The central server may consider the topology map as a set of points. When devices are located at a point, the central server records the metrics of the transmissions at that point across many devices. Accordingly, after the central server has built an adequate historical topology map, it can have a good understanding of the topology of the network simply by knowing the locations of devices in the network. When the central server makes routing decisions using the historical topology map and a device(s) location, this means that there is less traffic in the network as devices do not need to ping nearby devices as often and devices' battery life is increased as their radios can be off for longer periods of time. This kind of historical topology map is very useful when pre-computing routes.

Example

FIG. 6(B) shows an example multi hop network coordinated by the server through a gateway. It is assumed each client has a direct uplink and downlink connection back to the server that is not shown in the diagram. In this example the physical network consists of 7 clients numbered 1 through 7 in a certain physical area. The topology information reported to the server allows the server to compile a map of the network combining the physical locations of the clients and which clients are able to receive transmissions from other clients.

An exemplary approach by the server is as follows:
1. The server creates a virtual representation of this network.
2. The server identifies all the gateways within a certain distance from the requesting client, expanding the gateway search radius until there is at least one gateway.
3. For each gateway found inside the gateway search radius, the server uses multiple routing algorithms, including but not limited to the greedy algorithm, time varying maximum flow, time varying minimum battery life consumed, time varying fast path, time varying minimum transmission cost, time varying minimum spectrum used, time varying fewest hops, time-varying maximum reliability, etc., to determine a route or routes from the gateway to the destination client.
4. The server assigns channel and timing instructions to each transmission.
5. Using these channel assignments and timing instructions, the server estimates the speed that any download will complete.
6. As soon as one route has an estimated speed above a certain threshold, normally the speed that could be achieved using a direct downlink, the server chooses that route and sends out the information of the selected route.
7. If no route using that gateway can be found or no route using that gateway can be found that is faster than the threshold and/or exceeds other predetermined metrics such as transmission cost, reliability or security, the gateway search range expands. If the server cannot find a route that completes faster than a direct downlink within a certain time, the server may choose to send the data over the direct downlink. In some embodiments devices may instruct the central server of no-compromise conditions that a selected route must have. For example, a device may only want to receive data if the transmission is free and may otherwise wait indefinitely until such a condition can be met. In such as case, the central server may stop processing the request after a certain amount of time searching. In such a case, the device may continue to make requests to the central server, but the central server may only reconsider such a request after a certain amount of time past the initial request. A person of ordinary skill in the art will appreciate that no-compromise conditions can be applied when a client is making an upload or data request. For example, a client with both a cellular and a WiFi interface may choose not to make a direct connection with the central server over the cellular connection if the cellular connection is expensive. The client may wait until it can establish a decentralized connection to a pseudo-gateway, which may be less expensive. However, the client may choose to create a direct connection using the cellular interface if it has not connected to the server or Internet after a certain period of time (e.g. 24 hours) or if a more urgent request must be sent.

For a given request, e.g., in reference to the network in FIG. 6(B), one list of potential routes that the server could compute might be that of Table 1 (FIG. 6(C)).

End of Example

Using this generalized routing method, the server may use a number of metrics, routing algorithms, and thresholds to route each data packet appropriately. Additionally, once a path is chosen, the server may continue to calculate other routes that take into consideration the resources used in previously determined routes to create supplementary routes to reduce the total transmission time.

In the present invention, there are two categories of route types, direct and indirect. Direct routes are those that complete by having requested data be sent via a direct downlink from a gateway to the destination device. Indirect routes are those that complete by routing requested data to gateways that send the requested data to relay devices that use connections with other devices to relay the information to the destination device.

Multiple "Gateway" Path Virtualization

Synthetic path types are also possible solutions when generating paths from the virtual representation of the network and require special attention. Synthetic paths use combinations of paths to produce a new path. Paths may incorporate multiple gateways simultaneously to increase the robustness of the transmission. A second synthetic path might involve multiple clients relaying data to a single client to increase the robustness of the transmissions. Finally, linear combinations of the described path types listed may also represent synthetic paths. This might include a multiple gateway path and a direct connection simultaneously.

Send to Multiple Neighbors Directly, then Send to Destination

Figure 6D:
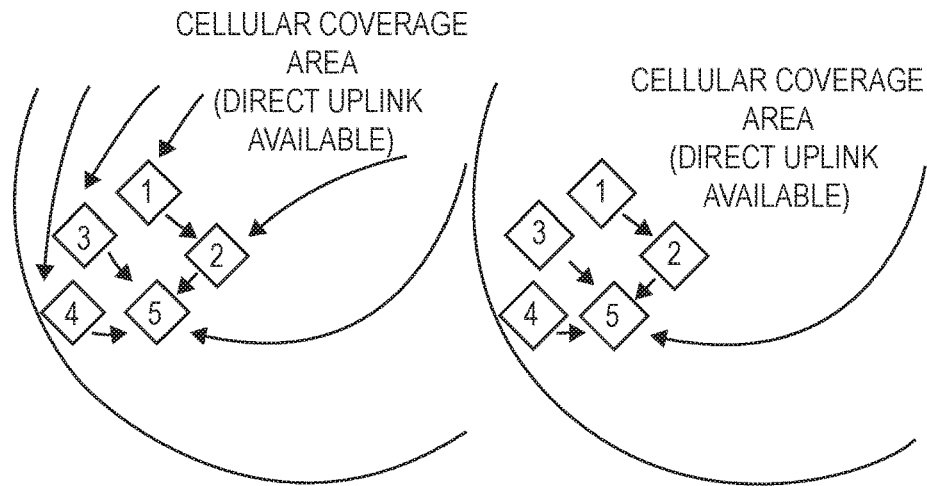
Figure 6E:
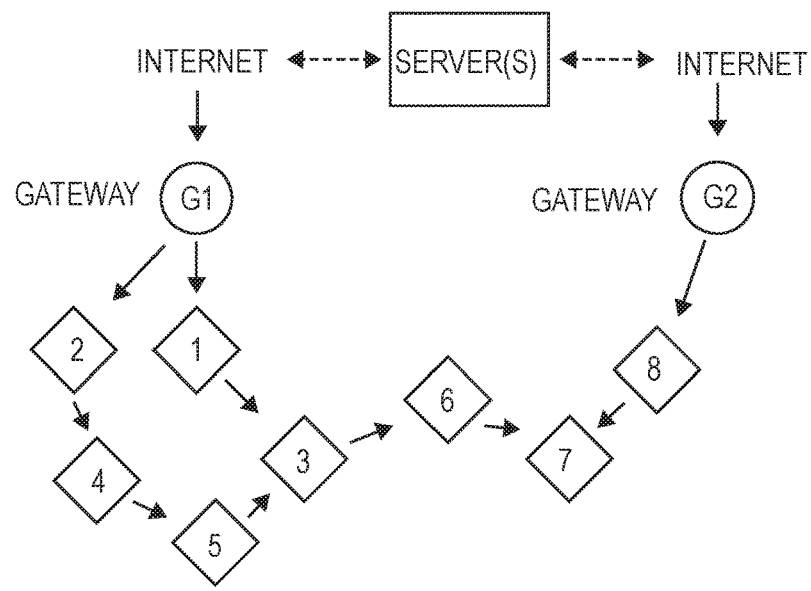

In some exemplary embodiments hereof, the server may determine that it is "best" to divide a given resource or stream destined for a single client, such as a file or stream, and send it to all neighboring clients around the client using one or more direct downlinks, when possible (as shown in FIG. 6(D)). This may be because an individual device has a poor or non-existent direct connection to the central server, or may be chosen to decrease the latency of a particular download. After the neighboring devices have received the resource or fractions thereof, each device can send the data to client (1) at the appropriate time by using a different transmission standard than it uses to receive the data over the direct downlink. The server may choose this routing scheme as it may reduce the total transmission time and increase total network throughput.

For example, if the requesting client, client (1), and its neighbors have multiple network interfaces with different ranges, data can be transmitted more quickly if all interfaces are employed simultaneously. For example, if client (1) has both a cell radio and a WiFi radio, part of the requested resource can be sent directly to client (1) over the direct downlink and the other part of the requested resource could be sent to client (1)'s neighbors over the direct downlink. Client (1)'s neighbors could then send the requested resource to client (1) over the shorter•range WiFi standard while client (1) simultaneously receives information from direct downlink. This would employ both network interfaces and reduce the total transmission time.

This scenario could also happen if the system determines there is momentary excess capacity in the system. By reducing total transmission time, not only does the download complete faster from the viewpoint of the destination client, but the network also benefits as total network throughput increases. Transmissions do not continue to use network resources that may suddenly be better used in another transmission.

Linear Combinations, Routes that Change with Time, and Protocol/Network Interface Handoffs (e.g., Start on Cellular and Transition to WiFi)

If a single gateway has the ability to make multiple simultaneous transmissions without experiencing significant transmission degradation, the server may determine that it is fastest or otherwise most efficient to send part of the requested resource to the first client over a direct downlink connection and have the remaining data simultaneously sent to the requesting client using peer-to-peer connections.

Using the method above, the central server 110 may substantially guarantee a certain quality of service to all clients. In a typical embodiment the server will first send a stream of data packets over a direct downlink to the client such as a cellular connection. This ensures a weakly dominant latency with any existing system, provided all network interfaces are registered with the server because the server will first choose the lowest latency path that is a direct connection. Over time, paths are continuously optimized, and other paths that are cheaper, fasters, and have acceptable latency can be more heavily used throughout the course of a download. The primary use case for this is when a video might start downloading over low-latency LTE to provide a good user experience, and the rest of the video will reach the requesting device through less expensive but higher latency WiFi gateway-sourced multi-hop network(s). As used herein, the term "handoff" refers to a process of maintaining a connection while switching interfaces (e.g., WiFi to cellular or vice versa).

The server also has the option to send data from both gateways over multiple paths. For example, in FIG. 6(E), client 7 may simultaneously receive packets from the same stream from gateway G1 over path [1, 3, 6, 7] and from gateway G2 over path [8,7].

When the server determines the clients included in a path, the transmission time across each link, the channels used, and the interface(s) that each client should use to send and receive data, the server sends critical routing information about sending and receiving transmissions to each client in the path over a direct downlink. These instructions may include but are not limited to, the time window in which they should expect to receive data, the channel on which they will receive data, the channel on which they should send data, the time window within which they should send data, the network interface card they should use for the transfer, the amount of power they should use to broadcast the data (when applicable), an updated identifier for the packet, the information identifying the next client in the transmission path, the protocol used to send the data, the hardware or antennas to transmit the data through, encryption keys, and other important transmission metrics.

Each client chosen by the server to be in the transmission path is informed they are part of a transmission route by the server via a direct downlink and is given transmission instructions on how to route data in the network. Alternatively, devices might receive instructions from the server indirectly through a mesh connection. In this scenario, devices may know the entire transmission route.

Sending Data to Clients

Buffered Send

Clients may make multiple requests to the server before the server can satisfy these requests. This can occur for instance when a remote server is backlogged and does not provide requested information before the client requests more information. A data buffer that the server maintains for each registered client can solve this problem. When information must be routed back to a client, the server will similarly add the information to an output buffer for the client. The server may also store the location and length of the data to be transmitted, should the server need to re-calculate the path before the information is sent from the server.

Figure 6F:
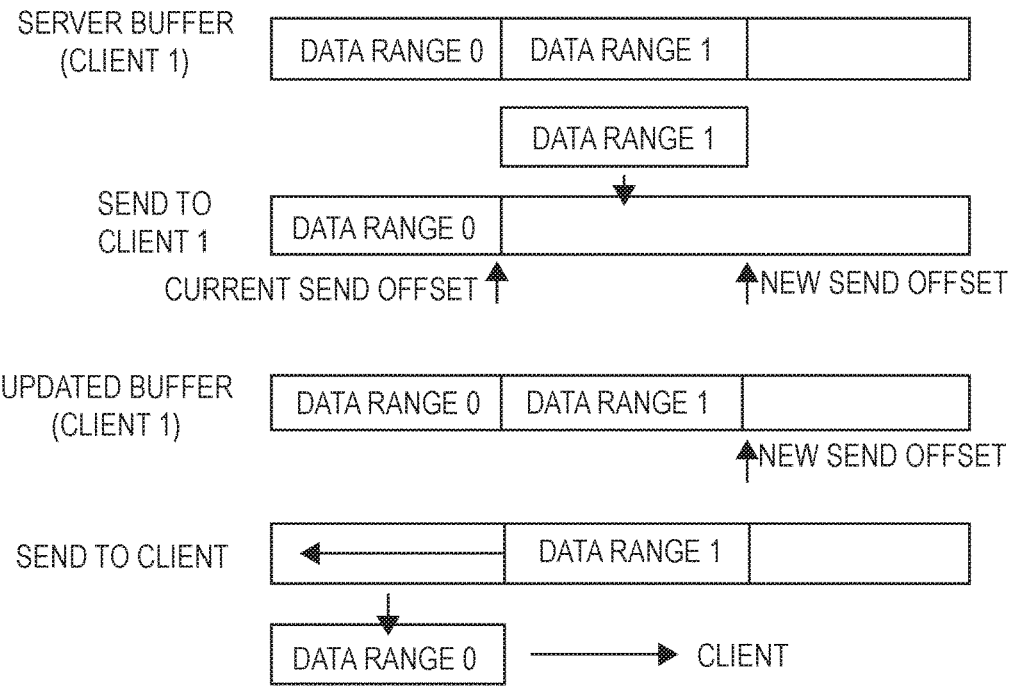

For example, as shown in FIG. 6(F), the server may maintain an output queue to client (1). When new data is destined for client (1), the data is inserted into the data queue. When a new path is solved, the data is removed from the buffer, the data is sent to the client, and the next item in the queue is moved to the top position.

Before the buffered data is sent to the client, the server may modify information, in the queue, remove information, or re-order information as necessary. For instance, re-ordering the priority of outgoing information may occur when the network reports an error. In this case, the missing data would be prioritized over other queued traffic in the network. Modification of the data may occur when the header of the outgoing data contains a transmissions schedule that must be updated as a result of new topology information.

Encrypting Outgoing Data

An exemplary embodiment facilitates secure communications through the use of symmetric and asymmetric encryption. Should a requesting client device 102 in the network desire or require encrypted communications, the requesting client device 102 may generate an asymmetric key pair (e.g. using Pretty-Good-Privacy (PGP)) and may upload the public key to the central server 110. An encryption key or keys may be exchanged between the server and the client during the initial registration procedure outlined above. Alternatively, the keys may be exchanged when a change in security level is desired on a per-request basis. The requesting client device 102 may also receive the public key of the server 110. A symmetric key may be generated either on the server 110 or on the client requesting device 102 and such symmetric key can be transmitted to the other party by encrypting it with the public key of the other party and sending the encrypted information over a direct or indirect link.

Sending and Receiving Data in the Physical Network of Devices

The server 110 is able to communicate with one or more gateways 106 to reach the registered interfaces. A primary function of a gateway 106 in the context of the system 100 is to provide content from another network or sub-network (such as the wired Internet) to wireless clients, and vice versa. One example of a gateway 106 or network bridge is a standard WiFi router that connects a wired data line (e.g., as provided by an Internet Service Provider) to a wireless local area network (LAN). Alternatively, the gateway could immediately broadcast data directly from the server over its wireless radio to be received by wireless clients or according to a transmission schedule. A gateway 106 may use headers in the data provided by a server 110 to determine how to transmit the data (channel, rate, interface) and transmit using these settings, or it may use default standardized transmission methods such as LTE, HSPA, Zigbee, Ethernet or IP protocols before being received by a client. Typical embodiments hereof use IEEE 802.11 based WiFi routers running in access point mode (AP-Mode) to communicate with devices running in Station Mode (STA-Mode). A standard wireless router's software could be patched or upgraded to interpret new Ethernet, network, or transport layer packets from the server. These messages could include the wireless client, transmission information such as frequency and timing, or transmission power.

The gateway has two methods of transmitting data to the wireless clients. It may use its standard method of communication (such as a routing table for a WiFi router) for transmitting Internet traffic for communication. This would allow the wireless client to receive information from the server over a standard Internet connection and router setup. This system is backwards compatible with current networking standards in that the data transmitted from the server is encapsulated in standard Ethernet and Internet protocol packets, and is received as Internet traffic by the wireless client.

Clients Receiving (Raw) Data

Clients in the network may be passively listening for wireless packets on their wireless interfaces. In preferred embodiments hereof devices are passively listening for all transmitted data regardless of whether or not the device is the intended recipient of the data. This is done so that devices can determine their neighbors (i.e., neighboring devices), allowing any transmission from a device to serve both as a way to send data and as way determine unidirectional link quality to devices that are not the intended recipient. This can be enabled as non-standard functionality in most network interface cards (NICs) however it can be enabled through modifications to the firmware, software driver, or hardware. Some implementations provide readily available means for this functionality, such is the case with software-defined radios.

When clients receive data on their wireless radios, each of the clients' radios receives traffic in that particular frequency band or channel. Packets received s by the devices hardware are typically sent to the device's drivers and the networking stack. In preferred embodiments hereof, packets are passed to the client software module.

In preferred embodiments, data transmitted by each device is connection and protocol agnostic, just as the server's virtualization is connection agnostic. This means that multiple network interfaces, wireless standards, wireless protocols, or wireless frequencies can be used at any transmission along the path and may be handled using the same data routing operations. This is dissimilar to current (conventional) systems where network interface cards are specialized to perform packet detection and transmission for a particular packet type or protocol. In embodiments hereof, the client software makes multi-interface frame reception reconfigurable and dynamic. For example, in some embodiments hereof, the hardware may read the physical layer protocols (802.11, 3GPP, etc. for the WiFi and cellular interfaces as examples) then a software module may use reconfigurable Ethernet (layer 2), Network (layer 3) and Transport (layer 4) layer protocols depending on what raw packets come in from the hardware.

The same hardware can switch protocols based on the instructions from the central server.

A preferred embodiment hereof utilizes raw-frame monitoring and transmission functionality typically not implemented in WiFi NICs, their drivers, or the host operating system. Raw frame monitoring may provide useful metrics to the client software such as the frequency of acknowledgement ACK packets in a given area that could be reported to the server and used for determining an estimated device download speed density in a particular area.

If the protocol of the received packet were a connection-based protocol (such as TCP over WiFi) the receiving client would communicate bi-directionally with the gateway to complete the transfer of data.

Once the data has arrived, the client performs checks to determine the data integrity, if the packet is destined for itself, and how to route the packet. Data integrity can be verified using the typical method of check-summing the data contained in the packet and comparing the result to the packet's checksum. If the packet is destined for the first client, the headers added by the server are removed and the packet is passed to the client's network stack. The following pseudo code demonstrates how a client handles new data received on all wireless interfaces. This code may be implemented in software or as instructions on embedded hardware such as the wireless NIC.

Process Packet Pseudo Code

```
function InterfaceReceivedPacket(interface, packet) {
    TopologyNewPacket(packet);
    if (packetIsIncomplete(packet)) {
        // Packet is Malformed. Report to server and discard.
        ReportPacketFragment(interface, packet);
        return;
    }
    switch (packet.packetType) {
        case PACKET_TYPE_PATH: {
            AddPathAndReportConfirmation(packet.path);
            break;
        }
        case PACKET_TYPE_INTERFACE_COMMAND: {
            targetInterface =
InterfaceWithID(packet.targetInterface);
            InterfaceSendCommand(targetInterface, packet.command);
            break;
        }
        case PACKET_TYPE_LOCATION_UPDATE: {
            SetLocationParameters(packet.data);
            break;
        }
        case PACKET_TYPE_DATA: {
            RoutePacket(packet);
            break;
        }
    }
}
```

Reporting Packet Fragments, Incomplete Packet Errors

For connection-based protocols, or protocols with a defined packet structure such as 802.11 data and management frames or Ethernet frames, transmission errors may be reported to the server. These errors may be caused, e.g., by physical interference or from packet collisions. In the case of physical interference, the server may recognize a series of failed transmissions as physical interference, and remove the link from possible paths. If the errors persist as a result of packet collisions, the server may use a reliable connection to the interfering clients to modify transmission parameters. This might include changing the wireless radio, the transmission, or transmission rate. Errors reported to the server help inform the server's virtual network and path solutions about where error prone areas or devices in the network are located.

Clients Discovering Local Topology

When clients in the network report unidirectional transmission information to the server 110, the server may build a virtual map of all transmission possibilities that can be used to transfer data. As discussed above, there may be more than one unidirectional link or path between two clients, representing multiple network interfaces, channels, and/or transmission directions over which they could communicate. Two clients may each have one or more unidirectional links to the other, though this may not always be true.

To keep an accurate real-time map of all possible connections in the network, the server may instruct one or more clients to listen for broadcasts on one or more interfaces while simultaneously telling other clients to broadcast data on a specific interface(s). This method may also be used to improve limited or potentially outdated topology information, or to discover the topology in new areas.

In many cases location information will also be sent to the server from clients along with the topology information. This allows the server to record the location of where transmissions were received. Combining this information with the location of other known clients creates a more informed map of the entire network. The server can maintain a map of the network that can be used to improve routing decisions. The map may be based on historical and/or real-time data. The map may include a record of successful and unsuccessful transmissions, times and timing associated with those transmissions, and the locations of the communicating clients and interface(s) used to communicate. By aggregating these transmission records, the server can have an informed map of the real-time connections in the network simply by having devices in an area with a reliable historical map report their location. In addition to providing better routing decisions, the map can limit the amount clients must broadcast to determine topology and limit the amount of time clients must keep their interface cards powered to receive such packets, thereby conserving battery life of clients and reducing network congestion. When the central server determines that a local historical map is sufficiently detailed for the available interfaces of local clients that are within the bounds of the historical map, the central server can instruct clients to reduce the frequency clients broadcast at to determine topology. As clients continue to report their location to the central server, the central server can estimate the real-time topology of the local network and the connection strength between clients by combining the historical topology map with the real-time location of clients.

When a client is in decentralized mode, the central server may choose to send the client topology maps to help the decentralized client make better connection and routing decisions. For example, a topology map of the historical transmission record overlaid with a topology map listing the location, available interfaces, and encryption keys of present local devices may increase the client in decentralized mode's quality of service.

Clients may report the signal strength with which a packet was received from a neighboring client and other interface specific metrics such as the signal to noise ratio SNR of the transmission, the data-rate, transmit-rate, bandwidth, averages of these metrics, or other physical layer metrics. Cognitive radios and other "smart" radios may be able to report other useful metrics to the server such as available frequency bands or interference across bands. This information can be incorporated into a local topology database in the client software and in topology updates to the central server.

Clients Receiving Routes

In a typical embodiment, clients periodically receive route information from the central server over a direct downlink. However, routing information may also be sent to clients through an indirect link. The route information may include an identifier, a transmission interface from the set of the client's registered interfaces, an identifier for the next device to use when receiving a transmission, and transmission and/or scheduling instructions for routing data. Route instructions serve as dynamic and reconfigurable rules to allow devices to participate in multiple transmission paths simultaneously.

This path-based architecture also provides anonymity in data transmissions. The source and destination client in each transmission is only identified by the route identifier in a particular transmission.

Paths received from the server are stored in a local database inside the client software. Paths can be sorted and searched dynamically allowing devices to participate in multi-path transmissions without performing routing decisions on the device itself.

Clients Receiving Interface Operations

Periodically the central server may issue a control packet to a registered client that is intended to perform an operation on a specific interface. Such interface operations might include instructions to scan for interface gateways such as WiFi networks, power the interface's radio on or off, or change channel, frequency, bandwidth, listening address, create a WiFi direct group, join a WiFi direct group, or other operations. Different interfaces may respond to interface commands differently on a per-device, per-interface basis.

One typical use case for interface commands occurs when a client reports a corrupted transmission, possibly the result of interference produced from colliding packets. The server can determine a relaying client should increase its transmission power to improve the chances of a successful transmission. Alternatively the server could instruct an interfering client to lower its transmission power. This lower transmission power could be communicated as a new path if the device's hardware can throttle the transmit power with limited latency or as an asynchronous interface operation over the direct downlink before a command was issued. The same procedures could be used to change the channel or timing of transmissions to avoid packet collisions with other parts of the network.

Routing Packets

The client software handles data routing for all wireless interfaces of the client. A prototypical data routing function is that shown below:

```
function RoutePacket(packet) {
    route = 0;
    routeID = packet.id;
    route = routeWithID(routeID);
    if (!path && packet.headerContainsRoute) {
        path = RouteWithHeader(packet.header);
        store path
    }
    // Ignore packet without path
    if (route) {
        if (route.destination == self) {
            ReceivePacket(packet);
        } else {
            packet.id = route.nextRouteID;
            nextInterface = InterfaceWithRouteID(route.nextInterface);
            transmissionDetails = route.transmissionDetails;
            ScheduleTransmission(nextInterface, packet, transmissionDetails);
        }
    }
}
```

When the client software receives data, the route identifier in the header of the data received is compared against the local route database. If no path is found, the software will determine if the data itself contains routing instructions from the server, and will construct and store a local route representation using the header information.

Data received by any client in the network falls under one of three categories: data for self, data to be routed, and data for which the client should take no action. If no path is available, the packet is dropped, as would be the case when a device receives data from a device where the data has already reached the destination node. The client should not take further action routing the packet to a destination.

Packets to be Routed

Because the route for a given data packet has been predetermined by the central server, when data is received by a client that is not intended for the client itself, but a path is available in the path list, the packet will be retransmitted according to the transmission and/or scheduling details contained in the path. It should be noted that paths might be reused so a single path instruction from the server could service thousands of data packets at any time. The server determines the expiration time for each route in the network and under what conditions it is valid and maintains that information in its virtual representation of the network. This information is also transmitted as control information to clients when necessary.

Packets for Self

A third routing possibility is that a packet received by the client was destined for this particular client. When a route ID for the incoming data matches a route in the client's table of routes, and the route identifies the destination as the client itself, the packet is consumed by the client. In some cases, the packet received corresponds to a connectionless protocol. In this scenario, client software removes the routing and control header information from the data and passes the data up the device's network stack.

Handling Sequenced/Synchronized Data—Piecing Together Data Streams

This process can occur at multiple layers of the networking stack. "Data" and "buffers" here refer to data sent/received between the endpoints, namely Layer 4 in the OSI model or higher, while "packets" fall into OSI layer 3 and below. The server handles both cases of packets. In this section, we are expanding on layer 4 or higher functionality in the client as it differs from sending data to the device's network stack.

Typically, a reliable protocol is used to request and receive data. A reliable protocol (such as TCP/IP) is preferably connection-oriented and ensures the correct order and integrity of the data exchanged between a remote server and the requesting device.

In such a connection-based protocol, errors are common and require error correction and re-ordering mechanisms. These errors could include collisions, inaccurate or imprecise synchronization of receiving and transmitting antennas, interference, or insufficient transmission power or receiving amplification. The present invention can make use of existing error-resolving protocols (such as that used in TCP/IP networking). This process involves sending acknowledgement packets (ACK) to the server or directly to a remote server using the direct uplink connection. Furthermore this process could involve relaying the ACK packets from the receiving device back through the mesh network to the server or another remote server.

Preferred embodiments hereof employ connectionless transmissions between devices in the network, where only the receiving client is aware of a complete data transmission. When a connection-oriented communication is required, the server can maintain the connection session on behalf of the clients in the network, or allow the clients to manage the session with a remote server. When the server manages the connection session between the client and a remote server, the server provides a novel solution to resolving errors in a connectionless environment. Errors and/or completed data transmissions can be synchronized and resolved using the server.

Use Sequence Numbers to Ensure Integrity

One possible scheme to organize such transactions is to maintain a sequence number for each client that is synchronized with the server. This synchronization can happen when clients initially connect to the server or periodically through control packets exchanged with the server. Using this method, when information is transmitted from the server, the sequence number of that virtual client is updated by the server internally by the amount of data to be sent. Data is then sent out of the server according to a solved path to the destination client. When the client receives the data, the data synchronization offset and packet length contained in the packet header allow the client to order the data and check for missing data.

Example

Figure 6G:
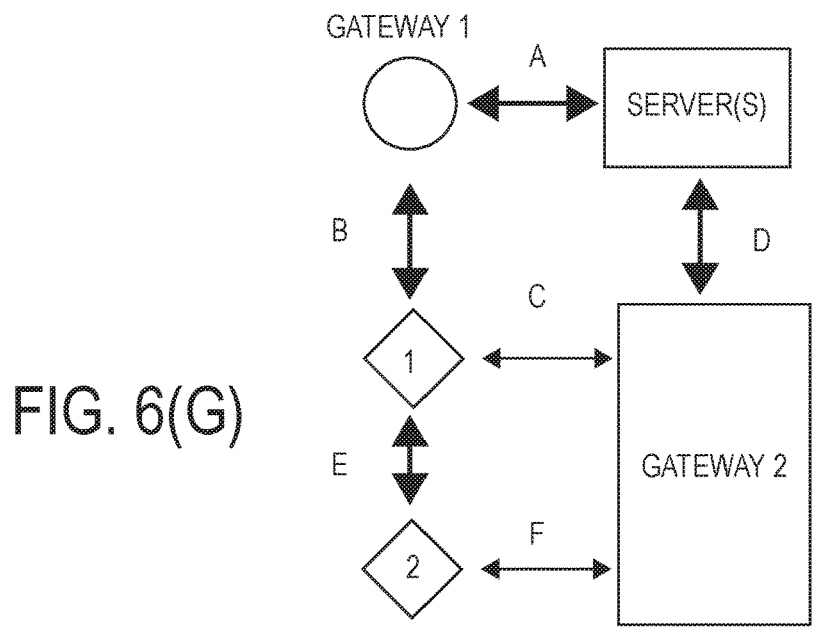

An example of such a system is shown in FIG. 6(G) in which Client (1) is within transmission range of the Gateway 1, and client (2) is within transmission range of client (1) on the same or different wireless interface, but is not in range of Gateway 1. It is also assumed for this example that client (1) and client (2) have a second wireless interface through which they can reach Gateway 2 that can communicate with the central server.

A concrete example of such a system shown in FIG. 6(G) is a WiFi hot spot that acts as Gateway 1, and a cell tower that acts Gateway 2. Client (1) and client (2) are mobile devices which contain both cellular and WiFi radios. It is assumed for this example that the server communicates with each gateway via the Internet (using fiber cable lines or another backhaul source).

In this example, transmission errors can occur on any of the links A, B, C, D, E, or F in the diagram. It is assumed for this example, however, that links A and D are wired bidirectional links for which an error resolving protocol could be implemented if necessary. Standard Internet protocols involving TCP/IP and its window-size extension options could resolve these errors with negligible latency.

Using the communication system described in sections above, it is assumed that the second client is able to receive information from the server through the first client. This transmission utilizes path «A, B, E» as generated by the server.

Figure 6H:
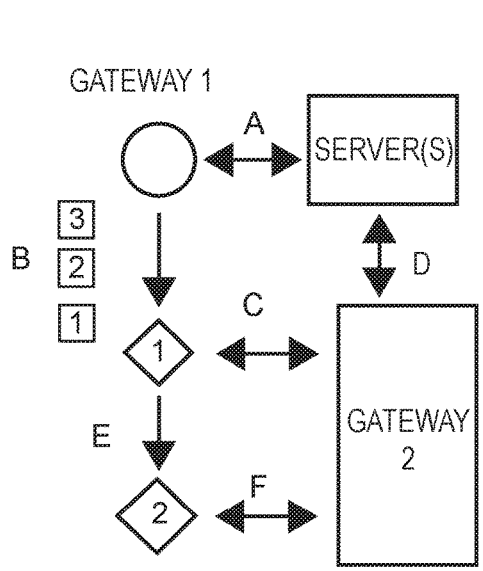
Figure 6I:
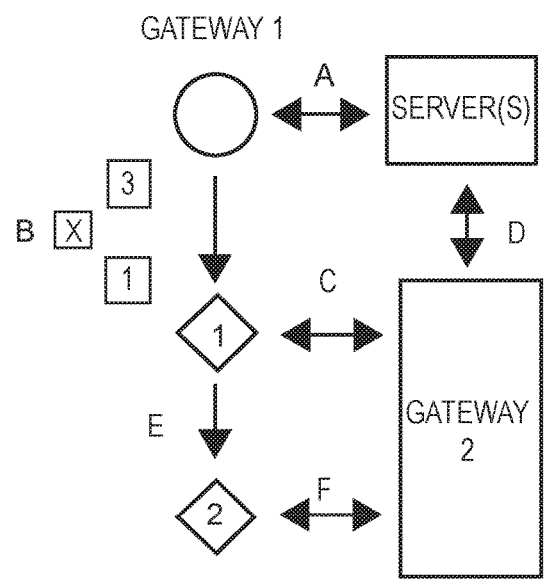
Figure 6J:
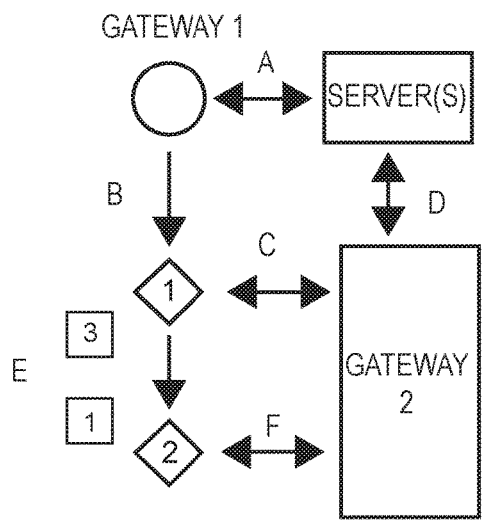
Figure 6K:
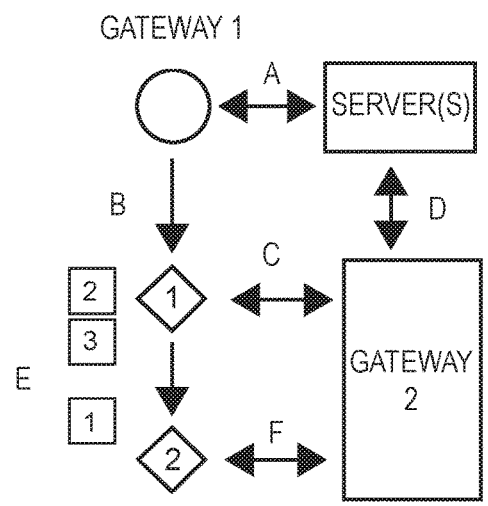

Suppose, for the sake of example, that the server issues three packets intended for the second client (2) and transmits them using the gateway over link A (FIGS. 6(H)-6(I)). Suppose the first client (1) receives packets {1,3} but fails to receive packet {2}. When the first client (1) fails to receive packet {2} the client generates an error. The client constructs an error request or indication to be sent to the server. At a minimum, the error request or indication should identify the type of error. In some embodiments hereof the error request or indication may also indicate the starting location of the range and the length of the data missing. The client notifies the server of the error over path «C, D» using its direct uplink connection. The server can then determine how to resolve this error. Upon receiving the error notification from the first client, the server calculates a new path and resends packet {2} via this new path. The new path may be the original path «A, B» or another, e.g., the path «D, C» (FIGS. 6(J)-6(K)).

Figure 6L:
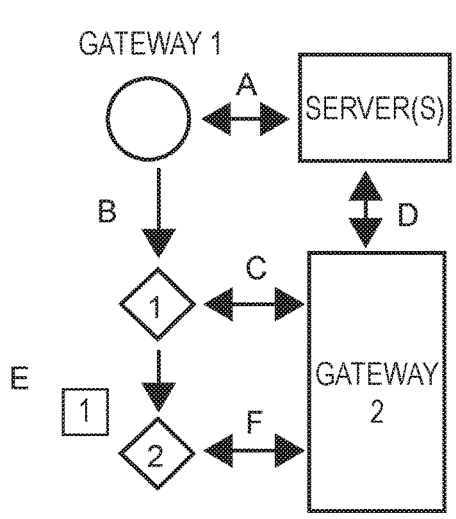
Figure 6M:
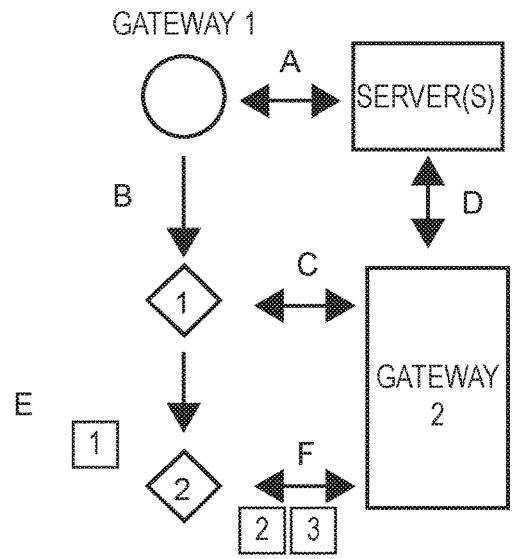

A second possible scenario occurs if the second client (2) fails to receive packets {1} or {3} (FIGS. 6(L)-6(M)). In the example scenario in FIG. 6(L) client (2) may notify the server over link F that it failed to receive packets {23}. The server calculates a new path for transferring packets {23} to client (2), which may be the original path «A, B, E» or the alternate path «D, F».

In some embodiments the first client need not have information on the number of packets or the ordering of the packets, although such a system may require the second client (the intended receiving client) to have information on the number of packets and the ordering of the packets. In other words, in some cases client 1 requires no information about the packets other than where to forward them, and client 2 alone can report errors and have them resolved. As should be appreciated, if client 1 also reports an error this would benefit the network because in multi-hop paths the system could determine the path segment over which the packets failed.

This information can be most reliably transmitted using the direct connection through gateway 2, employing paths «D, C» and «D, F» to synchronize the devices on the network for the number and size of packets they should expect.

Figure 6N:
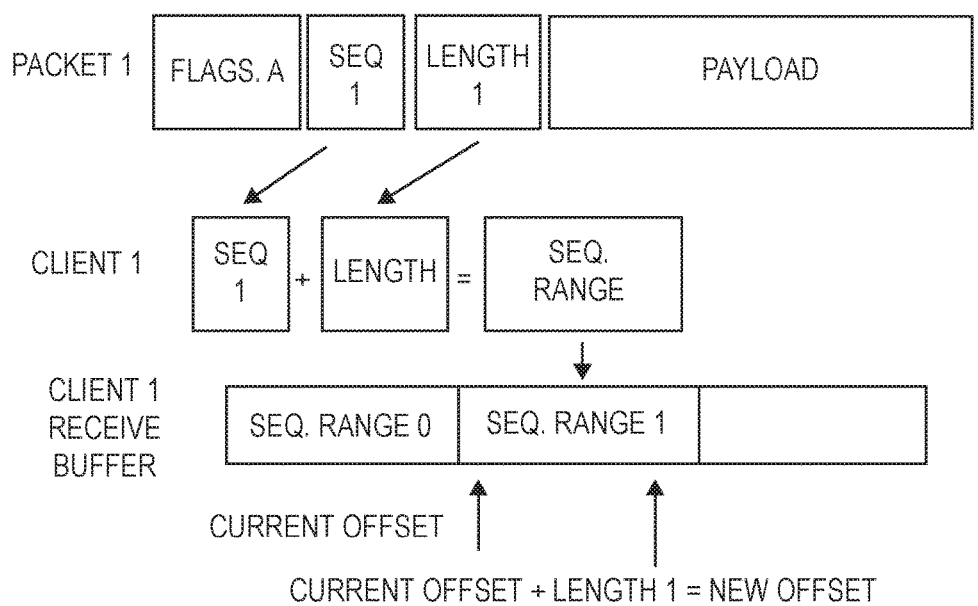

In some embodiments, the packets themselves may contain synchronization information that could be used to validate the order and number of packets received. On a given client, a receive buffer may be employed which maintains a record of the information received from the central server, e.g., as shown in FIG. 6(N).

When the first client receives a data packet, the packet may contain a synchronization offset and length of the data being transmitted. The first client maintains a local enumeration of the amount of data received from the server, and may increment its receive offset by the length of the packet received. In the example in FIG. 6(N), synchronization range 1 follows range 0; therefore the device has received all data up to the new offset.

As the first client receives information, data range {2} and data range {4} are not received and generate errors in the first client's synchronization count. These errors cause fragments in the data transmitted by the server, resulting in fragment A and fragment B. Small data packets {B, C, D, E} as well as packet {G} arrive successfully and can be immediately passed to the first client's networking stack. The missing data ranges {2, 4} generate errors, which the first client reports back to the server.

Generalizing the method above to more than two clients, some additional error resolving possibilities can be implemented. If multiple paths to the destination client are available and an error occurs on a given path, the missing data may be retransmitted using the second path.

Figure 6O:
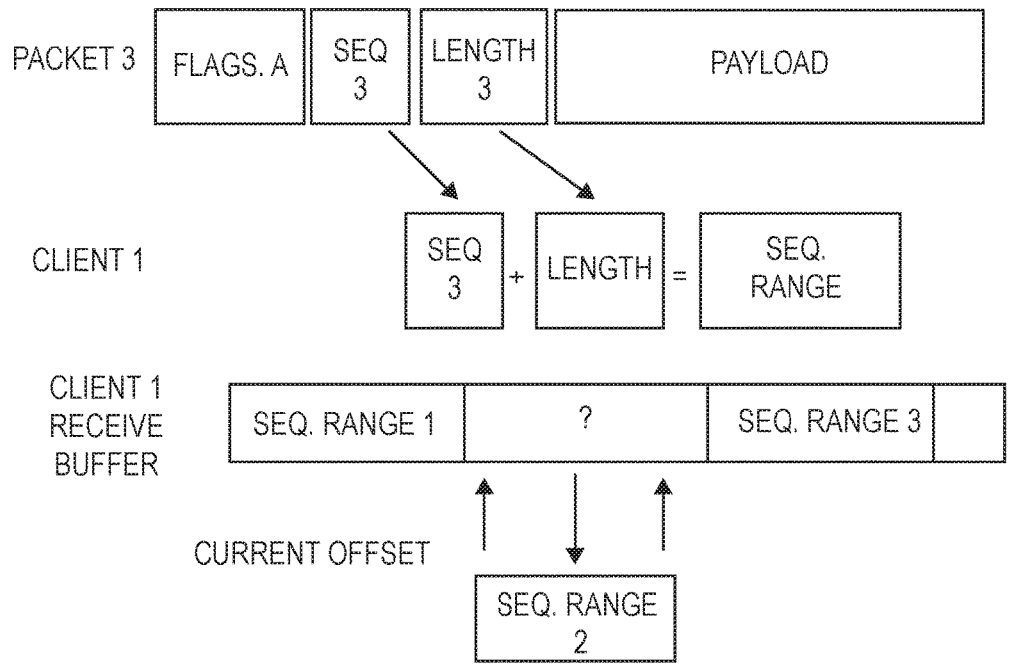

When the first client receives packet {3}, the synchronization offset and length leave a gap in the first client's receive buffer, as shown in FIG. 6(O). The first client may then compute the missing data range using the current offset and the length of data missing, and report this information to the server for resolution.

This method allows for asynchronous and unordered data reception and consumption. A single stream of data can provide data requested by higher-level protocols whenever that data becomes available. For example, a buffered video whose packets are received out of order or with error could deliver frames received to the user in chunks. This might be more efficient and experience lower latency than other delivery methods when, for example, a user is quickly seeking through a video file.

Report Completions

The various clients and the gateway may elect to individually report s completion of data transmissions to the server and updated device metrics (including RSSI, battery life, etc.). However, each client and/or gateway will report data transmission errors when a reliable connection is being provided. Transmission errors are determined when clients have not received an expected packet within the time window as indicated by the routing schedule sent by the server over the direct downlink. This process can occur throughout the wireless transmission using a variety of different links to the server.

Dealing with Errors—Packet Retransmission

When errors are reported by the network and need to be resolved by retransmission, the server can use its buffered data to facilitate error resolution. The server sends Data Range 0 to the client, advances the send offset, and then receives an error for Data Range 0. Although the send offset remains at Data Range 1, the server uses the buffered Data Range 0, which still resides in memory, to re-send the information without having to fetch the data again.

Information about the data packet's arrival at the first client may be reported to the server along with synchronization information or confirmation of the packet's arrival. Failure to receive this confirmation will cause the server to record an error over that particular path, and may result in the resending of the data by the server to the gateway or over another path to the destination client.

Consider a case where a first client is associated with the gateway (here a WiFi access point) and the second client is not associated with the WiFi access point but is within range of transmission from the WiFi access point.

In this example, both the first client and the second client receive packet A from the gateway. The first client recognizes the destination of the packet as itself and the source of the packet. The packet is then forwarded to the networking stack. The second client simultaneously receives packet A and also recognizes the packet was destined for the first client. Instead of discarding the packet, the second client now records the transmission characteristics of packet A sent by the gateway such as the source, signal to noise ratio, channel, rate, and protocol information. Without association, the second client has now become aware of its ability to receive data from the gateway. The quality may be determined by the received signal strength of the transmission, or simply the number of packets or the rate of packets received from the gateway. The procedure described above is very similar to how WiFi access points broadcast network names using beacon frames. An access point makes use of the broadcast address or management data frames to notify potential clients of a network's availability and the relative signal strength when connecting to that network. This broadcasting procedure may be extended to the devices themselves such that a device may become aware of its ability to receive data from other devices by passively receiving transmissions.

Resolving Errors Through Last Successful Client

As preferred embodiments hereof describe a connectionless method for passing data, this procedure can be used to resolve errors directly between peers who had previously routed the data. For example, if a first client device needs to transmit information to a second client device the server 110 is notified over the direct uplink that the first client device 102 needs to communicate with the second client device 102. The server 110 considers the available radio links and Internet connections of the clients, and determines a path or series of paths from the first client to the second client over any combination of network interfaces or wireless radios.

Consider a scenario where another client (e.g., a third client) downloads information from the server through the gateway and stores the downloaded information in memory. The server has preemptively downloaded and stored content on the third client to be used at a later time.

At a later time when another client (e.g., a fourth client) requests data from the server, the server may send that data in real time from the network, utilizing a transmission between the third client and the fourth client as described in the system above. However, because the third client already received some data from the Internet, if a subset of this data were requested by the fourth client then the server could use the local cache of downloaded data on the third client. The server could securely notify the third client that the fourth client is requesting data stored in its cache, and could instruct the third client to broadcast data to the fourth client using the available transmission path.

Figure 6P:
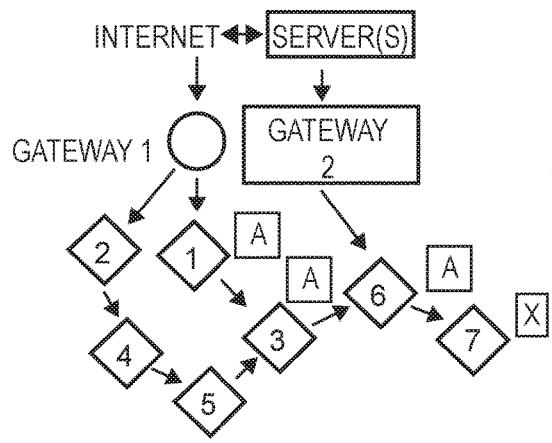

Consider the example of FIG. 6(P), where client (7) has requested data from the server, and the server has sent response packet A over the path «1, 3, 6, 7». Although clients (1, 3, 6) each received and forwarded packet A, an error occurred when client (6) transmitted the information to client (7). Client (7) will notify the server of the error and the server will determine a path to re send the data.

Although paths «2, 4, 5, 3, 6, 7», «1, 3, 6, 7» and the low bandwidth gateway are all candidate paths, the most efficient path is «6, 7». Using the low bandwidth connection (here the cellular network) the server instructs client (6) to retransmit packet A to client (7) as in FIG. 6(Q). Client (3), client (1) or even the gateway could be used to retransmit the data.

Figure 6Q:
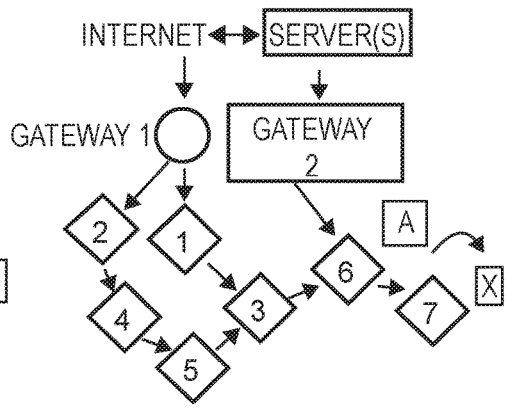
Figure 6R:
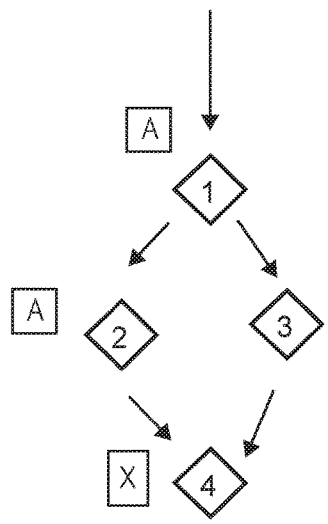
Figure 6S:
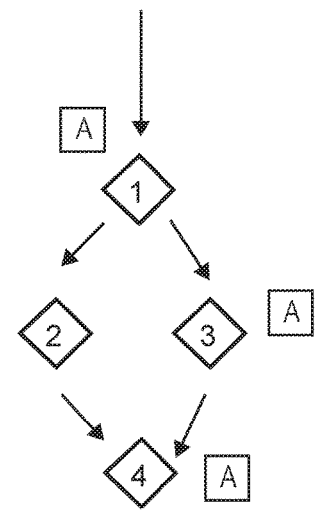

This strategy may be generalized further to any branching path on the network as shown in FIGS. 6(R)-6(S). When a transmission fails between client (2) and client (4) as in FIG. 6(R), client (1) can be used as a past successful client to transmit packet A over the new sub path «1, 3, 4». When clients are capable of caching information, any client that has received the information successfully can be used to retransmit the data further down to the destination. The size of the cache may vary by client and could be modified by the server in errorprone areas.

Phase 3—Close

The client software and the central server software preferably gracefully end the registration of a client. When a client's primary direct uplink connection is severed, possibly due to a loss of cellular service, the client software will attempt to reconnect to the central server using the same or another interface. If the connection cannot be reestablished, such as would happen when a device is powered down or runs out of battery, the server detects the severed connection via a timeout or through connection errors reported by other devices which depended on the disconnected client. The disconnected client is unregistered from the virtual representation of the network. Any paths involving the client as a relaying device will be invalidated, and any active paths will be re-solved. The client software will re-register with the central routing server when the device is next powered on.

Communication with Remote Devices/Databases/Severs

Communication with remote devices and databases can be accomplished through a variety of methods. As long as information can be provided to the server, it can be stored and used to update topology and thereby improve routing. Remote resources may also provide content to be routed to clients, which is the primary use of such functionality. When clients request information from the server, often the information does not reside locally on the server. When the information requested is stored locally on the server, it can be delivered directly when requested.

When information does not reside on the server, it must be obtained from a remote site, such as a remote server or client that hosts the requested information, and provided to the requesting client(s). In some situations, this information is requested directly from a remote server over a standard networking protocol such as HTTP, FTP, AFP, SMB, or similar protocols. When the remote site provides the requested resource, the resource is routed through the central server to the requesting client. Wherever preferable, the server may opt to segment the resource into packets and provide the resource in several chunks, buffer part or all of the resource, or send the resource to the client as a stream of packets.

When a resource represents a connection to a remote location, the packets received from a requesting client may be forwarded directly to the remote site. This typically occurs when a client requests a TCP connection to a remote server to be used with streaming data. In this scenario, the IP and/or TCP packets are forwarded to the remote server as if the server were a VPN. Response packets from the remote server are then routed to the clients. In some scenarios, modification to the TCP/IP headers may be required. This functionality is handled by the server before data is routed to client or to the remote site.

Routing

In an exemplary embodiment hereof, the central facility 104 determines a route and path between clients. A transmission between two clients may occur when the central facility determines the need for a transmission between clients after examining network demand and topology then determining that a path segment should be included in a path. As such, a single path segment between two clients may or may not be used in any given route and may or may not be used when sending additional information to the same destination client. A system that eliminates a hierarchy among clients allows for many more possible connections between clients in an area than a system that implements a hierarchy among nodes. Accordingly, there are many more paths over which data can flow. As the central facility has real-time and complete or near-complete information about the network, including network topology and demand, it can choose the route or routes (e.g., path, channel, timing, broadcast range, etc.) best suited to get the data to the requesting client for each packet of data transmitted.

Network Flow

A central facility or server is responsible for regulating the flow of data through the network. The server performs combinations of one or more of the following: maintains a map of the total network topology; maintains a record of previous and queued transmission for all clients in the network; optimizes individual and total network data flows using metrics including, but not limited to, channel availability, timing, transmission rate, network interface, transmission power, antenna, path, direction, available memory, and processing time; communicates with remote devices and servers and retrieves requested data; determines routing instructions for each client in the network; unidirectional or bi-directional communication with devices; provides routing information to clients; and resolves transmission errors.

Stored Information

Another capability of the central server is the management of a database of relevant client information. This information may be provided by clients on the network, utilize the past history of the network, or be provided locally or remotely to the server. Clients may provide information to the server directly such as their model number, serial number, the number of network interfaces, radio hardware, network address (e.g., IP, MAC), remaining battery life, whether the client is externally powered and the available storage space among other metrics.

In addition to the information provided by the clients, the server may also locally or remotely fetch information to be used in calculating paths or building the topology map. Local information may include a lookup table for the transmission range of different wireless radios by serial number and antenna configuration. Alternatively, the database may include configurations for different models of the client or other miscellaneous/auxiliary information. For example, a third-party database may provide the specifications for each smartphone and the capabilities (e.g., Bluetooth, WiFi, etc.) of a client so clients would not be required to provide this information to the server over the control link. Additionally, the server can monitor and track how clients of the same model have performed on the network as to make more accurate routing decisions. Information stored on the server can be used as it becomes available to inform routing decision made by the server.

Server-Coordinated Uploads

Although the server is designed to facilitate high-bandwidth downloads and relatively small uploads, the server can support upload functionality when not possible by the direct uplink. One example would be a client that can receive long-range ham radio transmissions, but is unable to transmit back to the source. The server can still make use of the long-range radio to coordinate channels, frequencies, and synchronize all the clients on the network. Furthermore, the server could coordinate upload paths for ferrying data using the control link. Alternatively, if a cellular network did not have the bandwidth to perform the upload, an upload path could be reported over a direct downlink to all clients in the path performing the upload.

Figure 6T:
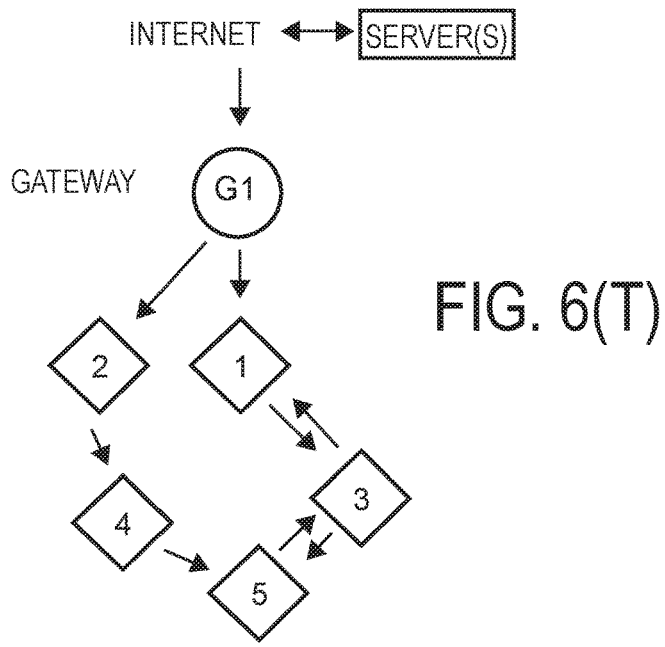

With reference, e.g., to the drawings in FIG. 6(T), if client (5) requests a data upload and the low-bandwidth connection cannot service the request, the central server can notify clients (1, 3, and 5) that they will form part of an upload path, and the server can instruct the client (5) to transmit along the path «5, 3, 1» back to the gateway. The server can coordinate the upload much like the download, and schedule the path along with other downloads to prevent interference. Errors can similarly be resolved using the reverse of the procedure discussed above. Applicable techniques might include resolving errors using a previously successful client or adjusting transmission characteristics to mitigate transmission errors.

Error Resolution (Last Successful Client)

Another method for resolving errors in the network leverages the previous capabilities with additional instructions from the server. When the server receives an error resulting from an indirect data path (i.e., a data path not using a direct connection), the server can use the last successful client to resolve the error. In this scenario, the server does not send the requested data to the gateway a second time. Clients who have received the data successfully can be instructed to rebroadcast the data. Depending on changes in network topology and other factors, the central server may choose to change the route and path from the last successful node to the destination device rather than choose to have devices in the path attempt to rebroadcast data. Similarly, the central server may determine to send the requested data over a direct downlink if a new route and path cannot be determined from the last successful node to the destination device.

Consider, e.g., the network in FIG. 6(P), where client (7) has requested data from the server, and the server has sent response packet A over the path «1, 3, 6, 7». Although clients (1,3,6) each received and forwarded packet A, an error occurred when client (6) transmitted the information to client (7). Client (7) will notify the server of the error and the server will determine a path to re-send the data. Although paths «2, 4, 5, 3, 6, 7», «1, 3, 6, 7» and the low bandwidth gateway are all candidate paths, the most efficient path is simply «6, 7». Using the low bandwidth connection (here the cellular network) the server instructs client (6) to retransmit packet A to client (7), as shown in FIG. 6(Q). Naturally, client (3), the first client or even the gateway could be used to retransmit the data.

Facilitating Content-Delivery Network

When clients are capable of caching information, any client that has received the information successfully can be used to retransmit the data further down to the destination. Naturally, the size of the cache may vary by client and could be modified by the server in error-prone areas.

Here, although the server considers the path to the fourth client through the gateway, because the third client already has the data requested by the fourth client, only one transmission is necessary to provide the fourth client with the requested data.

Although not applicable in all scenarios, this procedure is very efficient when the same content is periodically transferred between the same clients. For instance, when multiple wireless clients load the same video resource from the Internet, the data is only downloaded by the gateway from the Internet once. Each time a node serviced by the gateway requests the video resource the server may instruct another client which has already downloaded the video to transmit the data locally.

This strategy along with the routing capabilities of the central server can be generalized further to any branching path on the network when registered clients can also act as nodes in a decentralized mesh network.

Centralized—Decentralized Bridge

In a scenario wherein a client does not have a direct uplink to make requests to the central facility, clients with direct uplinks may be flagged or registered as pseudo-gateways. Clients without a direct uplink to the central facility can use standard decentralized routing schemes (i.e. proactive or reactive routing) and algorithms or routing protocols (e.g. OLSR or BATMAN) to send their upload requests to a client with a direct uplink to the central facility. If a proactive routing scheme is used, the topology maps of the decentralized mesh network can be uploaded to the central server via a server-connected pseudo-gateway in range of a client running only as a member of the decentralized mesh network. Once a server-connected client with a direct uplink receives an upload request via a client without a direct upload link, it can immediately relay the request over its own direct uplink to the central facility. The central facility can then choose to send the response data back to the requesting client through clients or gateways with a direct connection to the server. Although the server may have less complete network topology information about the decentralized network, data can be routed such that it is directed toward the requesting client. Intermediary clients with a direct uplink may report completion information as the packet passes through paths in the decentralized network, providing information to the server about the packet's successful or unsuccessful reception. This exemplary scenario is illustrated in FIG. 6(U).

Figure 6U:
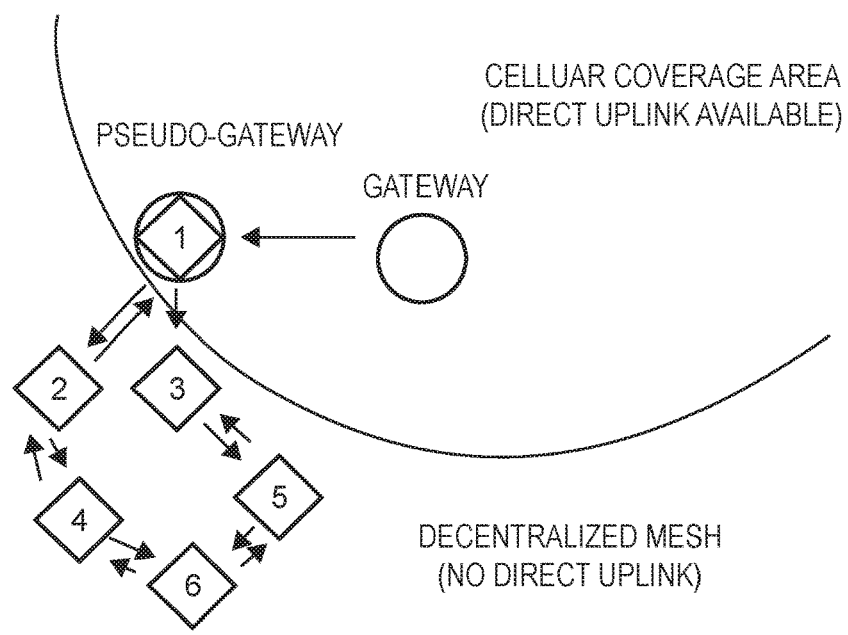

In a scenario where a client cannot create a direct uplink to the server, such as devices 2-6 pictured in FIG. 6(U), or a scenario where the server 110 is reached through a series of clients, uplink capability can be shared to provide requests to the server 100. In the simplest case, a client device connected (wirelessly or otherwise) to a second client device may use its own uplink connection to forward requests to the server on behalf of the first client device.

Figure 6V:
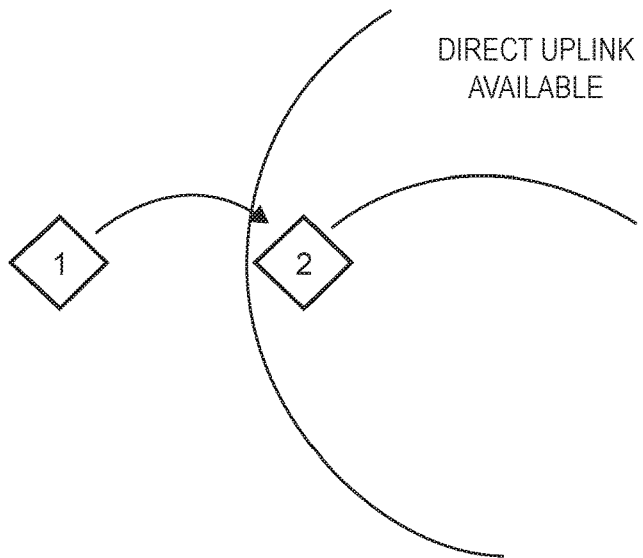

As shown in FIG. 6(V), a client device 1 is outside of the coverage area of a direct uplink connection, but client device 2 is capable of a direct connection to the server 110. Client device 1 is instructed by the server or may automatically forward requests on behalf of client 2, to the server. These requests include updates to topology and location information, battery level information, and requests for data, error reports or data uploads. Although the server cannot fully register the client on the network, nor can it directly coordinate its transmission of data, it can use the data provided by client 1 when compiling topology information and mapping spectrum usage. Furthermore, the server registers the client device to receive data, but understands the data may not reach the destination. The server may also assign a higher or lower priority in terms of route processing, spectrum usage, or other network resources to clients it cannot manage directly. As should be appreciated, this covers cases where the decentralized mesh is actually the best option.

Routing devices may establish a direct uplink and/or direct downlink link to the central server. Routing devices with a direct uplink may also forward requests to the server 110 on behalf of other devices who cannot establish a direct uplink itself. Routing devices initiate connections to the server to bring them on the network, and the server initiates a series of association communications to register the routing device for the network using the device 102 as a gateway into the mesh network. During this association phase, security keys, certificates, model and serial numbers, version and protocol information are exchanged with device 102 through the decentralized mesh network bridged by client to validate the integrity of the routing device and secure future communications. The registration process is similar to the procedure used for clients with a direct uplink connection, but may include additional information about the decentralized network such as the Independent Basic Service Set (IBSS) identifier or the current timing synchronization function offset.

This framework can be further extended to the scenario shown in FIG. 6(U) where a series of connections occur outside the direct uplink coverage area. In this scenario, a standard mesh network could be deployed among clients (1-6) where the first client is able to route information from the decentralized mesh network to the server. The first client may register the decentralized network with the server, or register individual clients on the network. The first client will also notify the server of its capability to route information on the network and can also report which clients it can reach. In essence, the first client simultaneously assumes the functionality of a gateway to the mesh network and a client to the central server. It should be appreciated that allowing a device to function as both a member of the mesh network, as a gateway, and as a wireless gateway's client may require a number of hardware restrictions, such as operation on the same channel, are required for this multi-role behavior to be completely compatible. Devices may elect to rapidly switch channels to preserve their multiple roles in a given network topology, and the server may be used to facilitate the timing and channel coordination challenges when clients are asked to join multiple networks. In certain other situations, multiple antennas for a given wireless interface may mitigate these issues, allowing a given interface to send and receive data on multiple channels, bandwidths, or data rates simultaneously. Often however, these cases will require special attention in the driver and host device kernel to ensure stable connections in both networks.

Naturally, the server can route data to a client that does not have a direct uplink using the connectionless method described in the preceding sections, provided the network topology provides a path to the destination. In cases where there is no direct uplink or downlink from the central server to a client, routing instructions can be sent indirectly over the peer-to-peer part of the network from the central server. It is expected that latency of server-coordination of a decentralized mesh network branch through a single client will introduce latency and performance issues unsuitable for most clients. Knowledge of the decentralized network by the central server will however benefit the server's virtual representation of the network. For example, knowledge of a mesh network in a certain area might indicate an increased probability for transmission errors in the decentralized area due to packet collisions.

Figure 6W:
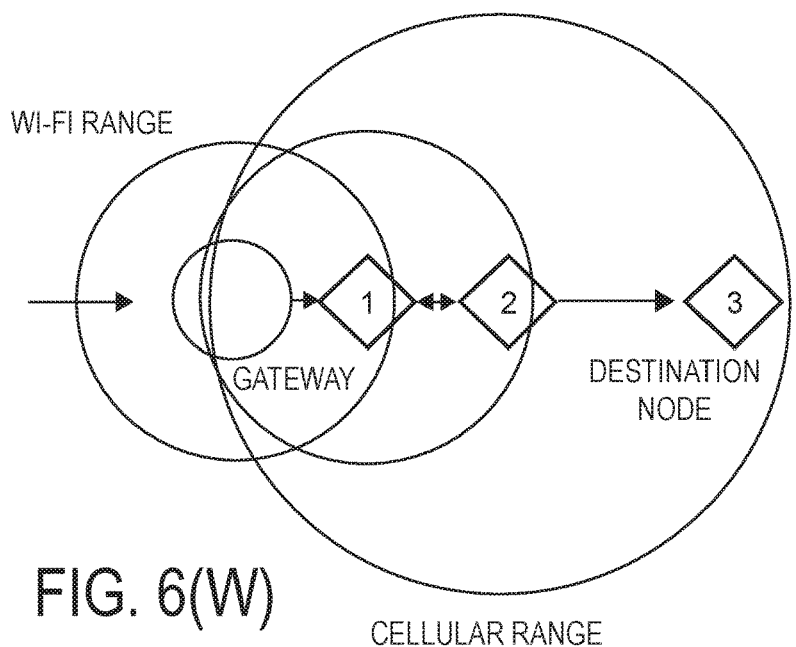

For example, as shown in FIG. 6(W), if client (1) is connected to a WiFi hotspot as its gateway, client (2) has both a WiFi NIC and a cellular chip, and the third client has a cellular chip, the third client may receive internet packets from the gateway through clients (1) and (3).

The benefit to this networking scheme (as depicted in FIG. 6(W)) is making available the backhaul connected to the gateway and accessible through the first client to clients (2) and (3). In this scenario, client (2) also operates as a network bridge, receiving WiFi packets from the first client and retransmitting them as cellular packets to the third client.

Figure 6X:
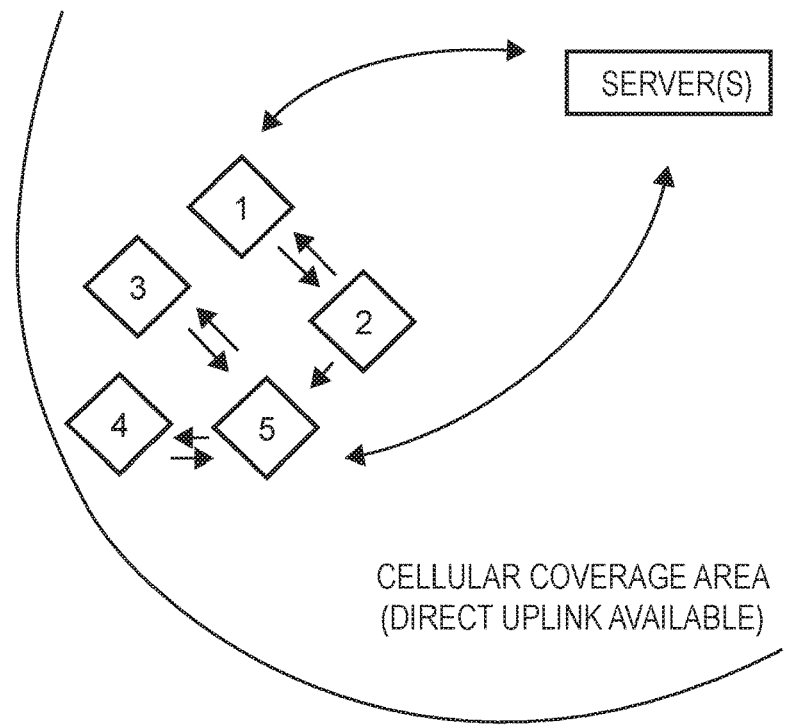

Even when an uplink connection is available, some clients may elect to manage their own connections. As should be appreciated, this covers WiFi-Direct groups that have some decentralized connection states running alongside the centralized transmissions. Consider, e.g., the example shown in FIG. 6(X). In this example, devices (1•5) are all within the uplink coverage area, but only client (1) and client (5) are communicating over the direct uplink. Bidirectional connections also exist between device (4) and client (5), device (3) and client (5), and client (1) and device (2). Here client (5) can simultaneously participate in the sub network consisting of devices (3•5) and the server-coordinated network. Likewise the bidirectional connection between client (1) and device (2) can occur without server coordination. Although the server cannot coordinate devices (2.4) directly, client (1) and client (5) can report to the server their bidirectional connections, the presence of the sub-network of connections, and any usable metrics of the sub-network such as the frequency being used or the physical location of each device in the network. The server can use this information to intelligently coordinate clients on the network and provide information through client (1) and client (5) to the sub-network.

Even when clients elect to manage their own connections, they can still report topology information and service routes to other clients. One example is a wireless router that both hosts its own wireless network and may choose whether to participate in the self-organizing network. Such clients may implement subsets of the functionality of typical clients, and the server will use whatever information and capabilities published by the client to better inform its virtual representation of the network. One typical example would be a smart WiFi router that both hosts its own WiFi network in AP mode, reports topology information to the central server based on its own network, and accepts interface operation commands from the server which it interprets as suggestions for how to handle its clients. The router may also route packets over its own sub-network without exposing its clients by registering on behalf of the clients in its own network. This method would offer improved security and anonymity while providing the central server topology information for that particular area.

Typical Functionality of the Server(s)

Each server 110 in the central facility 104 is a computer system such as computer system 800 described below.

Typical Functionality of the Devices

Each communication device 102 is a computer system such as computer system 800 described below. The communication device 102 preferably includes one or more wireless interfaces (e.g., a Bluetooth component, a WiFi component, a 3G/4G component, etc.), and a Baseband Processor (for radio control).

Clients are capable of receiving the data around them. Whether directly in the client's hardware or indirectly through the wireless NIC, clients can receive wireless transmissions from neighboring wireless devices. Clients may facilitate receiving data on multiple channels, possibly through multiple antennas, simultaneously.

In scenarios where a data packet is transmitted to a client, and another client is in the vicinity, the non-targeted client can intercept and interpret the data fragment. By recording this received transmission and reporting it to the server, the server can better determine the link quality to that client. The client might use header information contained in the data and store this information or report it to the server. For example, in a wireless network where many clients connect on the same channel to an access point, a client might intercept an 802.11 data packet from the access point destined for another client. Contained within the 802.11 data header is the destination and source MAC address of each client involved in the transfer. The monitoring client not involved in the transfer may receive the data packet, identify the sender and receiver MAC addresses, and report to the server that the monitoring client is able to receive packets transmitted from the access point. This process can occur without any communication between the monitoring client and the access point.

An additional device capability might be to throttle transmit power for a given wireless radio. The client could adjust the transmit power depending on the type of transmission or instruction from the server.

Wireless radios may also cycle their receiving channel in time to listen for data on multiple frequencies. Cognitive radios may also be employed to identify frequencies or channels where there is a large or small amount of traffic, especially if there is a large amount of data being transmitted on public channels by devices whose transmissions are not being coordinated by the server. This data can be compiled on the client and communicated to the server.

Wireless radios or antennas, multiple radios, or antennas may be used simultaneously for data communication. Such channel bonding or interface bonding may be handled automatically by the device's hardware (as is the case for many wireless NICs) or they can be treated as multiple radios that operate with restrictions. For example, a wireless NIC might use multiple antennas simultaneously to transmit the same stream of data to a second client with multiple receiving antennas. Once received, the streams could be combined to form the final data stream provided to the client. Alternatively, the client could advertise the NIC's multiple antennas independently, and the client could report to the server that the antennas originate from the same NIC.

According to an exemplary application, devices cannot directly communicate to one another in a hierarchical system. The hierarchy is eliminated through the introduction of the central server, which allows for an overall increase in efficiency for the wireless spectrum of a certain area.

Packet Reception+Virtual Interfaces

The client-side implementation of the system in its most general form can be summarized by five operations:

1) Interface Transmit Packet/Data—this function takes an arbitrary amount of data as an argument and delivers it to the wireless antenna;

2) Interface Receive Packet/Data—this function receives an arbitrary amount of data and delivers it to the client software;

3) Interface Get Parameter—this function queries a virtual interface for capabilities or current settings (such as channel, or the maximum transmission unit (MTU) of the wireless interface;

4) Interface Set Parameter—this function sets a particular parameter in a virtual interface (such as changing the wireless channel);

5) Interface Route Data—this function examines incoming data in the form of a packet and determines the final destination of the data. If the packet was intended for this particular client, the data is consumed. If not, the packet is retransmitted. Together these operations, and any others obvious to one skilled in the art, constitute a virtual interface for a given client. Each virtual interface may differ in how data is transmitted or received, the minimum and maximum transmission unit (MTU), and the capabilities of the underlying hardware such as channel, rate, frequency, frame or header aggregation or other similar features. Upon registration with the server, the capabilities of the virtual interface are established, and the wireless device can run. It is important to note that a client device may have multiple virtual interfaces operating simultaneously. Implementing such behavior can be challenging, though necessary for a seamless experience.

Unfortunately, currently few wireless devices have full support for this type of functionality. Although the wireless hardware is capable of such features in all cases, often there are limitations in the networking stack that prevent this functionality. As a result, the interface support of the client software may be architecture-dependent and/or may require implementing these five capabilities on a particular client device. Three common methods for implementing this functionality may be used 1) custom hardware 2) firmware modifications and 3) driver modifications. Those of ordinary skill in the art will realize and appreciate, upon reading this description, that different and/or other implementation methods may be used.

Mobile devices such as smartphones often utilize a wireless network interface card that runs a small operating system to transmit and receive wireless data. The operating system may run a small program that simplifies the transmission and reception of standard protocol packets (such as 802.11 frames or 3GPP/LTE packets). In the case of such a mobile device, the firmware program responsible for the reception and transmission of wireless packets will preferably be modified to support communication from one device to another device. This is non-standard functionality of such network cards. The firmware is often pre-compiled and proprietary. Using reverse engineering tools, it is possible to reverse-engineer such firmware and modify their programs to achieve custom reception and transmission of information.

Raw Packet Reception

Mobile devices such as smartphones utilize wireless network interface cards that often run a small operating system to transmit and receive wireless data. The operating system may run a small program that simplifies the transmission and reception of standard packets (such as 802.11 frames or 3GPP/LTE packets).

Figure 7:
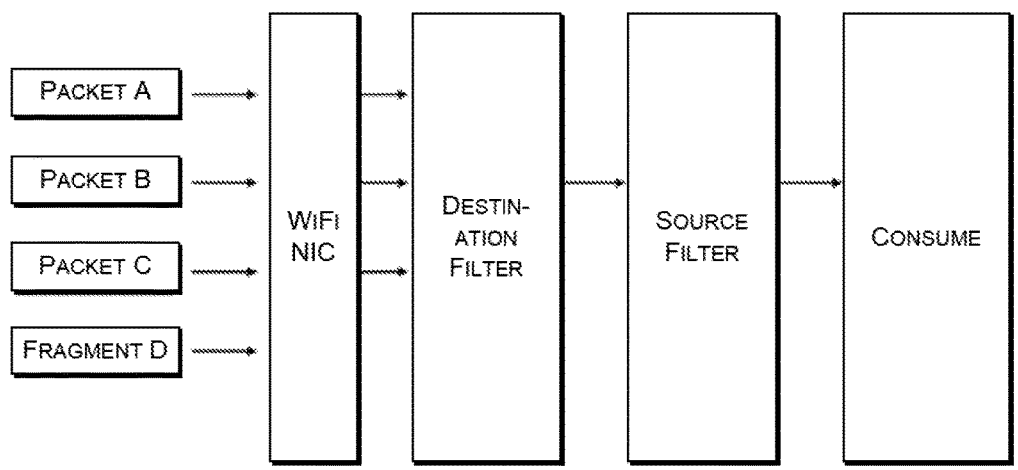

For example, as shown in FIG. 7, in a typical embodiment, when packets A, B, C and D are received by a wireless network interface card ("NIC") inside the client device, a wireless NIC is responsible for assembling packets received over the air. As packets A, B, C and D are received by the wireless NIC, any incomplete fragments not passing validation by a checksum or other quality metric are discarded as incomplete.

Next, the typical NIC or the client's software applies Medium Access Control (MAC) layer filter to the destination and source of each packet and compares them to the client. According to an exemplary scenario, the client only processes packets sent from a known source and matching the client's path table. These packets are those intended for the client for forwarding or consumption (the destination). This is a robust system for preventing transmission errors from permeating the network stack of a client, and also allows for multiple clients to share the same channel without mistakenly processing information not intended for that client.

Packets received on a client's NIC from the central server or a neighboring device provide the destination, source, and an identifier. This may be the source IP address of the sender, the source MAC address or a Zigbee address of the transmitting device. This information is compared against the client's local routing tables, and packets are consumed, retransmitted, or discarded. Information from the packet, including the source, destination, identifier, and length, and completeness may be examined and recorded in a local table for later reporting to the server.

One potential limitation in some of these implementations is preserving concurrency of the existing wireless networking stack and the new modifications. Most network APIs were not designed to simultaneously connect to access points and transmit data "over the air" because without proper routing instructions this can lead to interference for other devices or a depleted battery. WiFi direct is one such amendment to firmware, driver, and the kernelspace wireless networking stack in many APIs that allows for peer-to-peer connections between devices. Although raw frames cannot be transmitted, WiFi direct does expose a transmit/receive API between peer devices. Unfortunately, in some implementations the WiFi direct standard was not written to accommodate peer devices while simultaneously associating with one or more WiFi networks. As a result, the kernel often drops the connection to the access point in favor of the peer device, often displaying error messages to device users encouraging them to disconnect. This severely limits the capability to offload data from a WiFi network to peers. WiFi multirole functionality is preferably added through modification of the default WiFi direct implementation to a device's operating system or drivers. This functionality may then interact with the client software.

The central server can also determine where there are concurrency issues, and where possible, make routes that use different interface cards to have effective concurrency if necessary. For example, the server may utilize both LTE-Direct and WiFi-Direct when routing through a particular client. This client can use both their cellular hardware and WiFi hardware at the same time by occupying different frequency bands. As a result, the WiFi backhaul of one client is made available to multiple clients through the use of multiple interfaces concurrently.

Raw Packet Transmission

In order to rebroadcast packets from the wireless card, the card should preferably configured to transmit packets to arbitrary devices without a pre-established connection. Preferably, the wireless card will be capable of transmitting or injecting custom packet frames over the air without associating with an access point. This may also require modification to the host operating system and/or host kernel as well as the driver. This may also require the client or the server to determine timing offsets or functions for the transmissions based on the protocol being used. These changes may be necessary to implement custom transmissions from one device to another device without the device being associated or otherwise connected to the recipient device. Additional modifications may be necessary to change the rate, channel, or other physical mode attributes of the device based on instruction from the server.

In the case of such a mobile device, the firmware program responsible for the reception of wireless packets will preferably be modified to support raw frame transmission from one device to another device. This is non-standard functionality of some network cards. The NIC firmware on mobile devices is often pre-compiled and proprietary. Using reverse engineering tools, it is possible to reverse-engineer such firmware and modify their programs to achieve custom transmission of information.

Driver/Firmware Modifications

In some situations, this raw monitor and broadcast functionality must be enabled by a patch to the driver of the wireless card and/or the kernel of the host operating system. This technique is effective for wireless cards that report all packets to the host operating system regardless of their destination or source. Devices sometimes include a "monitor mode" used in debugging situations for diagnosing network problems, and most standard cards have this debugging capability. In some situations, the kernel of the host operating system will also need modification or changes to settings to notify the device that the wireless card is receiving all transmissions on the current channel. These changes will also require that the host device not filter incoming packets based on destination or source address, and instead forward all packets up the networking stack or to custom software for topology or mesh use.

In the case of such a mobile device, the firmware program responsible for the reception of wireless packets will preferably be modified to support raw frame reception from one device to another device. This is non-standard functionality of such network cards. The firmware is often pre-compiled and proprietary. Using reverse engineering tools, it is possible to reverse-engineer such firmware and modify their programs to achieve custom reception of information.

One method of re-programming a NIC's firmware is to identify the chipset and disassemble the firmware binary with a tool such as IDA. Using the machine level (assembly) instructions, common functions may be identified, and custom functions implemented using the common functions built into the firmware. After identifying common memory manipulation functions as well as the transmit, receive, and packet creation functions used by the network cards' software, a series of custom functions can be programmed alongside the device's standard runtime operations. These functions redirect packets between the host device and the wireless radio such that all transmissions received by the device are forwarded to the host, and custom packets sent by the host are transmitted by the NIC's antenna. This workaround achieves full monitoring and injection support without interfering with the NIC's standard set of operations.

Implementation and Performance

Android WiFi and WiFi-Direct on Motorola G (1$^{st}$ Generation)

In certain situations the IEEE 802.11 standards (a, b, g, n, ac, ad, etc.) along with the WiFi direct extension of these standards provides another way to implement the intended functionality of the clients. We have tested how the system performs in these cases, specifically on rooted Android devices. These customized devices run a modified version the Linux-based Android kernel where the low-level WiFi stack has been modified to route network traffic through the client software. Additional modifications to the WiFi subsystem enabled concurrent WiFi and WiFi direct functionality thereby demonstrating the multi-hop offload opportunities claimed in this embodiment. Although only certain handsets support the software at present, these handsets do constitute a large portion of the mobile market. The procedure may also be extended to other Android-based handsets and provide a step toward implementing the full frame control in the device's driver.

Monitor Mode in iPhones

Custom Transmissions Over IEEE 802.11 Standards.

The routing software written in C/C++ could be further optimized for the hardware of a particular device. To demonstrate this, our code formalized new packet structures needed for communicating between devices, communicating with the routing server, and integrating virtual interface creation and routing logic into a general software library.

The driver implemented its own native "get parameter" and "set parameter" functionality for changing transmission behavior of the hardware in the form of IOCtl (input/output control) calls. The custom functions amended this functionality to include raw transmit and receive functions which could be called from a user space program. The overall footprint of this modification was fewer than 100 lines of assembly code.

As a result of the firmware modification, the firmware reported all received data frames to the userspace client program on request. These included packets not intended for the device itself, including management and control frames used for joining networks, requesting transmission information, or performing synchronization. Furthermore, a userspace program could inject raw frames over the air. Combined with a userspace daemon and UI running the routing logic from Implementation 1, all 5 of the core functions were achieved.

With the firmware modifications, the handset preserved its wireless capabilities of scanning for and joining wireless networks, but added the functionality to send and receive custom information. This was successfully verified by sending test data between devices on channels 1, 6, and 11 in the 2.4 GHz band. In a WiFi-dense environment while the devices were simultaneously connected to a network, three devices were able to pass data in the form of raw frames at a rate of around 500 kbps. These speeds were measured by sending a predictable string of characters of fixed length dozens of times between identical handsets with the same modifications. Lastly, with the firmware modifications and packet format of 802.11 frames these devices were able to track neighboring devices by their Media Access Control (MAC) addresses. The userspace program could therefore ask the virtual interface for neighbors currently in transmitting range.

These results constituted a fully working system satisfying all the device requirements above. The functionality added could best be described as concurrent monitor mode with packet injection capabilities. Monitor mode was demonstrated by receiving ACK packets and management frames from the NIC, while packet injection was demonstrated by crafting Beacon frames broadcasting a network SSID (Service Set Identifier) that didn't exist and displaying that network on unmodified devices.

Internet of Things Devices/Routers

Embodiments hereof are useful for use with/on IoT (Internet of Things) devices. Many IoT devices are only economical if they have inexpensive connectivity. This means that for many devices, it is not economically viable to pay for access to a network that would give the IoT device a direct uplink or downlink connection to the Internet, such as a cellular or satellite connection. Additionally, the IoT device may be positioned in an area where, often because of backhaul, economic or legal reasons, it is not reasonable to deploy an access point such as a WiFi hotspot that would allow the IoT device to have an inexpensive direct connection to the Internet. Routers and IoT devices can be programmed to use decentralized routing protocols like BATMAN, OLSR, etc. to connect with nearby clients until it establishes a connection with a pseudo-gateway. In this scenario, the IoT device acts as a client without a direct uplink. This method will often provide the inexpensive connectivity needed to make an IoT device economical. In another implementation of the described system, deploying software of IoT devices that allow them to register with the server and make decentralized connections with nearby devices may allow a group of IoT devices to make use of fewer direct uplink connections. By deploying the described software on the IoT devices, only one of the IoT devices in the group would need to have an interface that provides a direct uplink capability and a subscription to use said direct uplink.

Beaglebones

One embodiment uses the Nordic Semiconductors 2.4 GHz wireless transceiver (nRF24L01) and a Beagle Bone (Linux-based microcontroller). The nRF24L01 exposes an API for transmitting and receiving data frames and setting and getting parameters of the device such as the current transmission channel. Because of limitations in the device's firmware, certain desirable parameters however could not be modified. The API exposes little control of the acknowledgement policy (ACK) of the transmissions, the frame size, transmission rate, or transmission power. The response time of the device when transmitting data on the order of 1 Mb was somewhat unpredictable when implemented. Furthermore, as a means of controlling for errors, the firmware+API required a non-optimal addressing scheme with limited addresses which only approximated the intended receive functionality. In order to perform routing, a userspace routing program was installed on the Beaglebone written in C/C++ that defined a prototype packet format for custom transmissions. The packet format incorporated routing information (as a sequence of hops from the initial device), channel, and timing information into the header of each packet. The payload length of the each packet was also stored. Each packet also contained a variable length data payload allowing data transmissions between devices. When tested, the system transferred error-free data at a rate of around 40 kbps. This speed represented a 30-50% efficiency of the theoretical maximum of 112.5 kbps. The limited efficiency and maximum throughput was due largely to the wiring of the system, the transfer protocol used between the nRF24L01 and the Beaglebone processor.

iOS Multi-Peer

Another prototype client system was constructed using the iOS MultipeerKit APIs provided by Apple in the iOS SDK. The high-level functionality of MultipeerKit permits developers to use peer-to-peer connections between iOS devices over system-managed WiFi and Bluetooth connections. The MultipeerKit allows concurrent Bluetooth and WiFi operation and permits peer-to-peer connections while simultaneously connected to a WiFi network.

The present system was tested with a central server connected via a LAN connection to an enterprise level WiFi network. One iPhone 6 was connected to the high-bandwidth WiFi network while two other phones were brought to known "WiFi Dead Zones" within the test area. A low-bandwidth long-range WiFi network was wired directly to the server; it provided a suitable control link back to the server isolated from the enterprise WiFi network. With this setup, each device had a direct connection to the server, but only the device close to the enterprise network experienced raw download speeds in excess of 20 Mbps.

The two low-bandwidth client devices were brought out of range of the enterprise network to the same location, but between 20 to 100 ft from the relaying iPhone 6 connected to the enterprise network.

Using the central server, a mesh path was enabled for one of the low-bandwidth devices while the other device acted as a control.

Over this single-hop system the mesh-enabled client saw an over 10 Mbps increase in data speeds at certain outdoor locations compared with the control and also remained connected even when the control device could no longer communicate with the control gateway. The peak mesh speeds recorded over 50 ft from the meshing device were in excess of 15 Mbps. An average increase of about 7 Mbps using the centralized multi-hop techniques was shown after testing in various locations in urban city buildings and streets.

Driver/Router

The preferred implementation is a semi-custom transmission over IEEE 802.11 standards. In this third implementation of the system, the knowledge of the first three prototypes is combined into a more integrated system. Several wireless drivers in Linux, especially the Atheros wireless cards, rely heavily on a SoftMAC API known as mac80211. Certain wireless cards, namely the Atheros based hardware expose a Hardware Abstraction Layer (HAL) that allows for similar functionality to the firmware modifications for testing purposes. Using the mac80211 framework, the link-layer transmission of packets can be configured to run in the driver allowing kernel-space software to modify and create frames leaving the device. For some wireless NICs, full monitor mode functionality can be supported by configuring the hardware to pass all frames to the kernel. In turn, the kernel provides filtering and routing in software rather than hardware.

Computing

The applications, services, mechanisms, operations and acts shown and described above are implemented, at least in part, by software running on one or more computers or computer systems or user devices (e.g., devices 102 and server(s) 110 in FIG. 1). It should be appreciated that each user device is, or comprises, a computer system.

Programs that implement such methods (as well as other types of data) may be stored and transmitted using a variety of media (e.g., computer readable media) in a number of ways. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 8:
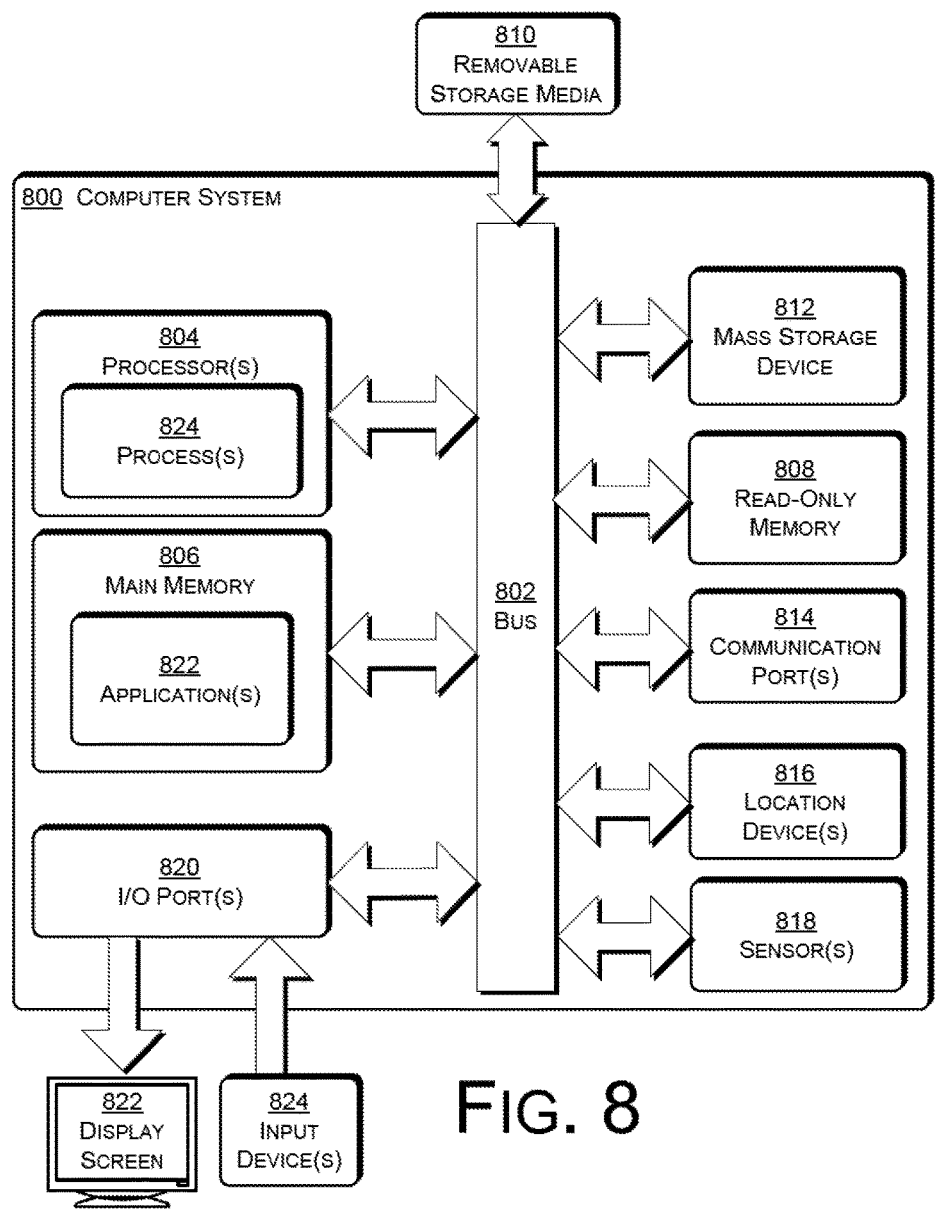
FIG. 8 depicts aspects of a computer system according to exemplary embodiments hereof.

FIG. 8(A) is a schematic diagram of a computer system 800 upon which embodiments of the present disclosure may be implemented and carried out.

According to the present example, a computer system 800 may include a bus 802 (i.e., interconnect), one or more processors 804, a main memory 806, read-only memory 808, optional removable storage media 810, a mass storage 812, one or more communications ports 814, location device(s) 816, and one or more sensors 818. Communication port(s) 814 may be connected to one or more networks (e.g., computer networks, cellular networks, etc.) by way of which the computer system 800 may receive and/or transmit data. The location device(s) 815 may include GPS devices and the like that can be used to determine a location of the device.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 804 can be (or include) any known processor, such as, but not limited to, an Intel® Itanium® or Itanium 2® processor(s), AMD® Opteron® or Athlon MP® processor(s), or Motorola® lines of processors, and the like. Communications port(s) 814 can be any of an RS-232 port for use with a modem based dial-up connection, a 10/100 Ethernet port, a Gigabit port using copper or fiber, or a USB port, and the like. Communications port(s) 814 may be chosen depending on a network such as a Local Area Network (LAN), a Wide Area Network (WAN), a Content Delivery Network (CDN), or any network to which the computer system 800 connects. The computer system 800 may be in communication with peripheral devices (e.g., display screen 822, input device(s) 824) via Input/Output (I/O) port 820. Some or all of the peripheral devices may be integrated into the computer system 800, and the input device(s) 818 may be integrated into the display screen 822 (e.g., in the case of a touch screen).

The location device(s) 816 may include a GPS chipset. The one or more sensors 818 may include an accelerometer and other sensors to determine information about the device.

Main memory 806 can be Random Access Memory (RAM), or any other dynamic storage device(s) commonly known in the art. Read-only memory 808 can be any static storage device(s) such as Programmable Read-Only Memory (PROM) chips for storing static information such as instructions for processor(s) 804. Mass storage 812 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 802 communicatively couples processor(s) 804 with the other memory, storage and communications blocks. Bus 802 can be a PCI/PCI-X, SCSI, a Universal Serial Bus (USB) based system bus (or other) depending on the storage devices used, and the like. Removable storage media 810 can be any kind of external hard-drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves; light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 806 is encoded with application(s) 822 that support(s) the functionality as discussed herein (an application 822 may be an application that provides some or all of the functionality of one or more of the mechanisms described herein). Application(s) 822 (and/or other resources as described herein) can be embodied as software code such as data and/or logic instructions (e.g., code stored in the memory or on another computer readable medium such as a disk) that supports processing functionality according to different embodiments described herein.

For example, as shown in FIG. 2(A), application(s) 822 may include server applications). In the case of the device, as shown in FIG. 3, application(s) 822 may include applications 136.

During operation of one embodiment, processor(s) 804 accesses main memory 806, e.g., via the use of bus 802 in order to launch, run, execute, interpret or otherwise perform the logic instructions of the application(s) 822. Execution of application(s) 822 produces processing functionality of the service(s) or mechanism(s) related to the application(s). In other words, the process(es) 824 represents one or more portions of the application(s) 822 performing within or upon the processor(s) 804 in the computer system 800.

For example, process(es) 824 may include device process(es) corresponding to one or more of the device application(s) 822.

It should be noted that, in addition to the process(es) 824 that carries(carry) out operations as discussed herein, other embodiments herein include the application 822 (i.e., the un-executed or non-performing logic instructions and/or data). The application 822 may be stored on a computer readable medium (e.g., a repository) such as a disk or in an optical medium. According to other embodiments, the application 822 can also be stored in a memory type system such as in firmware, read only memory (ROM), or, as in this example, as executable code within the main memory 806 (e.g., within Random Access Memory or RAM). For example, application 822 may also be stored in removable storage media 810, read-only memory 808, and/or mass storage device 812.

Those skilled in the art will understand that the computer system 800 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

Real Time

Those of ordinary skill in the art will realize and understand, upon reading this description, that, as used herein, the term "real time" means near real time or sufficiently real time. It should be appreciated that there are inherent delays in network-based communication (e.g., based on network traffic and distances), and these delays may cause delays in data reaching various components. Inherent delays in the system do not change the real-time nature of the data. In some cases, the term "real-time data" may refer to data obtained in sufficient time to make the data useful for its intended purpose.

Although the term "real time" may be used here, it should be appreciated that the system is not limited by this term or by how much time is actually taken. In some cases, real time computation may refer to an online computation, i.e., a computation that produces its answer(s) as data arrive, and generally keeps up with continuously arriving data. The term "online" computation is compared to an "offline" or "batch" computation.

As used in this description, the term "portion" means some or all. So, for example, "A portion of X" may include some of "X" or all of "X". In the context of a conversation, the term "portion" means some or all of the conversation.

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of XYZs" may include one or more "XYZs".

It should be appreciated that the words "first," "second," "third," and the like, in the description and claims are used to distinguish or identify, and not to show a serial or numerical limitation. Similarly, the use of letter or numerical labels (such as "(a)", "(b)", or "(i)", "(ii)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram the activities associated with those boxes may be performed in any order, including fully or partially in parallel.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

We claim:

1. A system comprising one or more servers, and a plurality of wireless telecommunications devices registered with said system as registered client devices,
said one or more servers constructed and adapted to:
(a) obtain corresponding client configuration states for at least some of said registered client devices, wherein a client configuration state for a given registered client device includes and/or is based on information about other devices with which the given registered client device can communicate in at least one direction;
(b) determine and maintain a virtual representation of at least one hybrid network of gateways and said registered client devices;
(c) determine a particular sub-network configuration of a particular sub-network for a particular client device, wherein said particular sub-network configuration is determined based on said virtual representation of said at least one hybrid network and on a client configuration state for said particular client device, and wherein said particular sub-network comprises at least one path between said one or more servers and said particular client device;
(d) route data to and/or from said particular client device via said particular sub-network; and
(e) provide said particular sub-network configuration to said particular client device.

2. The system of claim 1, wherein said particular sub-network comprises multiple paths between said one or more servers and said particular client device.

3. The system of claim 2, wherein data are routed in (d) via at least two paths in said particular sub-network.

4. The system of claim 3, wherein said at least two paths comprise at least two distinct protocols.

5. The system of claim 1, wherein said at least one path between said one or more servers and said particular client device comprises at least one gateway.

6. The system of claim 1, wherein said one or more servers are further constructed and adapted to:
register said plurality of wireless telecommunications devices with said system as said registered client devices.

7. The system of claim 1, wherein said particular client device uses said particular sub-network to communicate with other client devices and/or with one or more content sources.

8. The system of claim 1, wherein said one or more servers:
route data between said particular client device and one or more content sources said particular sub-network.

9. The system of claim 1, wherein said particular sub-network comprises a particular virtual private network (VPN) comprising and between (i) at least said particular client device, and (ii) said one or more servers.

10. The system of claim 9, wherein said one or more servers:
route data between said particular client device and said one or more servers and/or one or more other client devices via said particular VPN.

11. The system of claim 9, wherein said particular VPN comprises at least one gateway.

12. The system of claim 11, wherein said particular VPN comprises multiple gateways.

13. A method in a system comprising one or more servers, and a plurality of wireless telecommunications devices registered with said system as registered client devices, the method comprising, by said one or more servers:
- (A) obtaining corresponding client configuration states for at least some of said registered client devices, wherein a client configuration state for a given registered client device includes and/or is based on information about other devices with which the given registered client device can communicate in at least one direction;
- (B) determining and maintaining a virtual representation of at least one hybrid network of gateways and said registered client devices;
- (C) determining a particular sub-network configuration of a particular sub-network for a particular client device, wherein said particular sub-network configuration is determined based on said virtual representation of said at least one hybrid network and on a client configuration state for said particular client device, and wherein said particular sub-network configuration comprises at least one path between said one or more servers and said particular client device;
- (D) routing data to and/or from said particular client device via said particular sub-network; and
- (E) providing said particular sub-network configuration to said particular client device.

14. The method of claim 13, wherein said particular sub-network comprises multiple paths between said one or more servers and said particular client device.

15. The method of claim 14, wherein data are routed in (D) via at least two paths in said particular sub-network.

16. The method of claim 13, wherein said at least one path between said one or more servers and said particular client device comprises at least one gateway.

17. The method of claim 13, wherein said particular sub-network comprises at least one gateway.

18. The method of claim 17, wherein said particular sub-network comprises multiple gateways.

19. The method of claim 15, further comprising:
registering said plurality of wireless telecommunications devices with said system as said registered client devices.

20. The method of claim 15, wherein said at least two paths comprise at least two distinct protocols.

21. The method of claim 13, said routing in (D) comprises:
routing data between said particular client device and one or more content sources via said particular sub-network.

22. The method of claim 13, wherein said particular client device uses said particular sub-network to communicate with other client devices and/or and one or more content sources.

23. The method of claim 13, further comprising:
(F) forming a particular virtual private network (VPN) in said particular sub-network, said particular VPN comprising and between (i) at least said particular client device, and (ii) said one or more servers.

24. The method of claim 23, wherein said routing in (D) comprises:
routing data between said particular client device and said one or more servers via said particular VPN.

25. The method of claim 23, wherein said routing in (D) comprises:
routing data between said particular client device and one or more other client devices via said particular VPN.

26. A computer program product having computer-readable instructions stored on non-transitory computer readable media, the computer-readable instructions including instructions for implementing a computer-implemented method, in a system comprising one or more servers, and a plurality of wireless telecommunications devices registered with said system as registered client devices, the method comprising, by said one or more servers:
- (A) obtaining corresponding client configuration states for at least some of said registered client devices, wherein a client configuration state for a given registered client device includes and/or is based on information about other devices with which the given registered client device can communicate in at least one direction;
- (B) determining and maintaining a virtual representation of at least one hybrid network of gateways and said registered client devices;
- (C) determining a particular sub-network configuration of a particular sub-network for a particular client device, wherein said particular sub-network configuration is determined based on said virtual representation of said at least one hybrid network and on a client configuration state for said particular client device, and wherein said particular sub-network configuration comprises at least one path between said one or more servers and said particular client device; and
- (D) routing data to and/or from said particular client device via said particular sub-network; and
- (E) providing said particular sub-network configuration to said particular client device.

27. A telecommunications device, operable in a system comprising one or more servers, said telecommunications device being a client device in said system, said telecommunications device constructed and adapted to:
- (a) provide, to said one or more servers, a client configuration state for said client device, wherein said client configuration state includes and/or is based on information about other devices with which the client device can communicate in at least one direction;
- (b) obtain from said one or more servers a particular sub-network configuration of a particular sub-network, wherein said particular sub-network configuration comprises at least one path between said one or more servers and said client device, wherein said client device is in said particular sub-network, and wherein said particular sub-network configuration was determined by the one or more servers based on: (i) said client configuration state, and (ii) at least one other client configuration state of at least one other client device; and
- (c) use said particular sub-network to communicate with at least one other device and/or with one or more content sources via said one or more servers.

28. The device of claim 27, wherein said particular sub-network comprises multiple paths between said one or more servers and said client device.

29. The device of claim 28, wherein, in (c), said client device communicates using at least two paths in said particular sub-network.

30. The device of claim 29, wherein said at least two paths comprise at least two distinct protocols.

31. The device of claim 27, wherein said particular sub-network comprises a particular virtual private network (VPN) between (i) said client device, and (ii) said one or more servers.

32. The telecommunications device of claim 31, wherein, in (c), the client device
uses the particular VPN to:
(x) obtain at least one resource via said one or more servers; and/or
(y) route data between said client device and one or more content sources; and/or
(z) route data between said client device and one or more other client devices.

33. The telecommunications device of claim 31, wherein the particular VPN was established, at least in part, by the one or more servers.

34. The telecommunications device of claim 31, wherein said particular VPN comprises at least one gateway.

35. A method, on a telecommunications device operating in a system comprising one or more servers, said telecommunications device being a client device in said system, the method comprising:
(A) providing, to said one or more servers, a client configuration state for said client device, wherein said client configuration state includes and/or is based on information about other devices with which the client device can communicate in at least one direction;
(B) obtaining from said one or more servers a particular sub-network configuration, wherein said particular sub-network configuration comprises at least one path from said one or more servers to said client device, wherein said client device is in said particular sub-network, and wherein said particular sub-network configuration was determined by the one or more servers based on: (i) said client configuration state, and (ii) at least one other client configuration state of at least one other client device; and
(C) using said particular sub-network to communicate with at least one other device and/or with one or more content sources via said one or more servers.

36. The method of claim 35, wherein said particular sub-network comprises multiple paths between said one or more servers and said client device.

37. The method of claim 35, wherein said using in (C) uses at least two paths in said particular sub-network.

38. A computer program product having computer-readable instructions stored on non-transitory computer readable media, the computer-readable instructions including instructions for implementing a computer-implemented method on a telecommunications device operating in a system comprising one or more servers, said telecommunications device being a client device in said system, the method comprising:
(A) providing, to said one or more servers, a client configuration state for said client device, wherein said client configuration state includes and/or is based on information about other devices with which the client device can communicate in at least one direction;
(B) obtaining from said one or more servers a particular sub-network configuration, wherein said particular sub-network configuration comprises at least one path from said one or more servers to said client device, wherein said client device is in said particular sub-network, and wherein said particular sub-network configuration was determined by the one or more servers based on: (i) said client configuration state, and (ii) at least one other client configuration state of at least one other client device; and
(C) using said particular sub-network to communicate with at least one other device and/or with one or more content sources via said one or more servers.

39. The computer program product of claim 38, wherein said particular sub-network comprises multiple paths between said one or more servers and said client device.

40. The computer program product of claim 38, wherein said using in (C) uses at least two paths in said particular sub-network.

41. The system of claim 5, wherein said at least one path between said one or more servers and said particular client device comprises multiple gateways.

42. The computer program product of claim 26, wherein said particular sub-network comprises multiple paths between said one or more servers and said particular client device.

43. The computer program product of claim 42, wherein data are routed in (d) via at least two paths in said particular sub-network.

44. The computer program product of claim 43, wherein said at least two paths comprise at least two distinct protocols.

45. The computer program product of claim 26, wherein said one or more servers are further constructed and adapted to:
(e) provide said particular sub-network configuration to said particular client device.

46. The computer program product of claim 26, wherein said at least one path between said one or more servers and said particular client device comprises at least one gateway.

47. The computer program product of claim 46, wherein said at least one path between said one or more servers and said particular client device comprises multiple gateways.

48. The computer program product of claim 26, wherein said one or more servers are further constructed and adapted to:
register said plurality of wireless telecommunications devices with said system as said registered client devices.

49. The computer program product of claim 26, wherein said particular client device uses said particular sub-network to communicate with other client devices and/or with one or more content sources.

50. The computer program product of claim 26, wherein said one or more servers:
route data between said particular client device and one or more content sources said particular sub-network.

51. The computer program product of claim 26, wherein said particular sub-network comprises a particular virtual private network (VPN) comprising and between (i) at least said particular client device, and (ii) said one or more servers.

52. The computer program product of claim 51, wherein said one or more servers:
route data between said particular client device and said one or more servers and/or one or more other client devices via said particular VPN.

53. The computer program product of claim 50, wherein said particular VPN comprises at least one gateway.

54. The computer program product of claim 53, wherein said particular VPN comprises multiple gateways.

55. The method of claim 37, wherein said at least two paths comprise at least two distinct protocols.

56. The method of claim 35, wherein said particular sub-network comprises a particular virtual private network (VPN) between (i) said client device, and (ii) said one or more servers.

57. The method of claim 56, wherein, in (c), the client device uses the particular VPN to:

(x) obtain at least one resource via said one or more servers; and/or (y) route data between said client device and one or more content sources; and/or (z) route data between said client device and one or more other client devices.

58. The method of claim 56, wherein the particular VPN was established, at least in part, by the one or more servers.

59. The method of claim 56, wherein said particular VPN comprises at least one gateway.

60. The method of claim 59, wherein said particular VPN comprises multiple gateways.

61. The computer program product of claim 40, wherein said at least two paths comprise at least two distinct protocols.

62. The computer program product of claim 38, wherein said particular sub-network comprises a particular virtual private network (VPN) between (i) said client device, and (ii) said one or more servers.

63. The computer program product of claim 62, wherein, in (c), the client device uses the particular VPN to:

(x) obtain at least one resource via said one or more servers; and/or (y) route data between said client device and one or more content sources; and/or (z) route data between said client device and one or more other client devices.

64. The computer program product of claim 62, wherein the particular VPN was established, at least in part, by the one or more servers.

65. The computer program product of claim 62, wherein said particular VPN comprises at least one gateway.

66. The computer program product of claim 65, wherein said particular VPN comprises multiple gateways.

\* \* \* \* \*